(12) United States Patent
Arakawa et al.

(10) Patent No.: US 7,183,666 B2
(45) Date of Patent: Feb. 27, 2007

(54) MOVABLE BODY START-UP LOCKING DEVICE

(75) Inventors: Shuji Arakawa, Hiratsuka (JP); Tadashi Morita, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 839 days.

(21) Appl. No.: 10/349,950

(22) Filed: Jan. 24, 2003

(65) Prior Publication Data
US 2004/0145241 A1    Jul. 29, 2004

(51) Int. Cl.
*B60R 25/00* (2006.01)
(52) U.S. Cl. .................. 307/10.2; 307/10.3; 307/10.6; 307/9.1
(58) Field of Classification Search ................. 307/9.1, 307/10.2, 10.3, 10.6
See application file for complete search history.

(56) References Cited

U.S. PATENT DOCUMENTS 5,714,946 A * 2/1998 Gottshall et al. ...... 370/870.16

6,998,957 B2 * 2/2006 Shibata et al. ............. 340/5.28

FOREIGN PATENT DOCUMENTS

| DE | 197 33 374 | 2/1998 |
|----|-----------|--------|
| DE | 197 53 401 | 6/1999 |
| EP | 0 989 525 | 3/2000 |
| WO | 02 079010 | 10/2002 |
| WO | WO02079010 A1 * | 10/2002 |

* cited by examiner

*Primary Examiner*—Robert L. Deberadinis
(74) *Attorney, Agent, or Firm*—Wenderoth, Lind & Ponack, L.L.P.

(57) ABSTRACT

An object of the present invention is to prevent a start-up locked state from being released by a third party other than a rightful driver. After a movable body 31 has been set in a state of halted operations (a start-up locked state) by a start-up lock setting unit 830, a rightful driver must contact a manager on a terminal device 11 side when this driver forgets a password or hands over to another driver. Having received contact, the manager transmits a start-up lock release command from the terminal 11 side to the movable body 31 via communication units 1 (see FIG. 1), whereby the state of halted operations (start-up locked state) in the movable body 31 is released.

7 Claims, 39 Drawing Sheets

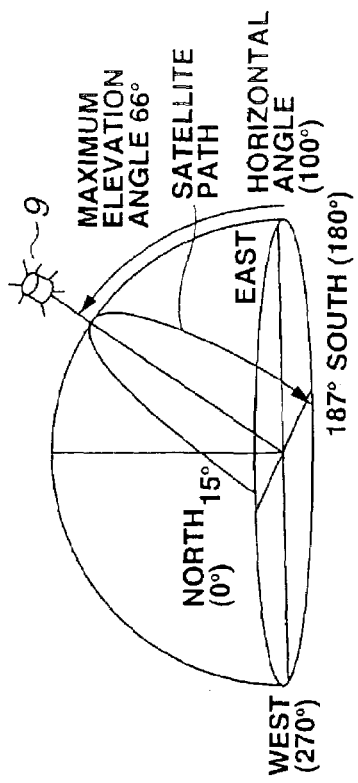
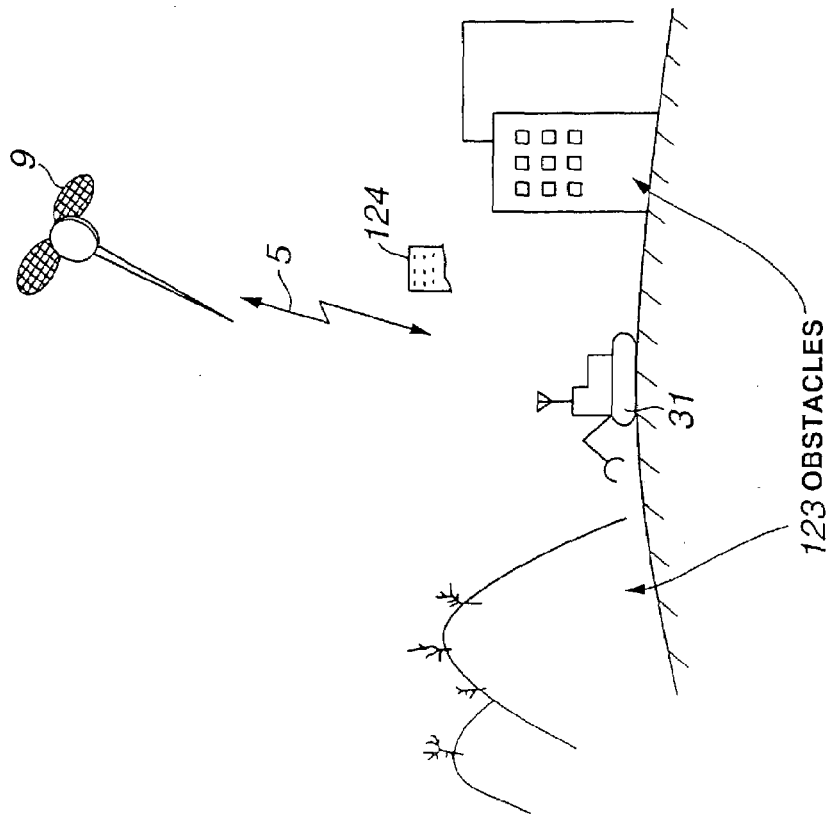
FIG.13(a)
FIG.13(b)
AOS TIME AND AZIMUTH AT WHICH SATELLITE APPEARS ON HORIZON
LOS TIME AND AZIMUTH AT WHICH SATELLITE DISAPPEARS BELOW HORIZON
MEL TIME AND AZIMUTH AT MAXIMUM ELEVATION ANGLE
FIG.13(c)

|  | NO REQUEST | REQUEST IN PROGRESS | REPLY ARRIVED | NO REPLY |
|---|---|---|---|---|
| COLOR (PATTERN) | BLUE | YELLOW | GREEN | RED |
| SHAPE | | | | |
| SIZE | MEDIUM | MEDIUM ↔ LARGE | LARGE | SMALL |
| CHANGE | | ROTATION | MOVEMENT | JUMP |

| COMMUNICATION STATUS | VEHICLE NUMBER | POSITION | SERVICE METER |
|---|---|---|---|
| BLUE (33) | 23 | TOWN A | 405H |
| YELLOW (31) | 102 | CITY B | 120H |
| BLUE (36) | 117 | TOWN C | 97H |
| BLUE (37) | 233 | CITY D | 381H |
| YELLOW (32) | 234 | TOWN E | 39H |

REARRANGE ACCORDING TO COMMUNICATION STATUS ⇒

FIG.17(b)

| COMMUNICATION STATUS | VEHICLE NUMBER | POSITION | SERVICE METER |
|---|---|---|---|
| YELLOW (31) | 102 | CITY B | 120H |
| YELLOW (32) | 234 | TOWN E | 39H |
| BLUE (33) | 23 | TOWN A | 405H |
| BLUE (36) | 117 | TOWN C | 97H |
| BLUE (37) | 233 | CITY D | 381H |

EXTRACT ⇒

FIG.17(c)

| COMMUNICATION STATUS | VEHICLE NUMBER | POSITION | SERVICE METER |
|---|---|---|---|
| YELLOW (31) | 102 | CITY B | 120H |
| YELLOW (32) | 234 | TOWN E | 39H |

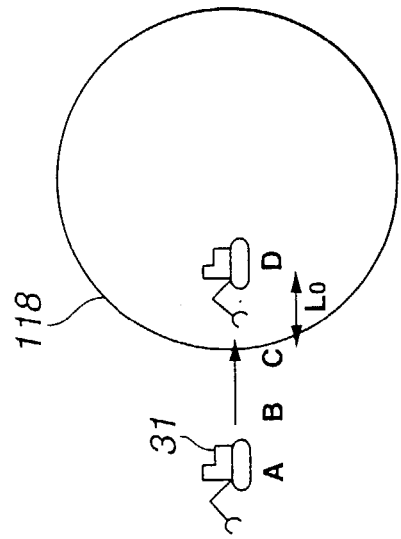
FIG.23(a)
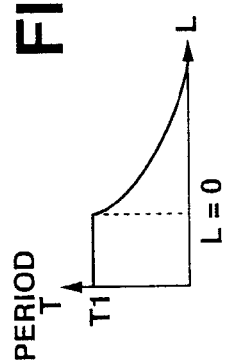
FIG.23(b)
FIG.23(c)
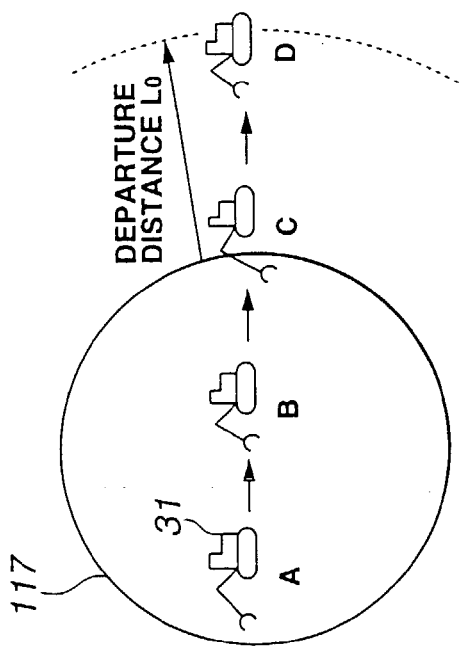
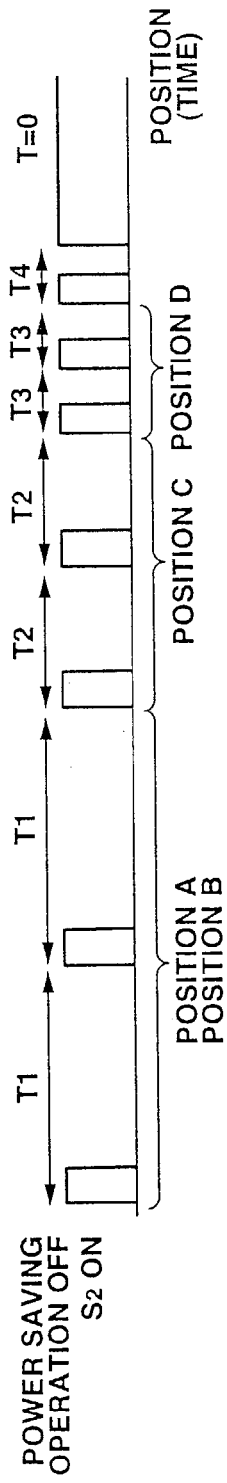
FIG.23(d)

T1 > T2 > T3 > T4

DATA BY VEHICLE MODEL : LATEST DATA [RETURN]

POSITION DATA : HISTORY

| DATE | LATITUDE | LONGITUDE |
|---|---|---|
| 98/10/19 3:58:30 P.M. | H35.19.15.240 | E139.17.54.210 |

| SERVICE METER | 98/10/19 3:58:30 P.M. | | [GRAPH] |
|---|---|---|---|

SPECIFIC DATA

| FUEL QUANTITY | 98/09/10 5:06:38 P.M. | 90 | % | GRAPH |
|---|---|---|---|---|
| ENGINE SPEED | 98/09/10 5:06:38 P.M. | 1340 | RPM | GRAPH |
| BATTERY VOLTAGE | 98/09/10 5:06:38 P.M. | 26 | V | GRAPH |
| PUMP PRESSURE | 98/09/10 5:06:38 P.M. | 35 | kg/cm² | GRAPH |
| WORK MODE | 98/09/10 5:06:38 P.M. | | | |
| | | | | |
| | | | | |
| | | | | |

[RUNNING MAP] [GRAPH]

IMAGE CAPTURED BY CAMERA — 116

OPERATING MAP | RETURN |

| Date | Operating bar |
|---|---|
| 98/12/09 | 08:00 — 20:00 |
| 98/12/10 | 08:00 — 20:00 |
| 98/12/11 | 08:00 — 20:00 |
| 98/12/12 | 08:00 — 20:00 |
| 98/12/12 | 08:00 — 20:00 |
| 98/12/13 | 08:00 — 20:00 |
| 98/12/14 | 08:00 — 20:00 |
| 98/12/15 | 08:00 — 20:00 |
| 98/12/16 | 08:00 — 20:00 |

MOBILE BODY LIST DISPLAY

| | NO. | PURCHASING USER | UTILIZING USER | Car ID | MANU-FACTURER | CONSTRUCTION MACHINE TYPE |
|---|---|---|---|---|---|---|
| PROCESSING DONE | 0 | ASAYAMA KENSETSU | ASAYAMA KENSETSU | 2 | | CRANE |
| REQUEST IN PROGRESS | 1 | SUZUKI JUKI | SUZUKI JUK | 28 | | WHEEL LOADER |
| REQUEST IN PROGRESS | 2 | ABE RENTAL | MIZUI DOBOKU | 26 | | SPECIAL |
| REQUEST IN PROGRESS | 3 | ABE RENTAL | MIZUI DOBOKU | 25 | | CRANE |
| NORMAL | 4 | SUZUKI JUKI | SUZUKI JUKI | 30 | | BULLDOZER |
| NORMAL | 5 | HIRAKI SAISEKI | HIRAKI SAISEKI | 29 | | WHEEL LOADER |
| NORMAL | 6 | HQS | BREWERY | 20 | | |

CLEAR SELECTIONS

REQUEST EXECUTION

| REQUEST EXECUTION | CANCEL |

NUMBER OF BYTES CHARGED FOR THIS MONTH [1101]
TRANSMISSION BYTES [6] RECEPTION BYTES [6] CURRENT BYTE COUNT [1089]

BASIC DATA

☐ VEHICLE POSITION   ☐ SERVICE METER

☐ SPECIFIC SINGLE METER

| ALL ON | ALL OFF |

☐ FUEL QUANTITY
☐ WORK MODE
☐ VEHICLE BODY ALARM 1
☐ VEHICLE BODY ALARM 2
☐ BATTERY VOLTAGE
☐ ENGINE WATER TEMPERATURE
☐ ENGINE SPEED
☐ PUMP PRESSURE

SELECTION OF RECIPIENT OF VEHICLE DATA SENT BACK

| REPLY RECIPIENT TERMINAL |
|---|
| ADMINISTRATOR A |
| ADMINISTRATOR B |
| SERVICE CAR |
| TRAILER |
|  |
|  |
|  |

FIG.32

NOTIFICATION SCREEN

There were 7 notices as of 10:21:31 a.m. on 00/01/31. No.1 to No.7 are displayed.
Previous 20 notices   Next 20 notices   Page : 1

[SET VEHICLE TO WATCH]

| WATCH | TIME | MANU-FACTURER | MODEL | MODEL NUMBER | MACHINE NUMBER | ID1 | ID2 | CONTENT |
|---|---|---|---|---|---|---|---|---|
| ☐ | 2000/01/31 08:38 | X COMPANY | PC60 | 7 | 0251 | K623 | | The lock was set by remote. |
| ☐ | 2000/01/30 21:14 | X COMPANY | PC200 | 6E | 1338 | K005 | | Vehicle engine started outside regular hours. |
| ☑ | 2000/01/30 03:20 | X COMPANY | PC75UU | 3 | 3007 | K108 | | No confirmation of locking received from vehicle. |
| ☐ | 2000/01/29 20:28 | X COMPANY | PC75UU | 3 | 0011 | K008 | | The battery voltage is low. |
| ☐ | 2000/01/29 09:57 | X COMPANY | PC75UU | 3 | 7789 | K315 | | The vehicle is out of range. |
| ☐ | 2000/01/29 05:25 | X COMPANY | PC200 | 6E | 7633 | K311 | | Vehicle engine started outside regular hours. |
| ☑ | 2000/01/28 21:54 | X COMPANY | PC75UU | 3 | 5422 | K116 | | No communication with vehicle for 36 hours or more. |

[ORGANIZE NOTICES]

※This screen is automatically updated at a certain time interval.

FIG.34

SCREEN OF ENTRY AND LEAVING

LATEST ITEMS FROM NO.1 TO NO.10 DISPLAYED.
PREVIOUS 20 ITEMS   NEXT 20 ITEMS   PAGE : 1

| TIME | PARTICULARS OF ENTRY AND LEAVING |
|---|---|
| 1999/11/15  16:19:00 | LEFT SOUTH TOKYO OFFICE. |
| 1999/11/15  15:37:00 | ENTERED SHIRAKAWA BRANCH OFFICE. |
| 1999/11/15  13:53:00 | LEFT WEST TOKYO OFFICE. |
| 1999/11/12  14:37:00 | LOCATED AT WEST TOKYO OFFICE. |
| 1999/11/12  14:17:00 | ENTERED WEST TOKYO OFFICE. |

FIG.36

DAILY WORK REPORT SCREEN

ABC DOBOKU (KK)  SITE: IROHA ROCK QUARRY

| MANUFACTURER | COMPANY A |
|---|---|
| MODEL | PC2000 |
| MODEL NUMBER | 6E |
| MACHINE NUMBER | 18322 |
| IDENTIFICATION ID1 | K274 |
| IDENTIFICATION ID2 | |
| VEHICLE TYPE | POWER SHOVEL |
| UTILIZATION USER | |
| CLASSIFICATION 1 | UNCLASSIFIED |
| CLASSIFICATION 2 | UNCLASSIFIED |
| DATE OF RECEIPT OF LATEST MAIL | 2000/01/30 23:00:00 |
| COMMUNICATION STATUS | REPLY SENT |

| DATE | OPERATING MAP | OPERATING TIME | NAME OF WORKER | REMARKS |
|---|---|---|---|---|
| 2000/01/30 | | 0 HOUR 0 MINUTE | | |
| 2000/01/29 | | 8 HOURS 18 MINUTES | SATO | LUBE |
| 2000/01/28 | | 8 HOURS 24 MINUTES | SATO | |
| 2000/01/27 | | 8 HOURS 36 MINUTES | SATO | |
| 2000/01/26 | | 9 HOURS 12 MINUTES | SUZUKI | |
| 2000/01/25 | | 0 HOUR 54 MINUTES | SUZUKI | |
| 2000/01/24 | | 3 HOURS 12 MINUTES | KATO | |
| 2000/01/23 | | 0 HOUR 0 MINUTE | | |
| 2000/01/22 | | 2 HOURS 54 MINUTES | SATO | FUEL 2001 |
| 2000/01/21 | | 5 HOURS 36 MINUTES | SATO | |

CHARGES: XXXXXXXX YEN (TOTAL 49 HOURS 6 MINUTES)

FIG.40

MOVABLE BODY START-UP LOCKING DEVICE

BACKGROUND OF THE INVENTION

1. Field of the Invention

The present invention relates to a start-up locking device for setting a movable body such as a construction machine to a state of halted operations by locking start-up therein.

2. Description of the Related Art

Construction machines are extremely expensive and are therefore often provided for rent. However, since construction machines are difficult to move, they often remain in the location of a customer even after the end of a rental period. It is therefore necessary to effectively prevent the improper usage of construction machines by customers in breach of contract following the end of a rental period.

Furthermore, if the operating lever of an attachment on a construction machine is mistakenly operated by a person who is unskilled in such operations, the attachment may be operated improperly, leading to a dangerous situation.

It is therefore necessary to prevent persons other than legitimate users or persons other than skilled drivers from operating the engine of a construction machine in order to prevent improper usage and erroneous operations.

In the prior art, start-up locking devices have been published in various patent applications and the like.

In a device described in Japanese Patent Application Laid-Open No. 9-50584, for example, a numeric keypad input device is provided in the operating cab of a construction machine such that when a specific code number is inputted using this numeric keypad input device, a start-up locked state in the engine is released and the engine can be started.

However, the following problems arise when password input is set as a condition for engine start-up.

Namely, if a password is simple (for example a date of birth or the like), the password can be easily analogized by an unrightful third party. As a result, the unrightful third party may easily operate the engine of the construction machine.

If the password is made complex in order to avoid this problem, the person who set the password may forget the password. Moreover, when a construction machine is operated alternately by a plurality of drivers, the other drivers must be informed of the set password.

Due to these circumstances, a driver may post a memo containing the password in the vicinity of the driving seat. In this case also, however, a person other than a rightful driver can easily discover the password and thus the concealment factor is lost.

Further, when driving of the construction machine is handed over to the next driver, the password may be passed along verbally. In this case also, however, the secret may be leaked unintentionally to a third party other than a rightful driver.

Thus by setting the input of a password as a condition for releasing a start-up locked state, there is a high possibility that the secret password will be leaked to a person other than a rightful driver of the construction machine.

The present invention has been devised in consideration of such circumstances, and it is an object thereof to prevent a start-up locked state from being released by a third party other than a rightful driver.

SUMMARY OF THE INVENTION

A first invention is a movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative; and first start-up lock releasing means for releasing the state of halted operations on the condition that a password is inputted and the inputted password matches a set specific password, and wherein the start-up locking device is provided with:

second start-up lock releasing means for releasing the state of halted operations by transmitting a start-up lock release command from the terminal device side to the movable body via the communication means.

According to the first invention, as is illustrated in FIG. 42, after a movable body 31 has been set to a state of halted operations (a start-up locked state) using start-up lock setting means 830, a rightful driver contacts a manager on a terminal device 11 side when this driver forgets a password or hands over to another driver.

Having received contact, the manager transmits a start-up lock release command from the terminal device 11 side to the movable body 31 via communication means 1 (see FIG. 1), whereby the state of halted operations (start-up locked state) in the movable body 31 is released.

According to the first invention as described above, a manager releases a start-up locked state in the movable body 31 on the condition that contact is received from a rightful driver, and therefore release of a start-up locked state by a third party other than a rightful driver can be prevented.

Note that when the person who set the password remembers the password, there is no need to contact the manager, and by performing an operation to input the correct password on the movable body 31 side, the start-up locked state can be released.

A second invention is a movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative;

start-up lock releasing means for releasing the state of halted operations on the condition that a password is inputted and the inputted password matches a set specific password; and setting means for inputting and setting the specific password, and wherein:

data for the specific password set by the setting means are transmitted from the movable body side to the terminal device;

the terminal device manages this transmitted specific password, and the movable body uses the specific password managed by the terminal device as a password for releasing the start-up lock releasing means.

According to the second invention, as is illustrated in FIG. 42, a specific password for releasing the start-up lock setting means 830 is inputted and set by a driver. The data for this specific password are then transmitted from the movable body 31 via the communication means 1 (see FIG. 1) to the terminal device 11 on the manager side.

The transmitted specific password is managed in the terminal device 11. When a rightful driver forgets the password or hands over to another driver after the specific password has been set, the driver contacts the manager on the terminal device 11 side. Alternatively, the driver transmits data for the specific password to a terminal provided on the movable body 31 side. In so doing, only a rightful driver is provided with the specific password.

The driver who has been provided with the specific password performs an operation to input the correct password on the movable body 31 side, whereby the state of halted operations (start-up locked state) in the movable body 31 is released.

According to the second invention as described above, the manager provides a password set by a driver in the movable body 31 only to a rightful driver in order to release the movable body 31 from a start-up locked state, and as a result, the release of a start-up locked state by a third party other than a rightful driver can be prevented.

A third invention is a movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative; and start-up lock releasing means for releasing the state of halted operations on the condition that a password is inputted and the inputted password matches a password for release, and wherein:

data indicating a state of halted operations are transmitted from the movable body side to the terminal device when the movable body is placed in a state of halted operations by the start-up lock setting means;

a specific password is set and data for this set specific password are transmitted to the movable body when the terminal device receives the data indicating the state of halted operations; and the movable body uses this transmitted specific password as a password for releasing the start-up lock releasing means.

According to the third invention, as is illustrated in FIG. 42, a driver sets the movable body 31 into a state of halted operations (a start-up locked state) using the start-up lock setting means 830. However, a password cannot be set on the movable body 31 side.

Data indicating that the movable body 31 has been set in a state of halted operations (a start-up locked state) are transmitted from the movable body 31 to the terminal device 11 on the manager side via the communication means 1 (see FIG. 1).

When the terminal device 11 receives the data indicating that the movable body 31 has been set in a state of halted operations (a start-up locked state), the terminal device 11 sets a specific password and transmits the set specific password to the movable body 31. The transmitted specific password is thereafter used as a password for releasing a state of halted operations (start-up locked state) in the movable body 31.

The manager informs only a rightful driver of the specific password set on the terminal device 11 side.

Having been informed of the specific password, the driver performs an operation to input the correct password on the movable body 31 side, thereby releasing the state of halted operations (start-up locked state) in the movable body 31.

According to the third invention as described above, provision is made such that even a rightful driver is unable to set a password at will, and such that the set password is altered every time start-up locking is performed. A start-up locked state in the movable body 31 is released only by the manager informing a rightful driver of the set password, and thus the release of a start-up locked state by a third party other than a rightful driver can be prevented.

A fourth invention is a movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative; and start-up lock releasing means for releasing the state of halted operations on the condition that a password is inputted and the inputted password matches a password for release, and wherein:

the terminal device sets a specific password and transmits data for this set specific password to the movable body; and the movable body uses this transmitted specific password as a password for releasing the start-up lock releasing means.

According to the fourth invention, as is illustrated in FIG. 42, a driver sets the movable body 31 into a state of halted operations (a start-up locked state) using the start-up lock setting means 830. It is assumed here that the driver has locked start-up by invalidating password setting.

The terminal device 11 sets a specific password and transmits the set specific password to the movable body 31. This transmitted specific password is thereafter used as a password for releasing the state of halted operations (start-up locked state) in the movable body 31. Hence thereafter, a start-up locked state in the movable body 31 is released on the condition that a password in inputted.

The manager informs only a rightful driver of the specific password set on the terminal device 11 side.

Having been informed of the specific password, the driver performs an operation to input the correct password on the movable body 31 side, thereby releasing the state of halted operations (start-up locked state) in the movable body 31.

According to the fourth invention as described above, even if a driver of the movable body 31 invalidates password setting, the manager is able to forcibly set a different password, and thus a high level of security can be maintained in the movable body 31.

A fifth invention is a movable body start-up locking device in which a movable body which is driven by a driver and which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative;

data input means for inputting driver identification data to identify a driver; and start-up lock releasing means for releasing the state of halted operations on the condition that a release permission command is inputted, and wherein:

when driver identification data are inputted into the data input means, these driver identification data and movable body identification data for identifying the movable body are transmitted from the movable body side to the terminal device; and when the terminal device receives the driver identification data and movable body identification data, the terminal device makes a judgment on the basis of the received driver identification data and movable body identification data as to whether or not the release permission command is to be transmitted, and transmits a release permission command to the movable body.

According to the fifth invention, as is illustrated in FIG. 42, a driver sets the movable body 31 into a state of halted operations (a start-up locked state) using the start-up lock setting means 830. However, a password cannot be set on the movable body 31 side. Further, driver identification data (user ID) for identifying a driver are inputted.

The driver identification data (user ID) and movable body identification data (vehicle ID) for identifying the movable body 31 are transmitted from the movable body 31 to the terminal device 11 on the manager side via the communication means 1 (see FIG. 1).

When the terminal device 11 receives the driver identification data (user ID) and movable body identification data (vehicle ID), the terminal device 11 makes a judgment on the basis of these data as to whether or not permission should be given to release the start-up locked state. If it is judged that permission will be given, a release permission command is transmitted to the movable body 31.

When the release permission command is received in the movable body 31, the state of halted operations (start-up locked state) in the movable body 31 is released.

According to the fifth embodiment as described above, a start-up locked state is released only when the manager gives permission therefor following a judgment on the manager side as to whether the driver and movable body are rightful. As a result, improper start-up can be prevented and a high level of security can be maintained in the movable body 31.

Also according to the fifth embodiment, driver identification data (user ID) are automatically transmitted from the movable body 31 side to the terminal device 11 on the manager side when the engine of the movable body 31 is started, and thus, by learning the history of these data, labor management can be performed accurately.

A sixth invention is the movable body start-up locking device according to the fifth invention, wherein, if the movable body is actually in operation when the release permission command has not been received, information corresponding thereto is transmitted from the movable body side to the terminal device.

According to the sixth invention, if the movable body 31 is actually in operation when the release permission command has not been received by the movable body 31, information corresponding thereto is transmitted from the movable body 31 side to the terminal device 11.

Thus the manager is able to obtain information stating that "movable body 31 is in actual operation (has been started) without permission from the manager), and may immediately take appropriate measures against this irregularity.

A seventh invention is a movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative;

start-up lock releasing means for releasing the state of halted operations on the condition that a password is inputted and the inputted password matches a set specific password; and setting means for setting the set password whenever the movable body is set to a state of halted operations by the start-up lock setting means, and wherein:

data for the specific password set by the setting means are transmitted from the movable body side to the terminal device;

the terminal device manages the transmitted specific password, and the movable body uses the specific password managed by the terminal device as a password for releasing the start-up lock releasing means.

According to the seventh invention, as is illustrated in FIG. 42, a specific password is automatically set whenever the movable body 31 is set to a state of halted operations (a start-up locked state) using the start-up lock setting means 830. The data for this specific password are transmitted from the movable body 31 to the terminal device 11 on the manager side via the communication means 1 (see FIG. 1).

The transmitted specific password is managed in the terminal device 11 and provided only to a rightful driver.

Having been informed of the specific password, the driver performs an operation to input the correct password on the movable body 31 side, thereby releasing the state of halted operations (start-up locked state) in the movable body 31.

According to the seventh embodiment as described above, provision is made such that even a rightful driver may not set a password at will, and such that the set password is altered every time start-up locking is performed. A start-up locked state in the movable body 31 is released only when the manager informs a rightful driver of the set password, and thus the release of a start-up locked state by a third party other than a rightful driver can be prevented.

BRIEF DESCRIPTION OF THE DRAWINGS

FIG. 13 is a view illustrating an embodiment in which a power saving operation is performed.

FIGS. 16(a), 16(b), 16(c), and 16(d) are views illustrating changes in the display mode of mobile body icons in accordance with the state of communication;

FIG. 17 is a view illustrating the arrangement of data in accordance with the state of communication;

FIG. 23 is a view illustrating changes in a power saving operation duty ratio;

FIG. 28 is a view illustrating an example of the display on the display screen of a terminal;

FIG. 30 is a view illustrating an example of the display on the display screen of a terminal;

FIG. 31 is a view illustrating an example of the display on the display screen of a terminal;

FIG. 32 is a view illustrating an example of the display on the display screen of a terminal;

FIG. 34 is a view illustrating an example of the display on the display screen of a terminal;

FIG. 36 is a view illustrating an example of the display on the display screen of a terminal;

FIG. 40 is a view illustrating an example of the display on the display screen of a terminal;

DESCRIPTION OF THE PREFERRED EMBODIMENTS

Embodiments of a management device for a mobile body according to the present invention will now be described with reference to the drawings. Note that in these embodiments, a system is envisaged for managing vehicles which serve as mobile work machines such as mobile work machines (moving machines used for work operations, including construction machines such as hydraulic shovels, bulldozers, and wheel loaders), mobile work machine carriers (such as trailers for transporting mobile work machines), service cars (moving vehicles for performing services such as maintenance or inspection), fuel or lubrication oil trucks, and parts-supplying vehicles.

Figure 1:
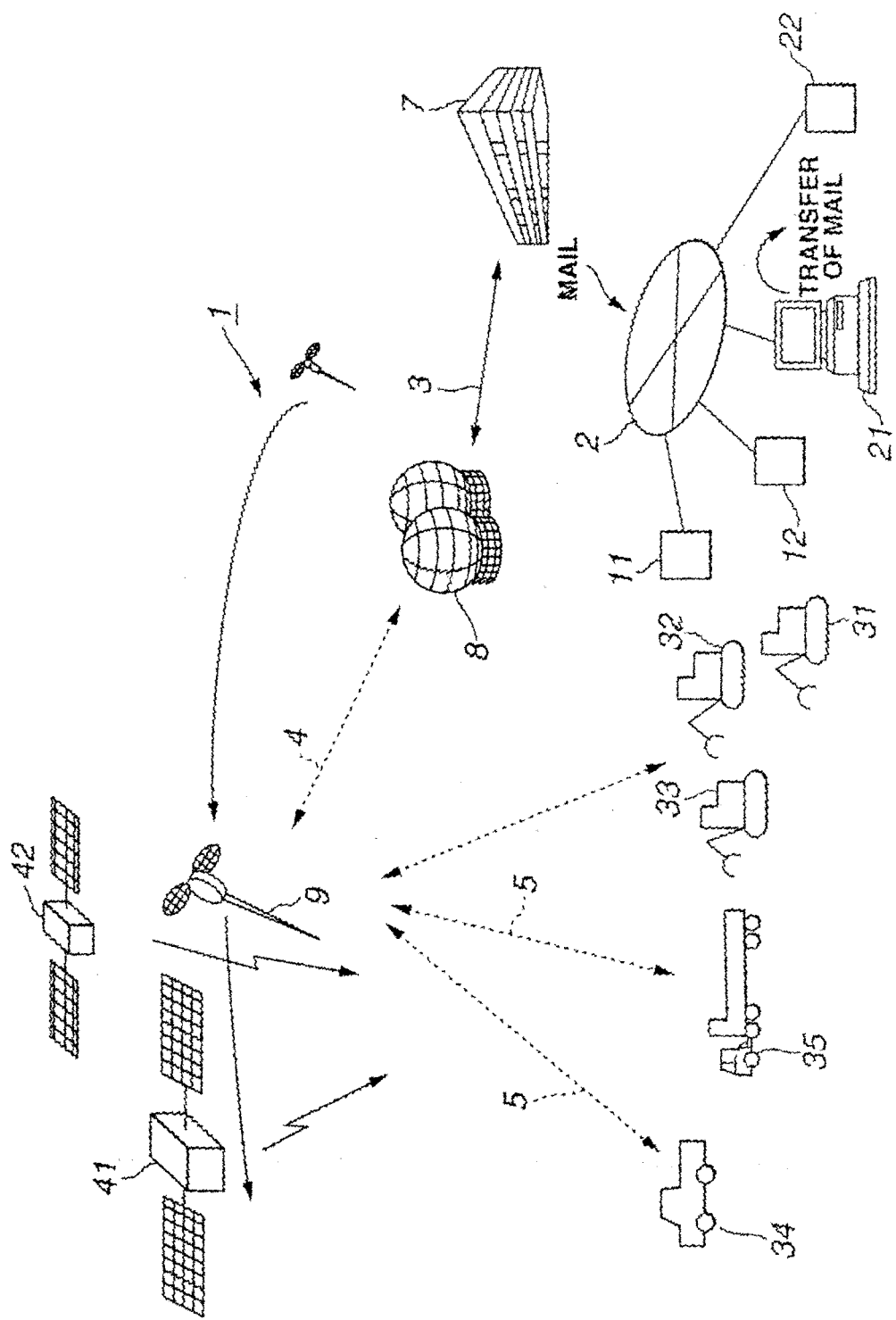
FIG. 1 is a view illustrating a communication system of this embodiment.

FIG. 1 illustrates the overall constitution of this embodiment.

In the system of this embodiment, as is illustrated in FIG. 1, a plurality of mobile bodies 31, 32, 33, 34, 35 and a plurality of terminals 11, 12, 21, 22 are connected by communication means 1 (the Internet 2, a network control station 7, a private line 3, a satellite earth station 8, a feeder line 4, a communication satellite 9, and wireless communication 5) so as to be capable of two-way transmission and reception.

Construction vehicles and the like are often rented and the precise operating location thereof is often unknown. Furthermore, these machines are sometimes taken overseas. In order to deal with this type of problem, a communication network is used in this embodiment which is capable of communication with any location on earth. Note that since the plurality of mobile bodies 31 to 35 often forms a group, the plurality of mobile bodies 31 to 35 may be communicably connected to each other using predetermined communication means.

The plurality of mobile bodies 31 to 35 comprises mobile work machines, or in other words construction machines 31, 32, 33 such as bulldozers, hydraulic shovels, or cranes, a service car 34 for performing services such as maintenance and inspection of these mobile work machines 31 to 33, and a mobile work machine carrier for transporting these mobile work machines 31 to 33, or in other words a trailer 35.

Terminals 11, 12 . . . are terminal devices (work stations) connected to the Internet 2. Specifically, a computer such as a personal computer is communicably connected to the Internet via a telephone line. Note that the Internet is a worldwide communication network in which a plurality of LANs (local area networks) are communicably connected to each other via gateways and bridges. The Internet 2 provides services such as WWW (world wide web: an Internet information search system) and E-mail (electronic mail: "letters" which are transmitted and received over the Internet).

The terminals 11, 12 . . . are provided in the office of an administrator who manages and monitors the plurality of mobile bodies 31 to 35, inside the service car 34, inside the mobile work machine transporter 35, in the office of a user of the mobile work machines 31 to 33, in the distribution outlet or sales office of the mobile work machines 31 to 33, and so on.

A terminal 21 is a server terminal provided for the terminals 11, 12 . . . , and is connected to the Internet 2. The server terminal 21 is provided with a database, or in other words storage means. Accordingly, the server terminal 21 provides the terminals 11, 12 . . . with the storage content of the database in response to requests from the terminals 11, 12.

A terminal 22 is a server terminal provided for terminals other than the terminals 11, 12 . . . .

The server terminals 21, 22 function as mail servers for providing an electronic mail service, and also function as HTTP (hypertext transfer protocol) servers for providing a WWW service. More specifically, the mail server performs processing for transmitting data transmitted from a request originator to a recipient specified by a mail address. The HTTP server displays the Web site page of a file which is described by HTML (hypertext markup language) on the display device of the terminal of the request originator in accordance with a request from the request originator. Web site pages (Internet information screens) are displayed using a WWW browser which is data display software. These electronic mail data and Web site data are stored in the database of the server terminals 21, 22.

The network control station 7 is communicably connected to the Internet 2.

The network control station 7 and satellite earth station 8 are communicably connected by the fixed private line 3. Data are transferred on this private line 3 at a communication speed of 64 kbps.

The satellite earth station 8 and communication satellite 9 are communicably connected by the wireless feeder line 4. Data are transferred on this feeder line 4 at a communication speed of 56 kbps.

The communication satellite 9 and the plurality of mobile bodies 31 to 35 are communicably connected by the wireless communication lines 5. Since mobile bodies such as construction machines often operate in mountainous areas, forested regions, remote areas, and so on, a communication satellite is used here for the purpose of wireless communication in order to ensure communication with the mobile bodies even in these mountainous areas which cannot be covered by ground wave communication. Also, if satellite communication is used, construction machines can be managed and tracked even when transported overseas.

Electronic mail on the Internet 2 is transmitted and received according to a communications protocol known as TCP/IP (transfer control protocol/Internet protocol). Electronic mail is transmitted and received over the private line 3, the feeder line 4, and the wireless communication line 5 in accordance with a different predetermined communications protocol. Protocol switching is performed by the network control station 7.

The position of the mobile bodies 31 to 35 is measured by GPS (global positioning system). 41 and 42 are GPS satellites constituting the GPS. More specifically, radio waves transmitted from the GPS satellites 41, 42 are received by a receiver installed in the mobile bodies 31 to 35, and on the basis of the time difference between the transmission time from the GPS satellites 41, 42 and the reception time at the receiver, a pseudo distance from the GPS satellites 41, 42 to the receiver is determined. By correcting this pseudo distance, a true distance is calculated, and from this true distance, a terrestrial two-dimensional position for the receiver (the mobile bodies 31 to 35) is measured.

Terminals 11, 12 and server terminals 21, 22 are provided with a computer input device (mouse, trackball, keyboard or the like), and are also provided with a display device constituted by liquid crystal, CRT or the like. The display screens of this display device will be described herein after.

Figure 2:
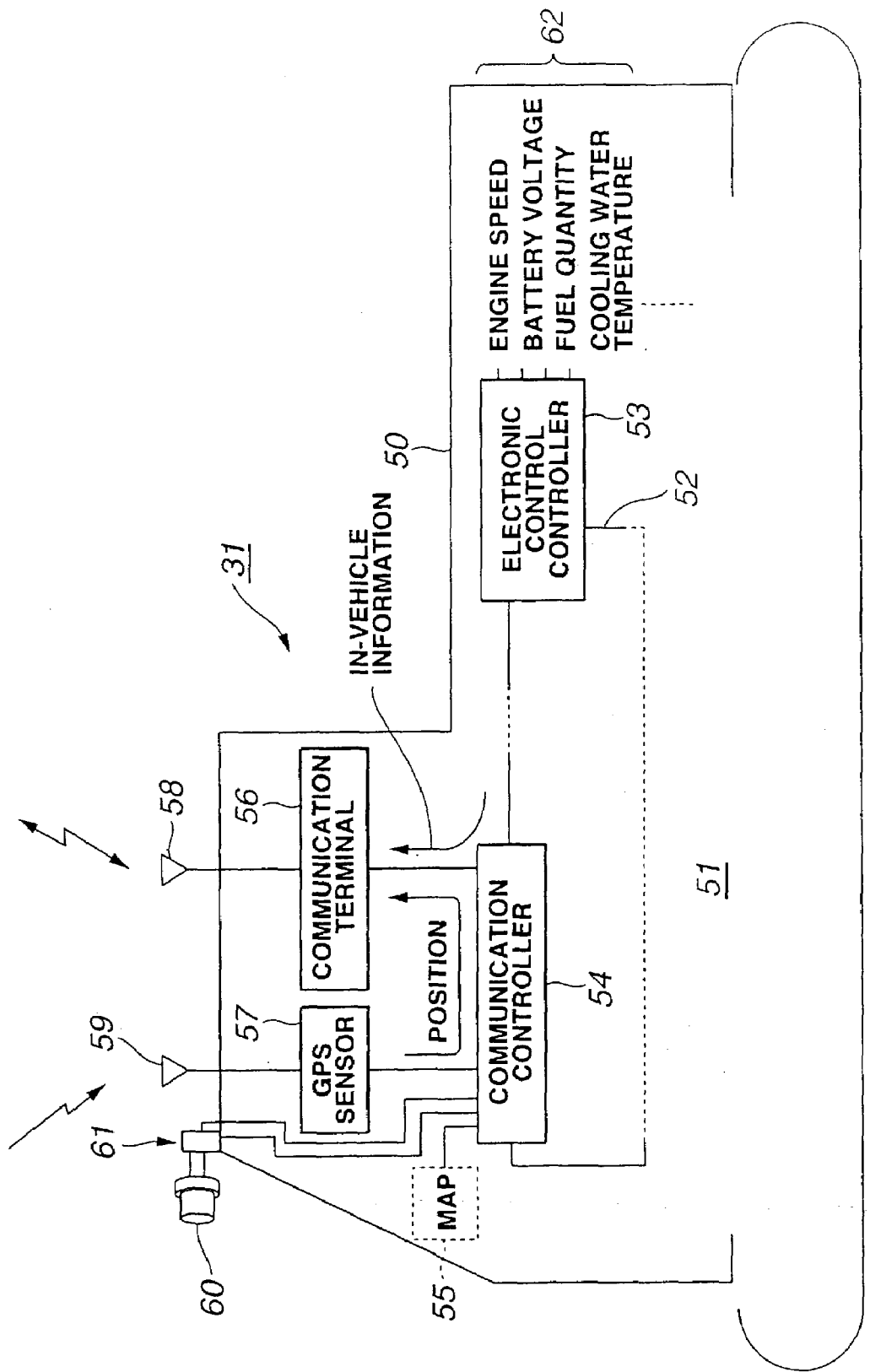
FIG. 2 is a view illustrating the constitution of the body of a mobile body of this embodiment.

FIG. 2 is a block diagram illustrating the constitution of the mobile bodies 31 to 35. The mobile work machine 31 is illustrated in FIG. 2 as a representative.

As is illustrated in FIG. 2, the interior of the vehicle body 50 of the mobile work machine 31 comprises: a satellite communication antenna 58 for transmitting and receiving data relating to electronic mail to and from the communication satellite 9; a communication terminal 56 for performing electronic mail transmission and reception processing with the communication satellite 9; a GPS antenna 59 for receiving radio waves transmitted from the GPS satellites 41, 42; a GPS sensor 57 for detecting the current position of the mobile work machine 31 on the basis of the radio waves received from the GPS satellites 41, 42; a camera 60 attached to the upper cabin portion of the vehicle body 50 for capturing images of the outside of the vehicle body 50; a camera driving mechanism 61 for driving the camera 60 to adjust the image-capture direction, zoom, and so on; a car navigation device 55, a communication controller 54 connected such that signal transfer is performed among the communication terminal 56, GPS sensor 57, camera 60, and car navigation device 55; and various controllers such as an electronic control controller 53 provided in various parts of the vehicle body 50. Note that a car navigation device is a device for displaying the current position of the vehicle in which the device is installed, detected by a GPS sensor, on a display screen map. The car navigation device 55 is provided in the service car 34 and the mobile work machine transporter 35. In this case, the car navigation device 55 functions as terminals 13, 14 which are equivalent to terminals 11, 12. Hence, as shall be described herein after, as well as the position of the vehicle in which the device is installed, the position of the mobile work machine which is to be subject to operation is also displayed on the display screen of the car navigation device 55 so as to set an efficient travel route to the operation subject.

The communication controller 54 and the various controllers such as the electronic control controller 53 are connected in a daisy-chain configuration by a signal line 52 to enable serial communication, and thus constitute an in-vehicle network 51.

More specifically, a frame signal of a predetermined protocol is transmitted over the signal line 52. When the frame signal is transmitted to the controllers 53, 54 . . . , a driving signal is outputted in accordance with data written in the frame signal to actuators (hydraulic pump, centrifugal spark advancer, control valve or the like) connected to the controllers 53, 54 . . . , whereupon these actuators are drive-controlled and detection data detected by sensors connected to the controllers 53, 54 . . . or data indicating information pertaining to the interior of these machines are obtained and written into the frame signal.

A group of sensors 62 for detecting information relating to the mobile body 31 (to be referred to as "mobile body information") such as engine speed, battery voltage, fuel quantity, cooling water temperature, or irregularity occurrence (error code) is connected to the electronic control controller 53. Hence data relating to the mobile body information detected by this sensor group 62 is written into the frame signal and the frame signal is thus transmitted to the communication controller 54 over the signal line 52.

Position data detected by the GPS sensor 57 and image data captured by the camera 60 are downloaded into the communication controller 54. A driving command in respect of the camera driving mechanism 61 is also generated by the communication controller 54, and by outputting this driving command to the camera driving mechanism 61, the camera driving mechanism 61 is operated and the image-capture direction and zoom of the camera 60 are adjusted. These position data for the mobile body 31, detected by the GPS sensor 57, and image data of the outside of the vehicle body 50, obtained by the camera 60, are included in the aforementioned "mobile body information".

The communication terminal 56 performs processing to interpret the content of an electronic mail received from terminals 11, 12 by the satellite communication antenna 58 to then create an electronic mail with content responding to the content of the request in the received electronic mail and transmit a reply to the electronic mail.

In other words, the mobile body information detected by the sensor group 62 of the electronic control controller 53 and the mobile body information detected by the GPS sensor 57 and captured by the camera 60 are transmitted from the communication controller 54 to the communication terminal 56 in accordance with the content of the request in the received electronic mail, and incorporated into an electronic mail reply.

Further, display data corresponding to operation instruction content in a received electronic mail are transmitted from the communication controller 54 to the car navigation device 55 and displayed on a display screen.

A mail address specifying the terminals 11, 12 is allocated to each of the terminals 11, 12. A mail address specifying the mobile bodies 31 to 35 is also allocated to each of the mobile bodies 31 to 35.

The content of electronic mails transmitted to the mobile bodies 31 to 35 from the terminals 11, 12 in accordance with the respective mail addresses of the mobile bodies 31 to 35 is stored in respective mailboxes in the server terminal 21. The mailbox for each of the mobile bodies 31 to 35 in the server terminal (mail server) 21 is searched, and data requesting that the electronic mail in the mailboxes be retrieved are transmitted to the corresponding mobile body 31 to 35. The mobile body 31 to 35 which receives these data transmits data to the server terminal 21 indicating that the electronic mail in the corresponding mailbox will be received. As a result, the electronic mail is transmitted to the mobile bodies 31 to 35 from the server terminal 21.

The content of electronic mails transmitted in reply to terminals 11, 12 from the mobile bodies 31 to 35 in accordance with the respective mail addresses of the terminals 11, 12 is likewise stored in mail boxes. In the server terminal (mail server) 21, the respective mail boxes of the terminals 11, 12 are searched, and data requesting reception of the electronic mail in the mail box are transmitted to the corresponding terminal 11, 12. The terminal 11, 12 having received these data transmits data to the server terminal 21 indicating that the electronic mail in the corresponding mailbox will be received. As a result, the electronic mail is transmitted from the server terminal 21 to the terminal 11, 12.

A communication state information extraction program for obtaining information regarding the transmission state of the electronic mail transmitted from the terminals 11, 12 to the mobile bodies 31 to 35 and the reply state of the electronic mail transmitted in reply from the mobile bodies 31 to 35 to the terminals 11, 12 is stored in the server terminal 21. By executing this communication state information extraction program, communication state information data are generated indicating current communication state information.

A mobile body information extraction program for searching the mail box of each of the terminals 11, 12 and extracting mobile body information from the content of electronic mail transmitted in reply to the terminals 11, 12 is also stored in the server terminal 21. By executing this mobile body information extraction program, all mobile body information data MD indicating the latest information regarding all of the mobile bodies are generated. These all-mobile body information data MD are data corresponding to the latest mobile body information for each of the mobile bodies 31 to 35.

Here, a Web site for managing and monitoring the mobile bodies 31 to 35 is created in the server terminal 21 and stored in the database as data with a predetermined link structure. Each of the display screens of this Web site are illustrated in FIGS. 27 through 32. Note that in this specification, a Web site is defined as a series of pages linked in succession to a leading page.

A Web site update-processing program is stored in the server terminal 21 for updating the data on a corresponding display screen of the Web site in accordance with the aforementioned communication state information data and all mobile body information data MD. By executing this Web site update processing program, the mobile body information on a corresponding display screen of the Web site is updated in accordance with the latest all mobile body information MD stored in the server terminal 21, and the communication state information on a corresponding display screen of the Web site is updated in accordance with the current communication state information stored in the server terminal 21. Note that in the case of time series data (the fuel quantity time series data shown in FIG. 29 and so on), the oldest data are deleted when the latest data are added.

Operations of this embodiment will now be described.

Terminal 11 is assumed to be a terminal provided on the administrator side of the mobile bodies 31 to 35, for example.

When the WWW browser in this terminal 11 on the administrator side is activated, Web site data are read from the server terminal 21 via the WWW browser and displayed on a display screen of the display device of terminal 11.

Figure 27:
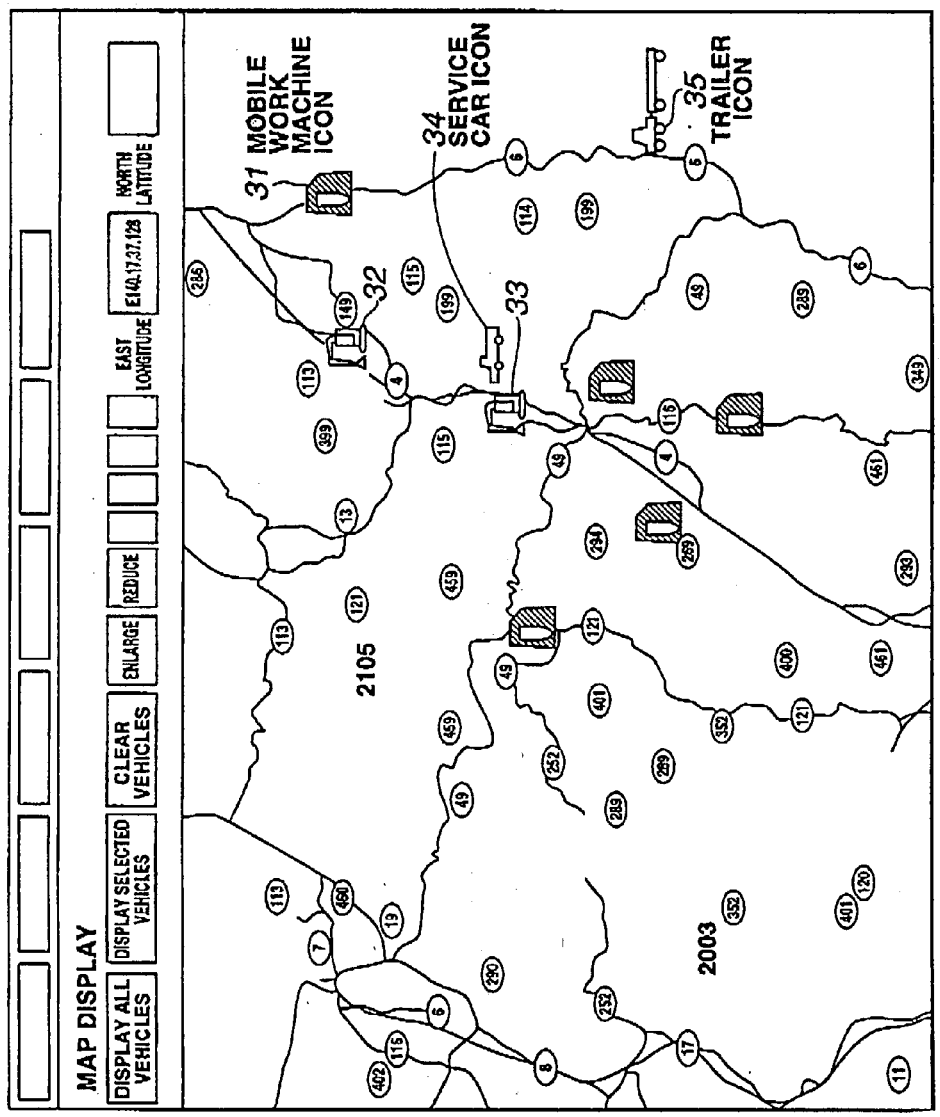
FIG. 27 is a view illustrating an example of the display on a display screen of a terminal.

FIG. 27 shows a map display screen from the Web site displayed on the display device of terminal 11. These map data are stored in the computer of terminal 11. As is illustrated in FIG. 27, icons (pictographic characters) specifying each of the mobile bodies 31 to 35 are overwritten onto the map and displayed. Since the types of mobile body 31 to 35 (bulldozer, hydraulic shovel, wheel loader, trailer, service car) are displayed by the icons, the mobile bodies 31 to 35 can be easily distinguished. The positions of the icons on the map are detected by the GPS sensor 57 in each of the mobile bodies 31 to 35 and correspond to the latest mobile body information stored in the database of the server terminal 21.

When an input operation (key operation, click operation or the like) to move the Web site display screen to the next display screen in sequence is performed on the input device of terminal 11, a sequential move from the current screen to the next display screen is performed. In this case, by performing a click input operation on the icon of the mobile body (for example the mobile work machine 31) to be displayed from among the icons of the mobile bodies 31 to 35 displayed on the display screen, a move to a display screen displaying detailed information pertaining only to the mobile work machine 31 to be displayed may be performed.

For example, FIG. 31 is a display screen displaying a list of information regarding all of the mobile bodies 31 to 35.

By performing a click input operation on the icon of the mobile body (for example the mobile work machine 31) for which display of detailed information is desired on the display screen illustrated in FIG. 31, a move to the display screen illustrated in FIG. 28 is performed, and the latest mobile body information related specifically to the mobile work machine 31 is displayed on the display screen. The display screen displaying detailed mobile body information for a specific mobile body, as shown in FIG. 28, may also be moved to by performing a similar operation on the map display screen of all of the mobile bodies 31 to 35, as shown in FIG. 27.

FIG. 28 illustrates a screen displaying the latest data for an individual machine type.

Figure 6:
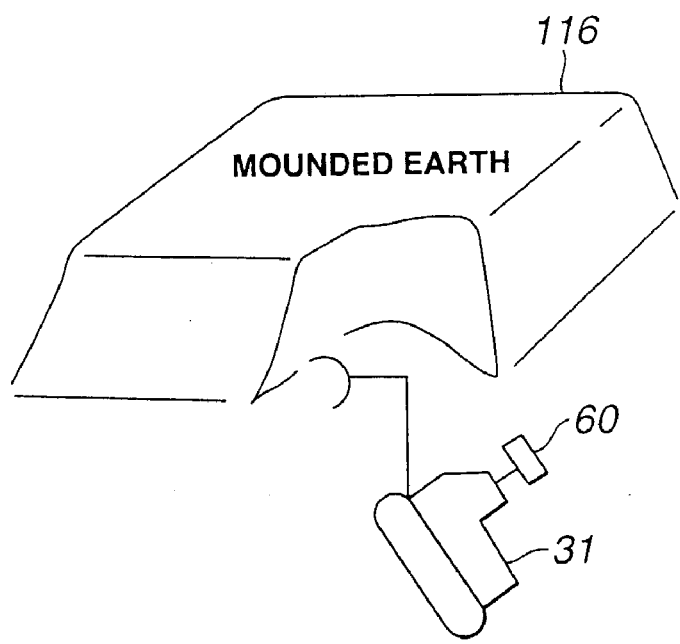
FIG. 6 is a view showing a working state of a mobile body installed with a camera.

As is illustrated in FIG. 28, mobile body information regarding a specific mobile body (for example the mobile work machine 31) such as current position, service meter value, fuel quantity, engine speed, engine cooling water temperature, battery voltage, discharge pressure of the hydraulic pump, oil quantity, irregularities (error codes), and images captured by the camera is displayed. In a case such as that shown in FIG. 6, for example, where the mobile operating device 31 is performing an excavation operation on a mounted earth 116, the state of excavation of the mounted earth 116 is captured by the camera 60. As a result, as is shown in FIG. 28, an image of the mounted earth 116 is displayed on the display screen of terminal 11. Thus the state of work progress of the mobile work machine 31 in a remote area can be grasped visually on terminal 11.

Figure 29:
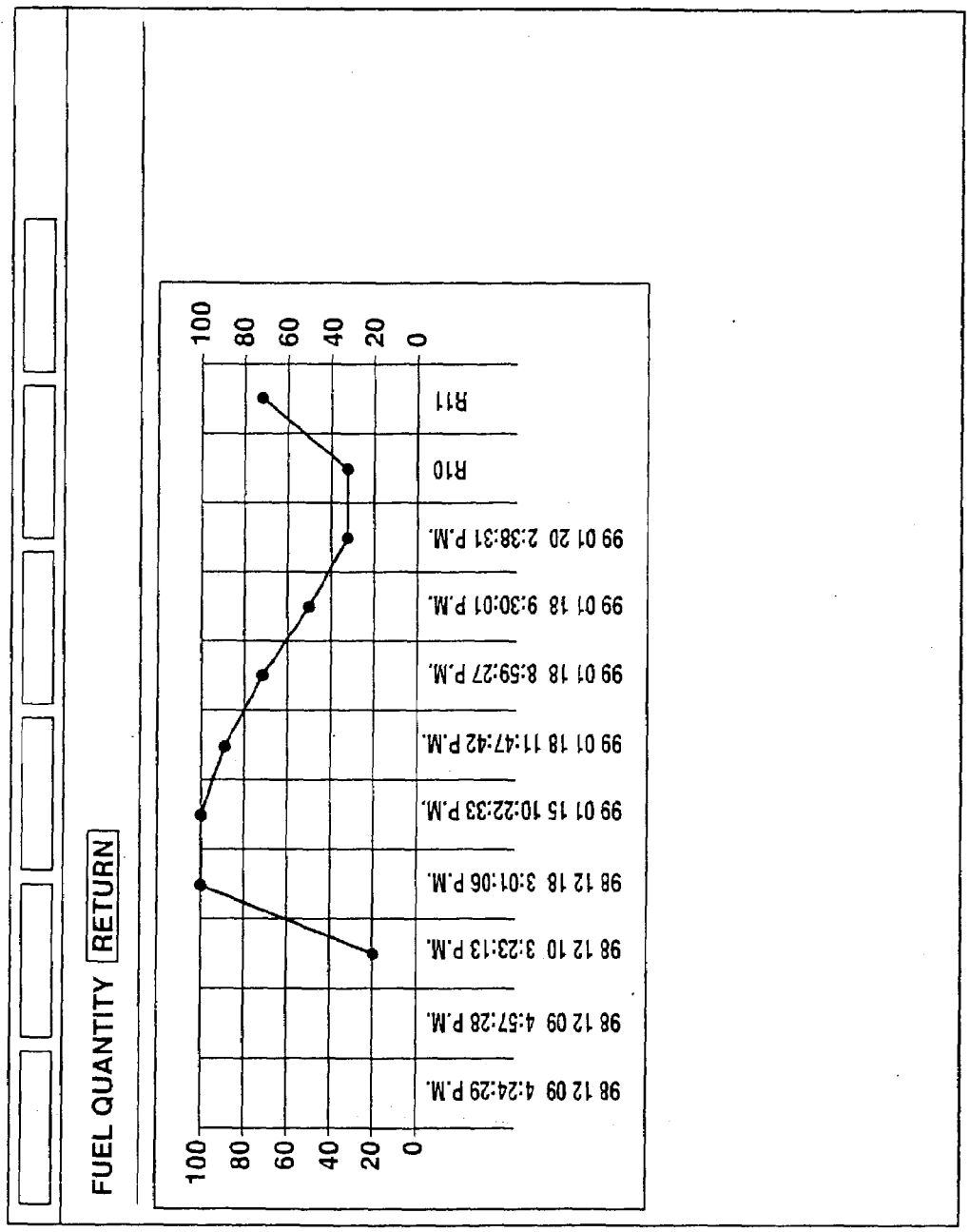
FIG. 29 is a view illustrating an example of the display on the display screen of a terminal.

When, on the display screen shown in FIG. 28, a click input operation is performed on a "graph" button for specific mobile body information to be displayed as time series data, for example fuel quantity, a display screen shown in FIG. 29 is moved to, and a graph illustrating time series changes in the fuel quantity is displayed on the display screen.

Further, when a click input operation is performed on an "operating map" button on the display screen in FIG. 28, the display screen shown in FIG. 30 is moved to and the operating time (engine operating time) of the mobile work machine 31 per day is displayed as a band graph. From the operating map shown in FIG. 30, an administrator is easily able to learn the operating efficiency (productivity) of the specific mobile work machine 31.

Time series data regarding the occurrence of irregularities (error codes) in the mobile work machine 31, that is the history of irregularity occurrence, can also be displayed on a display screen in a similar manner. Thus, by making a judgment from the past history of irregularity occurrence, appropriate measures can be taken in respect of newly-occurring irregularities. Further, since the content of an irregularity can be identified reliably and quickly on the terminal 11 side, measures can be taken using fewer people and without dispatching a specialist technician to the site.

Next, the content of processing for requesting the latest mobile body information regarding a specific mobile body from a display screen on the Web site of the terminal 11 will be described.

In this case, the icon of the mobile body (for example the mobile work machine 31) for which latest mobile body information is to be requested from among all of the mobile bodies 31 to 35 is clicked on the display screen shown in FIG. 31 or FIG. 27. In so doing, request recipient identification data D2 having the content "mobile body 31" are generated.

By then performing an input operation to move the display screen, the display screen moves to a request execution display screen shown in FIG. 32.

Then, a click operation is performed on an item to be requested from among the check boxes shown in FIG. 32 for each item of mobile body information, "vehicle position", "service meter", "fuel quantity", "work mode", "vehicle body alarm 1" (error code 1), "vehicle body alarm 2" (error code 2), "battery voltage", "engine water temperature", "engine speed", "pump pressure" . . . "oil quantity" . . . "camera image". In so doing, the mobile body information to be requested from among all of the mobile body information regarding the mobile work machine 31 (for example "vehicle position" and "fuel quantity") are selected, and requested information identification data D3 having the content "vehicle position" and "fuel quantity" are generated. Thus not only basic mobile body information for managing operating efficiency and so on, such as the vehicle position and the service meter, but also mobile body information which is necessary for maintenance and inspection, such as the fuel quantity or battery voltage, can be selected at will and requested through the input device of the terminal 11. Regarding the image-capture direction and zoom of the camera 60, the camera driving mechanism 61 can also be operated and adjusted by an input operation on the terminal 11.

However, as the amount of requested mobile body information increases, the data communication amount also increases, and as a result the communication fee rises. Hence, so that the requesting party on the terminal 11 side can learn the communication fee and take economy into consideration, the amount of data to be transmitted and received is displayed at the mobile body information item selection stage. Specifically, the numerical values of the "current byte count", "transmission bytes", "reception bytes", and "number of bytes charged for this month" are displayed. Note that the communication fee itself may be displayed instead of the communication data amount.

The display recipient terminal on which the mobile body information is to be displayed is clicked from the check boxes of the reply recipient terminals shown in FIG. 32, "administrator A (terminal 11)", "administrator B", "service car", "trailer (terminal 12)" . . . . In so doing, the display recipient terminal (for example terminal 12) is selected from each of the terminals 11, 12 . . . , and display recipient identification data D4 having the content "terminal 12" is generated. Terminal 12 is assumed to be the terminal provided on the side of the operator if the mobile work machine carrier (trailer) 35.

Figure 33:
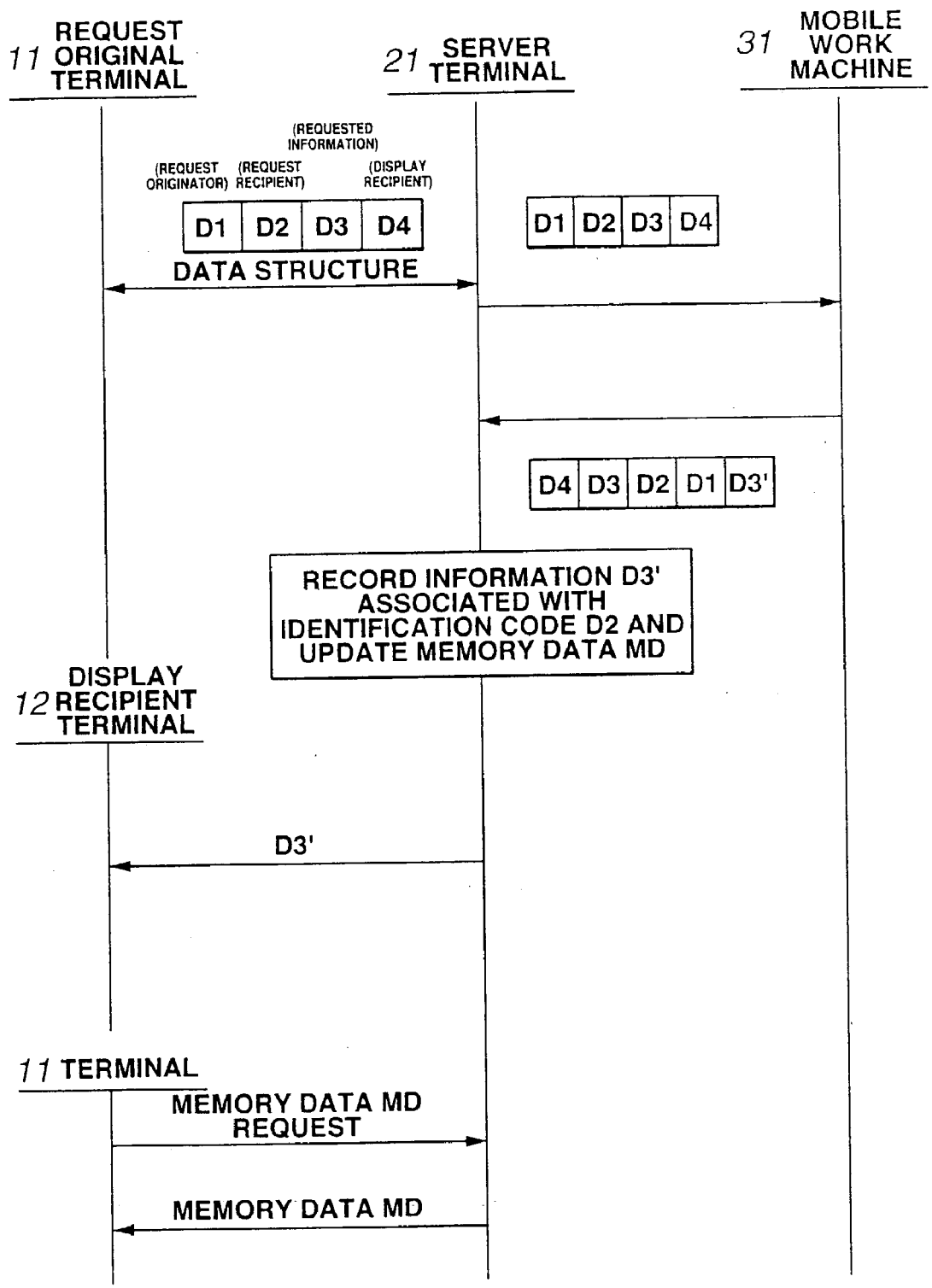
FIG. 33 is a sequence diagram illustrating a communication control processing sequence of an embodiment.

FIG. 33 shows a sequence diagram of a communication control processing sequence, which will now be described with reference to this diagram.

When the aforementioned data are inputted into the request original terminal 11, request originator identification data D1 indicating the request original terminal (terminal 11), request recipient identification data D2 indicating the request recipient mobile body (the mobile work machine 31), requested information identification data D3 indicating the content of the requested information (vehicle position, fuel quantity), and display recipient identification data D4 indicating the display recipient terminal (terminal 12) are transmitted from the terminal 11 to the server terminal 21 as an electronic mail consisting of data in accordance with the communication protocol in the Internet 2. Here, the request originator identification data D1 ("terminal 11") correspond to the mail address of the request original terminal 11. The display recipient identification data D4 ("terminal 12") correspond to the mail address of the display recipient terminal 12. Further, the request recipient identification data D2 ("mobile work machine 31") correspond to the mail address of the mobile work machine 31.

The server terminal 21 receives the transmitted electronic mail and reads the request recipient identification data D2, then stores the content of the electronic mail in the mailbox of the mobile work machine 31 which corresponds to the request recipient identification data D2 ("mobile work machine 31").

The server terminal (mail server) 21 transmits data to the mobile work machine 31 requesting that the electronic mail in the mailbox be retrieved. More specifically, a response request signal is transmitted to the mobile work machine 31 from the communication satellite 9 via the wireless communication line 5. Whether or not the transmission of this response request signal from the communication satellite 9 side to the mobile work machine 31 will be possible is often unclear due to the mobile work machine 31 being in an unfavorable environment for communication and so on, and therefore transmission is performed continuously. In relation thereto, the presence of a response request signal is checked intermittently from the mobile work machine 31 side to the communication satellite 9. Checks as to the presence of a response request signal are performed by sensing radio waves indicating a response request signal which are transmitted from the communication satellite 9. Hence a request can be reliably transmitted to the mobile work machine 31 from the communication satellite 9 side. These checks as to the presence of a response request signal (sensing of radio waves indicating a response request signal) are performed at the time of a specific event or after a predetermined time period has elapsed following the occurrence of a specific event.

For example, a check as to the presence of a response request signal may be performed when the start-up of the mobile work machine 31 engine is detected, with the corresponding detection signal as a trigger. In this case, a check as to the presence of a response request signal may be performed only when the engine is started for the first time in a day.

A check as to the presence of a response request signal may also be performed when the occurrence of an irregularity in the mobile work machine 31 is detected, with the corresponding detection signal as a trigger.

Also, a check as to the presence of a response request signal may be performed after a predetermined time period following the last transmission by the mobile work machine 31, whereupon the next transmission may be performed.

This specific event or predetermined time period may be modified at will. Modifications may be made by means of an input operation to the input device of the terminal 11.

When, as a result of a check as to the presence of a response request signal, it is determined that a response request signal is present, the mobile work machine 31 transmits data indicating reception of the electronic mail in its mail box to the server terminal 21 via the communication satellite 9. As a result, the electronic mail is transmitted from the server terminal 21 to the mobile work machine 31.

In other words, the electronic mail is transmitted via the Internet 2 to the network control station 7, and the data in the electronic mail are protocol converted. The protocol-converted electronic mail is then transmitted over the private line 3. The electronic mail is then transmitted to the mobile work machine 31 via the satellite earth station 8, the feeder line 4, the communication satellite 9, and the wireless communication line 5, and received by the satellite communication antenna 58 of the mobile work machine 31.

The communication terminal 56 of the mobile work machine 31 reads the requested information identification data D3 ("vehicle position", "fuel quantity") from the electronic mail received by the satellite communication antenna 58, and instructs the communication controller 54 to obtain from within the mobile work machine 31 the mobile body information corresponding to these requested information identification data D3, or in other words vehicle position data and fuel quantity data.

Having received this instruction, the communication controller 54 transmits the current vehicle position data detected by the GPS sensor 57 to the communication terminal 56. The "fuel quantity" data to be obtained by the electronic control controller 53 is written into a frame signal and transmitted over the signal line 52. The written content of the frame signal is read by the electronic control controller 53, whereupon detected data regarding the current fuel quantity are gathered from the sensor group 62 of the electronic control controller 53 and written into the frame signal. This frame signal is then transmitted to the communication controller 54 via the signal line 52. The fuel quantity data written into the frame signal are read by the communication controller 54 and transmitted to the communication terminal 56. The vehicle position data and fuel quantity data are then incorporated into an electronic mail reply in the communication terminal 56 as mobile body information data D3'.

Request recipient identification data D2 indicating the request recipient mobile body (the mobile work machine 31), reply recipient identification data D4 indicating the reply recipient terminal (terminal 12), and the mobile body information data D3' indicating the mobile body information (vehicle position data and fuel quantity data) are transmitted as an electronic mail reply consisting of data in accordance with a predetermined communication protocol from the communication terminal 56 to the communication satellite 9 via the satellite communication antenna 58. Note that D1 and D3 are transmitted simultaneously. D1 may be used as a key for dividing each communication fee billing recipient. D3 is used for identifying the content of D3'. Here, the request recipient identification data D2 ("mobile work machine 31") correspond to the mail address of the mobile work machine 31. The reply recipient identification data D4 ("terminal 12") correspond to the mail address of the display recipient terminal 12.

The electronic mail reply is received by the communication satellite 9 and transmitted to the network control station 7 via the feeder line 4, the satellite earth station 8, and the private line 3. The data in the electronic mail reply are protocol converted in the network control station 7, and the protocol converted electronic mail reply is transmitted over the Internet 2.

The server terminal 21 receives the transmitted electronic mail, reads the reply recipient identification data D4, and stores the content of the electronic mail in the mailbox of the terminal 12 which corresponds to the reply recipient identification data D4 ("terminal 12").

Then, the aforementioned mobile body information extraction program is executed such that the mobile body information data D3' ("vehicle position data", "fuel quantity data") and request recipient identification data D2 ("mobile work machine 31") are extracted from the content of the electronic mail stored in the mailbox of the terminal 12, whereupon the vehicle position data and fuel quantity data are stored in accordance with the address of the mobile work machine 31. Thus the content of the all mobile body information data MD is updated.

The server terminal (mail server) 21 transmits data to the terminal 12 requesting that the electronic mail inside the mailbox be retrieved. Having received this request, the terminal 12 transmits data to the server terminal 21 indicating that the electronic mail in the mailbox will be received. Thus the electronic mail is transmitted from the server terminal 21 to the terminal 12. Depending upon the security level of D4, the data to be transmitted may be restricted.

When the electronic mail is received by the terminal 12 on the operator side of the mobile work machine transporter 35, the request recipient identification data D2 (mobile work machine 31) and mobile body information data D3' (vehicle position data and fuel quantity data) are read from the data in the electronic mail. The content of the electronic mail, that is the current position and current fuel quantity of the mobile work machine 31, is then displayed on a display screen of the terminal 12.

Thus, from the display screen of the terminal 12, the operator of the transportation vehicle 35 is able to confirm the specific mobile work machine 31 designated for transportation by the administrator side, and can also learn the current position and current fuel quantity thereof, which are necessary to transport the mobile work machine 31. Furthermore, the operator on the terminal 12 side is able to obtain from the display screen of the terminal 12 only information which is necessary for the [transportation] operation, without performing an information request input operation. In other words, even when an operator who wishes to obtain information is in a situation wherein an input operation on the terminal 12 side cannot be performed, the information which is necessary for the operation can be obtained. As a result, an operation to transport the mobile work machine 31 can be performed with an extremely high level of efficiency.

Note that in the above-mentioned embodiment, information necessary for transportation is displayed on the operator side terminal 12 of the transportation vehicle 35 by performing a request input operation using the terminal 11 on the administrator side. However, information which is necessary for services such as maintenance and inspection may also be displayed on the terminal 12 of a service person who drives the service car 34 by performing a request input operation using the terminal 11 on the administrator side.

In this case, an electronic mail containing mobile body information comprising current position data, service data, and irregularity data for the mobile work machine 31 is similarly transmitted to the service person side terminal 12 from the terminal 11 on the administrator side via the mobile work machine 31.

When the electronic mail is received on the service person side terminal 12, request recipient identification data D2 (mobile work machine 31) and mobile body information data D3' (vehicle position data and irregularity data (error code)) are read from the data in the electronic mail. The content of the electronic mail, that is the current position and currently occurring irregularity item (error code) of the mobile work machine 31, is then displayed on a display screen of the terminal 12.

Thus the service person who drives the service car 34 is able to identify the specific mobile work machine 31 designated for service by the administrator side, and is also able to confirm the current vehicle position and currently occurring irregularity item (error code), which are necessary for servicing the mobile work machine 31, from the display screen of the terminal 12. Furthermore, the service person on the terminal 12 side is able to obtain from the display screen of the terminal 12 only the information which is necessary for the operation, without performing an information request input operation. In other words, even when the service person who wishes to obtain information is in a situation wherein an input operation on the terminal 12 side cannot be performed, the information which is necessary for the operation can be obtained. As a result, an operation to perform maintenance, inspections, and so on of the mobile work machine 31 can be performed with an extremely high level of efficiency.

Next, a case will be described in which the administrator side terminal is the server terminal 21.

In this case, information necessary for consolidating management of a plurality of mobile bodies may be displayed on the server terminal 21 on the administrator side by performing a request input operation using the terminal 12 on the side of the service person who drives the service car 34. When a service person refills the oil in the mobile work machine 31, for example, the service person him/herself determines on site whether the oil has been sufficiently refilled, and there is therefore no need to reconfirm this on a display screen of the terminal 12. There is, however, a need to provide information to the administrator side indicating that the oil refill operation is complete and so that the time of the next oil refill can be managed.

In this case also, an electronic mail having as mobile body information current oil quantity data for the mobile work machine 31 is similarly transmitted to the server terminal 21 from the terminal 12 on the service person side via the mobile work machine 31.

When the electronic mail is received by the server terminal 21, the request recipient identification data D2 (mobile work machine 31) and mobile body information data D3' (oil quantity data) are read from the data in the electronic mail. The content of the electronic mail, that is the current oil quantity of the mobile work machine 31, is then displayed on a display screen of the server terminal 21.

Thus the administrator is able to identify the specific mobile work machine 31 for which oil refill service is complete, and is also able to confirm the current oil quantity necessary for management of this mobile work machine 31, from the display screen of the server terminal 21. Furthermore, the administrator on the server terminal 21 side is able to obtain from the display screen of the server terminal 21 only the information which is necessary for management, without performing an information request input operation. In other words, even when the administrator who wishes to obtain information is in a situation wherein an input operation on the server terminal 21 side cannot be performed, the information which is necessary for the management of the mobile bodies can be obtained. As a result, consolidated management operations for the mobile bodies 31 to 35 can be performed with an extremely high level of efficiency.

In the above-mentioned embodiment, the request original terminal and the display recipient terminal are different, but the request original terminal and display recipient terminal may be the same.

For example, by performing a request input operation using the terminal 11 on the side of the operator of the mobile work machine 31, information necessary for an initial inspection can be displayed on the same terminal 11. The operator of the mobile work machine 31 performs this request input operation using the terminal 11 in an office before boarding the vehicle.

In this case also, an electronic mail having current fuel quantity data and oil quantity data for the mobile work machine 31 as mobile body information is similarly transmitted to the terminal 11 from the terminal 11 via the mobile work machine 31.

When the electronic mail is received by the terminal 11, request recipient identification data D2 (mobile work machine 31) and mobile body information data D3' (fuel quantity data and oil quantity data) are read from the data in the electronic mail. The content of the electronic mail, that is the current fuel quantity and oil quantity of the mobile work machine 31, is displayed on a display screen of the terminal 11.

Thus the operator of the mobile work machine is able to confirm the current fuel quantity and oil quantity, which are necessary for an initial inspection of the specific mobile work machine 31 which is to be boarded, from the display screen of the terminal 11. In this case, the operator on the terminal 11 side may obtain in advance from the display screen of the terminal 11 only the information which is necessary for an initial inspection without actually approaching the mobile work machine 31. As a result, an initial inspection of the mobile work machine 31 can be performed easily and efficiently, and defects discovered during the initial inspection can be dealt with in advance.

Likewise, by performing a request input operation using the terminal 11 on the side of the operator of the mobile work machine transporter 35, information necessary for a transportation operation can be displayed on the same terminal 11. As a result, the operator of the mobile work machine transporter 35 is able to confirm from the display screen of the terminal 11 the mobile body information (current position, current fuel quantity, and so on) which is necessary for the transportation of the specific mobile work machine 31 to be transported. In this case, the operator on the terminal 11 side may obtain in advance from the display screen of the terminal 11 only the information which is necessary for a transportation operation without actually approaching the mobile work machine 31. As a result, a transportation operation of the mobile work machine 31 can be performed easily and efficiently, and defects can be dealt with in advance.

Likewise, by performing a request input operation using the terminal 11 on the side of the service person who drives the service car 34, information necessary for services such as maintenance and inspection can be displayed on the same terminal 11. As a result, the service person who drives the service car 34 may confirm from the display screen of the terminal 11 the mobile body information (current position, irregularity occurrence, service meter) necessary for performing services on the specific mobile work machine 31 to be serviced. In this case, the service person on the terminal 11 side may obtain in advance from the display screen of the terminal 11 only the information which is necessary for performing services without actually approaching the mobile work machine 31. As a result, the mobile work machine 31 may be serviced easily and efficiently and defects may be dealt with in advance. In other words, irregularities can be identified before actually approaching the mobile work machine 31, and thus parts can be ordered, assistance can be requested, and repair methods can be investigated efficiently.

Also according to this embodiment, an effect is obtained wherein the latest all mobile body information MD relating to the plurality of mobile bodies 31 to 35, which has been updated in accordance with request input operations from the plurality of terminals 11, 12 . . . , can be displayed on an arbitrary terminal (for example terminal 11). This will now be explained with further reference to FIG. 33.

As described above, when an electronic mail reply is transmitted to the server terminal 21 from the mobile work machine 31, the mobile body information extraction program is executed in the server terminal 21, whereupon the mobile body information data D3' ("vehicle position data", "fuel quantity data") and the request recipient identification data D2 ("mobile work machine 31") are extracted from the content of the electronic mail which has been stored in the mailbox of the display recipient terminal 12, and the latest vehicle position data and fuel quantity data are stored in correspondence with the address of the mobile work machine 31. As a result, the content of the all mobile body information data MD is updated. The Web site update processing program is then executed in the server terminal 21, whereupon the mobile body information on the appropriate display screen of the Web site is updated in accordance with the latest all mobile body information MD stored in the server terminal 21. As for time series data (such as the fuel quantity time series data shown in FIG. 29), the oldest data are deleted as the latest data are added.

Then, when the WWW browser is activated by the terminal 11, the updated Web site data are read from the server terminal 21 via the WWW browser. Thus the mobile body information updated to the latest all mobile body information MD is displayed on a display screen of the terminal 11. In other words, when an input operation to request the latest all mobile body information MD is received by the server terminal 21 from the terminal 11, the latest all mobile body information MD is displayed on a display screen of the terminal 11.

It is assumed here that the display shown in FIG. 27 is displayed on the terminal 11.

The icon of the mobile work machine 31 on the map shown in FIG. 27 is then switched to and displayed in a position on the map in accordance with the latest (current) vehicle position data.

If a move is made to the display screen shown in FIG. 28, the display of the numerical values of the "position data" and "fuel quantity" on the screen are switched respectively to the latest (current) vehicle position data numerical value and fuel quantity data numerical value. If a move is made to the display screen shown in FIG. 29 or FIG. 30, the display of the fuel quantity time change graph or the operating map is switched to the latest version thereof.

Thus, according to this embodiment as described above, the latest all mobile body information MD relating to the plurality of mobile bodies 31 to 35, which has been updated in accordance with a request input operation from the plurality of terminals 11, 12 . . . , can be displayed on a display screen of the desired terminal 11. As a result, the latest mobile body information regarding the plurality of mobile bodies 31 to 35 can be obtained on a desired terminal, with the effect that all of the mobile bodies may be managed and monitored. In other words, the latest mobile body information relating to the plurality of mobile bodies 31 to 35, which is requested by a plurality of requesting parties, can be managed in consolidation on a desired terminal.

In this embodiment, a database is provided for each of the server terminals 21, 22, and the all mobile body information MD is stored individually. Thus, by transferring the data (all mobile body information MD) stored in the database of one of the server terminals to the database of the other server terminal, the all mobile body information can also be used in the database of the other server terminal, and the storage content (all mobile body information MD) of the database in each of the server terminals can be made the same. Specifically, this is achieved by means of a method in which an electronic mail received in reply by one of the server terminals (in which mobile body information is written) is automatically transferred to the other server terminal.

As noted above, the service car 34 is installed with a terminal 13 which is identical to terminal 11 and terminal 12, and the function of the car navigation device 55 is incorporated into and operates in the terminal 13.

An embodiment in which work instruction data are transmitted to the terminal 13 provided in the service car 34 from the terminal 11 on the administrator side such that work instructions are provided to a service person will now be described. A service person often performs work such as repairs, parts exchange, inspections, and so on outside and therefore has few opportunities for direct contact with the administrator. By using the system in this embodiment, there are no limitations upon the time and place of work instruction reception, and hence work instructions can be received efficiently.

As illustrated in FIG. 33, an electronic mail to which are attached data setting the terminal 13 installed in the service car 34 as the display recipient terminal (display recipient identification data D4), data setting the mobile work machine 31 as the request recipient mobile body (request recipient identification data D2), and data indicating a message "malfunction E has occurred, proceed immediately to site" is transmitted from the terminal 11 on the administrator side. Here, the message data "malfunction E has occurred, proceed immediately to site" are attached to the electronic mail by means of an input operation on the input device of the terminal 11.

Figure 3:
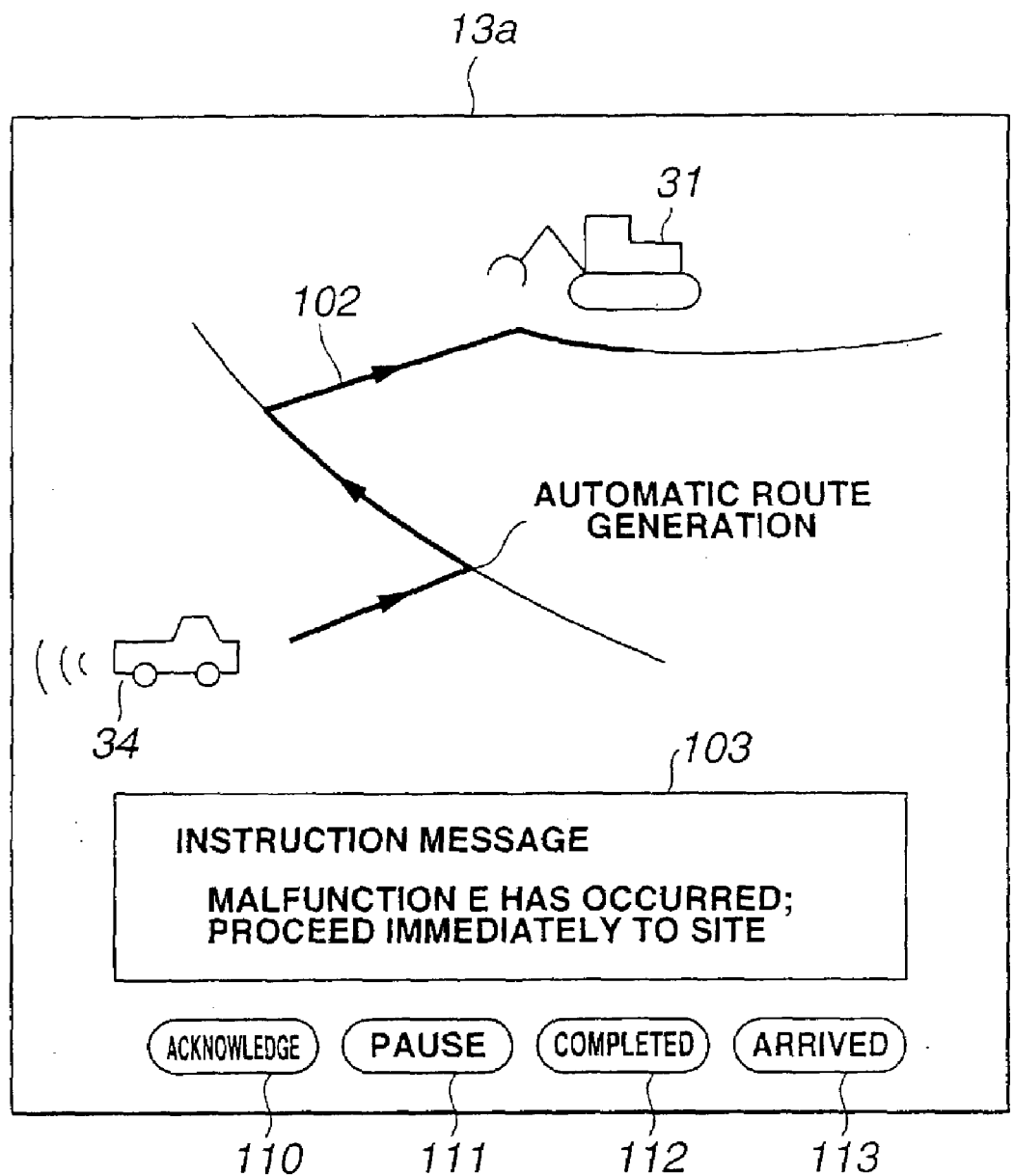
FIG. 3 is a view illustrating an example of a screen display on a display device installed in the mobile body.

Thus, as is illustrated in FIG. 3, an icon of the mobile work machine 31 subject to service and an icon of the service car 34 itself are displayed on a map on a display screen 13a on the terminal 13 of the service car 34, which is the display recipient terminal, in the latest (current) positions thereof. Note that the current position of the vehicle 34 itself is detected by the GPS sensor 57 installed in the vehicle 34 itself and displayed on the screen 13a. Also, the message transmitted in the electronic mail ("instruction message: malfunction E has occurred, proceed immediately to site") is displayed on a message portion 103 of the terminal 13 display screen.

As a result, the service person driving the service car 34 is able to confirm from the display screen 13a that the next service subject (recipient) is the mobile work machine 31, the current position thereof, and is able to read a message relating to the work content. An automatic route generation program is stored in the terminal 13. When this automatic route generation program is provided with the current position and recipient (current position of the mobile work machine 31) of the vehicle 34, processing is performed to automatically generate the shortest route on the map. Thus, when this automatic route generation program is executed, the shortest route 102 from the current position of the vehicle 34 itself to the current position of the mobile work machine 31 which is the recipient is displayed on the display screen 13a of the terminal 13.

As a result, the service person can drive the service car 34 in accordance with the display screen 13a of the terminal 13 and perform work at the recipient.

If the work according to the content of the work instruction is possible, an "OK" button 110 on the display screen 13a is clicked. When the service car 34 arrives at the recipient and begins work, an "arrived" button 113 on the display screen 13a is clicked. When the service work on the mobile work machine 31 is complete, a "complete" button 112 on the display screen 13a is clicked. Further, when the work in accordance with the content of the work instruction cannot be accepted due to certain circumstances, a "halt" button 111 on the display screen 13a is clicked. The input operation content of these clicking operations on the terminal 13 is transmitted from the terminal 13 to the terminal 11 on the administrator side as an electronic mail. When this electronic mail is received by the terminal 11, the state of work progress on the service car 34 can be learned. Note that a voice input operation may be employed instead of a touch operation such as a click operation, key operation, or panel touch operation.

Thus services such as maintenance and inspection are performed with an extremely high level of efficiency. Particularly according to this embodiment, the latest position of the mobile work machine 31 is displayed on the display screen 13a, and thus the vehicle 34 can be driven reliably without losing the way even when the service subject 31 is in motion on a work site.

In the above-mentioned embodiment, an electronic mail indicating the terminal 13 of the service car 34 as the display recipient terminal is transmitted from the administrator side terminal 11 and the content shown in FIG. 3 is displayed on the terminal 13. However, the content of FIG. 3 may also be displayed on the terminal 13 according to the following sequence:

1) An electronic mail in which the terminal 11 is set as the display recipient terminal (display recipient identification data D4) and the mobile work machine 31 is set as the request recipient mobile body (request recipient identification data D2) is transmitted from the administrator side terminal 11. As a result the latest position of the mobile work machine 31 is obtained on the terminal 11.

2) An electronic mail in which the current position of the mobile work machine 31, obtained as described above, and the message "malfunction E has occurred, proceed immediately to site" are set as work instruction data is transmitted from the terminal 11 to the terminal 13.

The content of FIG. 3 may also be displayed on the terminal 13 according to the following sequence:

1) Message data "malfunction E has occurred, proceed immediately to site" are transmitted from the terminal 11 to the terminal 13 as an electronic mail.

2) The WWW browser in the terminal 13 is activated, and the updated Web site data are read from the server terminal 21 via the WWW browser. In so doing, the latest position of the mobile work machine 31 is displayed on a display screen of the terminal 13 as the latest all mobile body information MD.

The content of the work instruction data transmitted from the administrator side terminal 11 and indicating the mobile body position and work content is arbitrary. For example, the work content of one day may be instructed as work content. In this case, when the operating map (FIG. 30) of the service car 34 is requested of the server terminal 21 by the administrator side terminal 11, the operating efficiency of the service car 34 for one day may be learned. Thus, by comparing the operating efficiency of one day and the work content for one day instructed from the administrator side to the service car 34 side, a daily work report can be created automatically and accurately.

Further, the position of another service car 34' may be transmitted from the administrator side terminal 11 to the terminal 13 of the service car 34 as well as the position of the service subject (the position of the mobile work machine 31). In so doing, the position of another service car 34' is displayed on the display screen 13a of the terminal 13 on the service car 34 side, and as a result movement toward and contact with this service car 34' becomes easy and service operations can be performed even more efficiently. In other words, tools, exchange parts and the like may be borrowed from the other service person and requests for assistance may be made. Moreover, if the other service person is highly skilled, consultations and the like may also be conducted.

Further, in the above-mentioned embodiment, data for the position of one mobile work machine 31 are transmitted from the administrator side terminal 11 to the terminal 13 of the service car 34, but the positions of a plurality of mobile work machines 31A, 31B, 31C, 31D may be transmitted such that a service patrol through the plurality of mobile work machines 31A to 31D may be performed efficiently.

In this case, work instruction data having as content the current positions of the plurality of mobile work machines 31A to 31D and service meter increase values ("3H", "678H", "10H", "500H") for each of the mobile work machines 31A to 31D from the previous patrol to the present time are transmitted to the terminal 13 of the service car 34.

Figure 5:
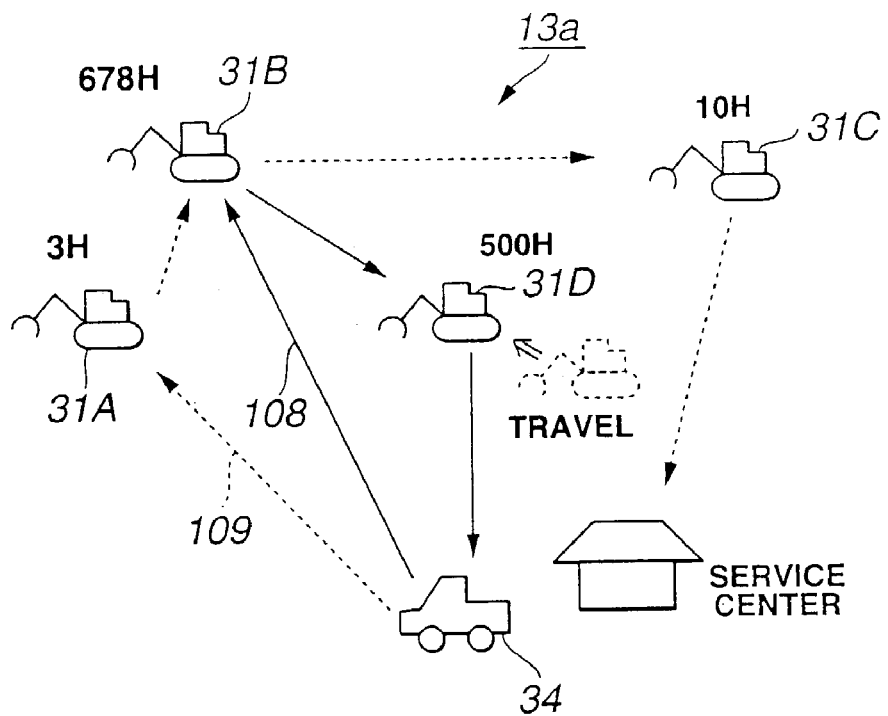
FIG. 5 is a view illustrating an example of a screen display on a display device installed in the mobile body.

Thus, as is illustrated in FIG. 5, icons showing the current position of each of the mobile work machines 31A to 31D and the service meter increase value for each of the mobile work machines 31A to 31D are displayed on a map on the display screen 13a of the terminal 13 in the service car 34. If, for example, the mobile work machine 31D has moved from its previous position (shown by the broken line), its current position (shown by the solid line) is displayed on the map on the screen 13a.

An automatic patrol route generation program is also stored in the terminal 13. When this automatic patrol route generation program is provided with the current position of the vehicle 34 itself and a plurality of patrol candidate sites (the mobile work machines 31A through 31D), only the patrol candidate sites with service meter increase values which are larger than a set value are selected, whereupon processing is performed to automatically generate the most efficient patrol route through these selected patrol candidate sites. Thus, when the automatic route generation program is executed, a patrol route 108, shown by a solid line, from the current position of the vehicle 34 through the mobile work machines 31B, 31D having large service meter increase values ("678H", "500H") and back to the original position of the vehicle 34 is displayed on the display screen 13a of the terminal 13.

Thus if a service person performs work at each of the patrol sites by driving the service car 34 along the patrol route 108 shown by the solid line in accordance with the display screen 13a of the terminal 13, a service patrol can be performed with an extremely high level of efficiency. Conventionally, as is illustrated by the broken line in FIG. 5, a patrol route 109 passing through all of the mobile work machines 31A to 31D is set uniformly after a fixed time period following the previous service patrol, and thus work is performed on all of the vehicles. According to this embodiment, however, work is performed along the patrol route 108 which bypasses the mobile work machines 31A, 31C in which operating time has not advanced since the previous service patrol (service meter increase values "3H", "10H"), and thus meaningless work can be avoided.

Note that the patrol route 108 shown by the solid line in FIG. 5 may be set according to a judgment made by the service person rather than being automatically generated.

Further, in the above-mentioned embodiment, work instruction data are transmitted from the administrator side terminal 11 to the terminal 13 installed in the service car 34. However, the work instruction data may be transmitted from the administrator side terminal 11 to the terminal 14 installed in the mobile work machine transporter 35 such that transporting and loading work is performed efficiently.

In this case, an electronic mail comprising data for the current position of the mobile work machine 31 which is the loading point, the position of a drop-off point 106 at which the loaded vehicle is to be dropped off, and a message "return as soon as finished", is transmitted to the terminal 14 of the mobile work machine transporter 35.

Figure 4:
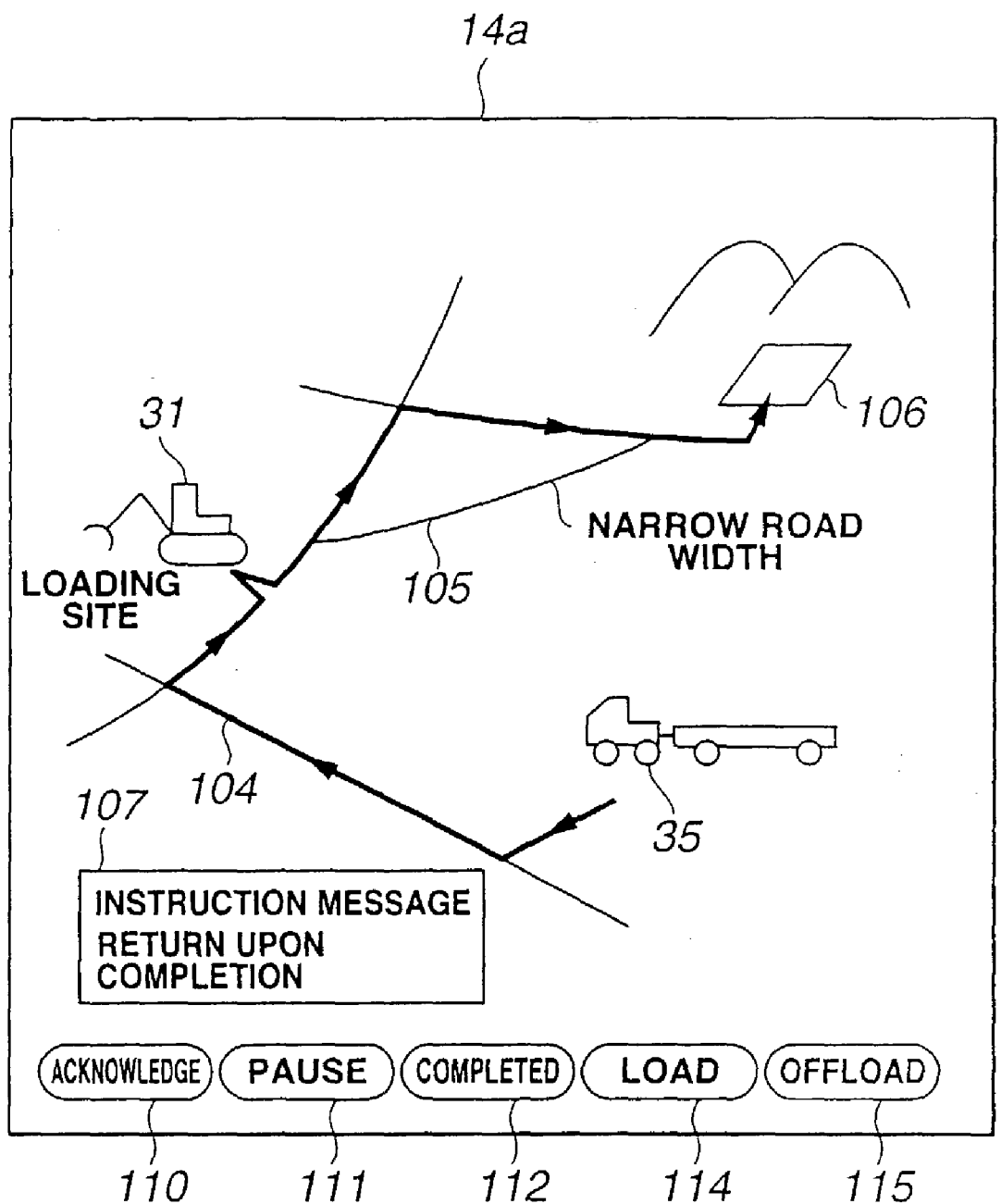
FIG. 4 is a view illustrating an example of a screen display on a display device installed in the mobile body.

Accordingly, the current position of the mobile work machine 31 and the position of the drop-off point 106 are displayed as icons on a map of a display screen 14a of the terminal 14 in the transporter 35, as is illustrated in FIG. 4. Note that the current position of the vehicle 35 is detected by the GPS sensor 57 installed in the vehicle 35 and displayed on the screen 14a. Also, the message transmitted in the electronic mail ("instruction message: return as soon as finished") is displayed on a message portion 107 of the terminal 14 display screen. Thus the operator of the transporter 35 can confirm that the next transportation subject is the mobile work machine 31, the current position thereof, the point at which the vehicle is to be dropped off, and the specific work content from the display screen 14a.

An automatic transportation route generation program is also stored in the terminal 14. Processing is performed by this automatic transportation route generation program to automatically generate the shortest transportation route from the current position of the vehicle 35 to the loading point 31 and then to the drop-off point 106, selecting only roads which are wide enough for the vehicle 35 to pass through. Thus, when the automatic transportation route generation program is executed, a shortest transportation route 104 from the vehicle 35 via the mobile work machine 31 to the drop-off point 106, avoiding a road 105 which is too narrow for the vehicle 35 to pass through, is displayed on the display screen 14a of the terminal 14.

Here, if work in accordance with the content of the work instruction is possible, an "OK" button 110 on the display screen 14a is clicked. When the transporter 35 arrives at the loading point 31 and begins loading work, a "loading" button 114 on the display screen 14a is clicked. When the transporter 35 arrives at the drop-off point 106 and begins drop-off work, a "drop-off" button 115 on the display screen 14a is clicked. When the transporter 35 has completed loading and transportation (drop-off) work, a "complete" button 112 on the display screen 14a is clicked. If, due to certain circumstances, work in accordance with the content of the work instruction cannot be accepted, a "halt" button 111 on the display screen 14a is clicked. The input operation content of these clicking operations on the terminal 14 is transmitted from the terminal 14 to the terminal 11 on the administrator side as an electronic mail. When this electronic mail is received in the terminal 11, the state of work progress of the transporter 35 can be learned. Note that a voice input operation may be employed instead of a touch operation such as a click operation, key operation, or panel touch operation.

Thus, if the operator performs work by driving the transporter 35 along the transportation route 104 in accordance with the display screen 14a of the terminal 14, loading and transportation (drop-off) work can be performed with an extremely high level of efficiency. A further degree of efficiency can be achieved if the transporter 35 transports another mobile work machine 31 to 33 on the return journey following drop-off (when the vehicle is empty).

Work instruction data may also be transmitted from the administrator side terminal 11 to a terminal installed in a mobile work machine 31 such as a hydraulic shovel such that excavation work or the like can be performed efficiently.

For example, by transmitting data indicating the target excavation amount for the day, the work finishing time, and the current position of the loading recipient dump truck to the terminal in the mobile work machine 31, these items are displayed on a display screen of the terminal, and thus the operator operates the work machine in accordance with the display screen such that a series of earth excavation and dump truck loading operations can be performed efficiently.

In this embodiment, data is transmitted and received using an electronic mail service on the Internet 2. In such a case, the server terminal 21 serving as the mail server checks for the presence of electronic mail in a mailbox at fixed intervals. As a result, a fixed delay occurs between the transmission of an electronic mail from a terminal (for example the terminal 11) and actual reception thereof by a mail address recipient mobile body (for example the mobile work machine 31).

In this embodiment, data are transmitted and received by satellite wireless communication using the communication satellite 9. In satellite wireless communication, the communication line 5 cannot be ensured when the communication environment between transmitter and receiver is unfavorable in cases such as when the maximum elevation angle of the satellite is small and a line of view to the mobile body cannot be attained, and therefore processing is performed to attempt communication several times. As a result, a delay caused by the communication environment is produced between data transmission from the communication satellite 9 and actual reception in a mobile body (the mobile work machine 31).

In the communication system of this embodiment, a time difference of several minutes, for example, is produced between transmission of an electronic mail from the request original terminal and reception thereof in the request recipient mobile body. In such a communication system with a poor real time quality, the operator of the request original terminal feels a sense of unease due to the unknown state of communication, which may have an effect upon working efficiency. Communication costs may also be effected if a duplicate electronic mail is resent due to the state of communication being unknown.

It is therefore desirable to avoid a deterioration in working efficiency and an increase in communication costs caused by an unknown state of communication by displaying the state of communication with each mobile body on a display screen of a terminal.

Also in this embodiment, requests for mobile body information are issued from a plurality of terminals in respect of one mobile body. It is therefore impossible to make a judgment as to the newness of the currently obtained mobile body information (when the mobile body information request was placed) using only one terminal. It is therefore desirable that an operator be informed of mobile body management information regarding the newness of the currently obtained mobile body information by displaying on a display screen of a terminal the amount of time elapsed since the last request was placed with a mobile body.

An embodiment to be described herein below responds to these requests.

As is illustrated in FIG. 31, icons serving as mobile body identifiers (a picture of a hydraulic shovel, a picture of a service car, a picture of a trailer, and so on) are displayed on the terminal 11 respectively corresponding to the plurality of mobile bodies 31 to 35. When an electronic mail requesting mobile body information is transmitted from the request original terminal 11 to the request recipient mobile work machine 31, the display content of the icon of the mobile work machine 31 changes as shown in FIG. 16(a) in accordance with the state of communication.

More specifically, as is illustrated in FIG. 16(a), the color of the icon of the mobile work machine 31 changes from "blue" to "yellow" to "green" to "red" in accordance with changes in the communication state between the terminal 11 and the mobile work machine 31, or in other words the communication sequence, from "no request" to "request in progress" to "reply arrived" to "no reply".

This will be described with reference to the flowchart shown in FIG. 15.

Figure 15:
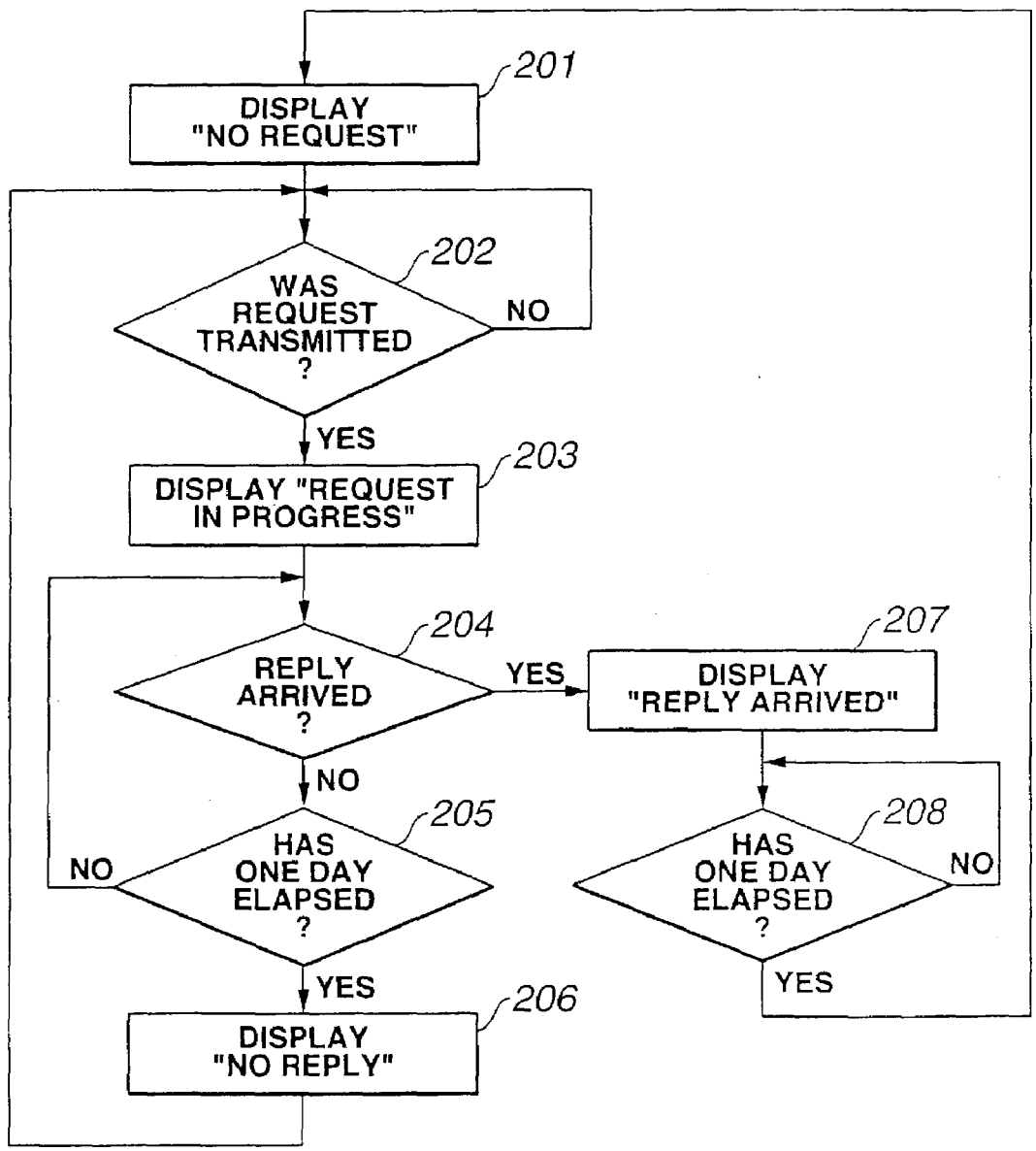
FIG. 15 is a flowchart illustrating a processing sequence for changing a display in accordance with the state of communication.

FIG. 15 shows a processing sequence for changing a display in accordance with the communication sequence. This processing is executed by the server terminal 21 and the results of this processing are displayed on a display screen of the terminal 11.

In an initial state, the icon of the mobile work machine 31 is displayed in "blue", corresponding to "no request" (step 201).

When an electronic mail requesting mobile body information is transmitted from the request original terminal 11 to the request recipient mobile work machine 31 and the electronic mail is stored in the mailbox of the mobile work machine 31 (a YES judgment in step 202), the display color of the icon of the mobile work machine 31 changes to "yellow", corresponding to "request in progress" (step 203).

Then, when the electronic mail transmitted in reply from the request recipient mobile work machine 31 is stored in the mailbox (a YES judgment in step 204), the display color of the mobile work machine 31 icon changes to "green", corresponding to "replied" (step 207). After one day has elapsed following the changing of the communication state to "replied" (a YES judgment in step 208), the display color of the mobile work machine 31 icon returns to "blue", corresponding to "no request" (step 201). In this case, step 207 may move to step 201 and the display color may return to "blue", corresponding to "no request", at the point when the mobile body information is transmitted in reply to the display recipient terminal (for example terminal 12) and displayed.

On the other hand, when the electronic mail to be transmitted in reply from the request recipient mobile work machine 31 is not stored in the mailbox (a NO judgment in step 204 and a YES judgment in step 205), it is judged that the reason therefor is difficulty in ensuring the wireless communication line 5 and the display color of the icon of the mobile work machine 31 changes to "red", corresponding to "no reply" (step 206).

In the above description, a case in which a request for mobile body information is placed with the mobile work machine 31 from the terminal 11 was envisaged. However, when mobile body information is requested by each of the terminals 11, 12 . . . to each of the mobile bodies 31, 32, 33, 34, 35, the icon of the request recipient mobile body changes similarly in accordance with the communication state in the request original terminal.

According to this embodiment as described above, when communication means with a poor real time quality are used, the "degree of communication delay" can be confirmed from a display screen of the terminal 11 due to changes in the display content in accordance with the state of communication. Further, duplicate requests to other terminals are eliminated. As a result, deterioration in working efficiency and increases in communication costs due to the communication state being unknown can be avoided.

Next, an embodiment will be described in which the operator can be informed of mobile body management information regarding the newness of the currently obtained mobile body information by displaying on a display screen of the terminal 11 the amount of time elapsed since the last request to a mobile body.

Figure 18:
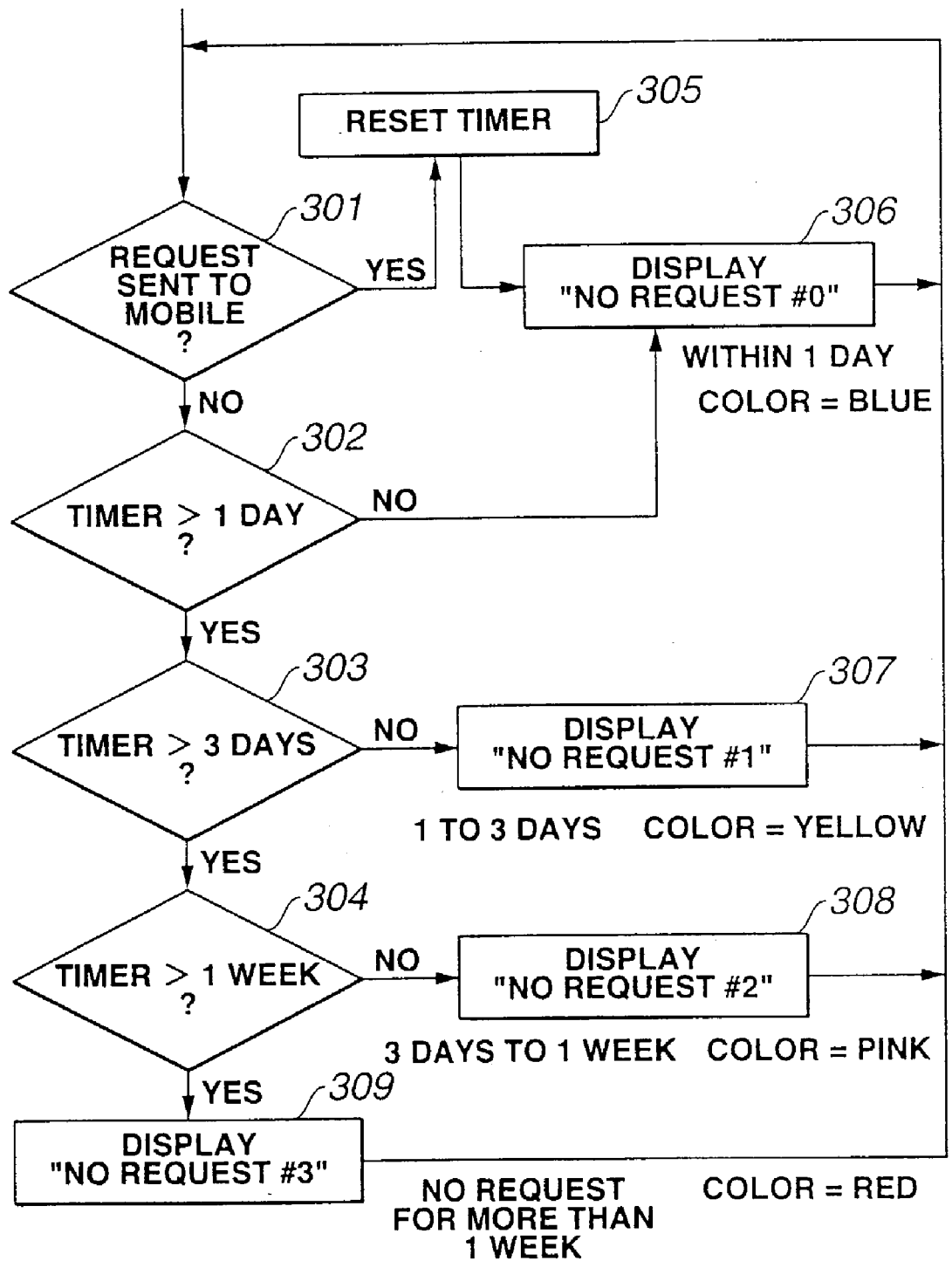
FIG. 18 is a flowchart illustrating a processing sequence for changing a display in accordance with the state of communication.

As is illustrated in FIG. 18, the color of the icon of the mobile work machine 31 changes from "blue" ("no requests #0") to "yellow" ("no requests #1") to "pink" ("no requests #2") to "red" ("no requests #3") in accordance with the communication state between the terminals 11, 12 . . . and the mobile-work machine 31, or in other words in accordance with changes in the amount of time elapsed since the last request from the terminals 11, 12 . . . to the mobile work machine 31, from "no requests for one day or less" to "no requests for one to three days" to "no requests for three days to one week" to "no requests for one week or more".

As is illustrated in FIG. 18, an electronic mail requesting mobile body information is transmitted from the terminals 11, 12 . . . to the request recipient mobile work machine 31, and when this electronic mail is stored in the mailbox of the mobile work machine 31 (a YES judgment in step 301), a timer is reset (step 305) and the display color of the mobile work machine 31 icon changes to "blue", corresponding to "no requests #0" (step 306).

When the amount of time elapsed since the resetting of the timer is one day or less (a NO judgment in step 302), the display color of the mobile work machine 31 icon is maintained at "blue", corresponding to "no requests #0" (step 306).

When the amount of time elapsed since the resetting of the timer exceeds one day but is at or within three days (a YES judgment in step 302 and a NO judgment in step 303), the display color of the mobile work machine 31 icon changes to "yellow", corresponding to "no requests #1" (step 307).

When the amount of time elapsed since the resetting of the timer exceeds three days but is at or within one week (a YES judgment in step 303 and a NO judgment in step 304), the display color of the mobile work machine 31 icon changes to "pink", corresponding to "no requests #2" (step 308).

When the amount of time elapsed since the resetting of the timer exceeds one week (a YES judgment in step 304), the display color of the mobile work machine 31 icon changes to "red", corresponding to "no requests #3" (step 309).

When an electronic mail requesting mobile body information is transmitted from the terminals 11, 12 . . . to the request recipient mobile work machine 31 during timekeeping by the timer and this electronic mail is stored in the mailbox of the mobile work machine 31 (a YES judgment in step 301), the timer is reset (step 305), and the display color of the mobile work machine 31 icon changes to "blue", corresponding to "no requests #0" (step 306).

In the above description, a case was envisaged in which the time elapsed since the last request from the terminal 11 to the mobile work machine 31 is displayed. However, display is performed in a similar manner for the other mobile bodies 32 through 35. The time elapsed since the last request to each of the mobile bodies 31, 32, 33, 34, 35 from another terminal 12 . . . is also displayed.

According to this embodiment as described above, the amount of time elapsed since the last request to the mobile bodies 31 to 35 can be confirmed on a display screen of a terminal, and thus management information regarding the newness of the currently obtained mobile body information can be learned for the mobile bodies 31 to 35.

Various modifications may be made to the aforementioned embodiment. These will be explained below with reference to FIGS. 16(*b*) to 16(*d*), 17, 19, and 20.

Next, an embodiment will be described in which an operator may be informed of mobile body management information regarding the newness of the currently obtained mobile body information by displaying on a display screen of the terminal 11 the amount of time elapsed since an electronic mail containing mobile body information was last received from a mobile body. Here, "received" includes both a case in which an electronic mail containing mobile body information is transmitted in reply from a mobile body, and a case to be described herein below in which an electronic mail containing mobile body information is automatically transmitted from a mobile body even without a request from the terminal side.

Figure 19:
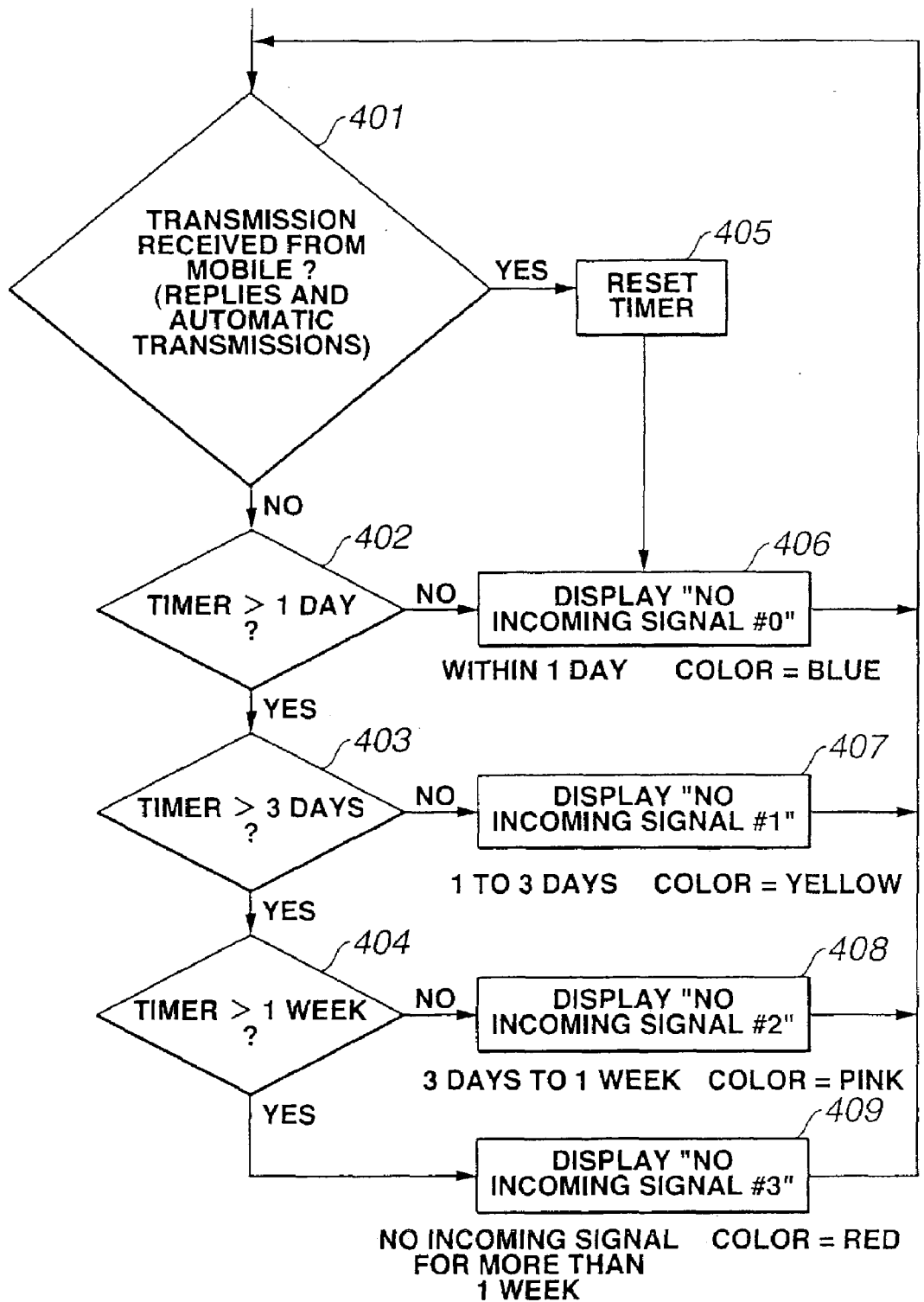
FIG. 19 is a flowchart illustrating a processing sequence for changing a display in accordance with the state of communication.

As is illustrated in FIG. 19, the color of the icon of the mobile work machine 31 changes from "blue" ("no reception #0") to "yellow" ("no reception #1") to "pink" ("reception #2") to "red" ("no reception #3") according to changes in the communication state with the mobile work machine 31, or in other words changes in the amount of time elapsed since the last reception (reply, automatic transmission) from the mobile work machine 31 to the server terminal 21, from "no reception for one day or less" to "no reception for one to three days" to "no reception for three days to one week" to "no reception for one week or more".

As is illustrated in FIG. 19, when a reply from the mobile work machine 31 or an electronic mail automatically transmitted by the mobile work machine 31 is stored in the mailbox of the server terminal 21 (a YES judgment in step 401), the timer is reset (step 405) and the display color of the mobile work machine 31 icon changes to "blue", corresponding to "no reception #0" (step 406).

When the amount of time elapsed since the resetting of the timer is one day or less (a NO judgment in step 402), the display color of the mobile work machine 31 icon is maintained at "blue", corresponding to "no reception #0" (step 406).

When the amount of time elapsed since the resetting of the timer exceeds one day but is at or within three days (a YES judgment in step 402 and a NO judgment in step 403), the display color of the mobile work machine 31 icon changes to "yellow", corresponding to "no reception #1" (step 407).

When the amount of time elapsed since the resetting of the timer exceeds three days but is at or within one week (a YES judgment in step 403 and a NO judgment in step 404), the display color of the mobile work machine 31 icon changes to "pink", corresponding to "no reception #2" (step 408).

When the amount of time elapsed since the resetting of the timer exceeds one week (a YES judgment in step 404), the display color of the mobile work machine 31 icon changes to "red", corresponding to "no reception #3" (step 409).

When a reply from the mobile work machine 31 or an electronic mail automatically transmitted by the mobile work machine 31 is stored in the mailbox of the server terminal 21 during timekeeping by the timer (a YES judgment in step 401), the timer is reset (step 405) and the display color of the mobile work machine 31 icon changes to "blue", corresponding to "no reception #0" (step 406).

Note that in the above description, a case was envisaged in which the time elapsed since the last reception from the mobile work machine 31 is displayed, but display is performed similarly for the other mobile bodies 32 to 35. The time elapsed since the last reception from the mobile bodies 31, 32, 33, 34, 35 is also displayed on the other terminals 12 . . . .

According to this embodiment as described above, the time elapsed since the last reception from the mobile bodies 31 to 35 can be confirmed on a display screen of a terminal, and thus management information regarding the newness of the currently obtained mobile body information relating to the mobile bodies 31 to 35 can be learned. Moreover, when a mobile body (for example the mobile work machine 31) performs automatic transmission at fixed intervals, a judgment can be made on the terminal side from the display content of the time elapsed since the last reception from the mobile body 31 as to whether or not some type of communication breakdown has occurred upon automatic transmission by the mobile body 31.

Next, an embodiment will be described with reference to FIG. 20 in which the time elapsed from the issuance of a request to a mobile body to the issuance of a response thereto is displayed such that a judgment can be made from a display screen of the terminal 11 as to whether or not communication is being conducted normally.

Figure 20:
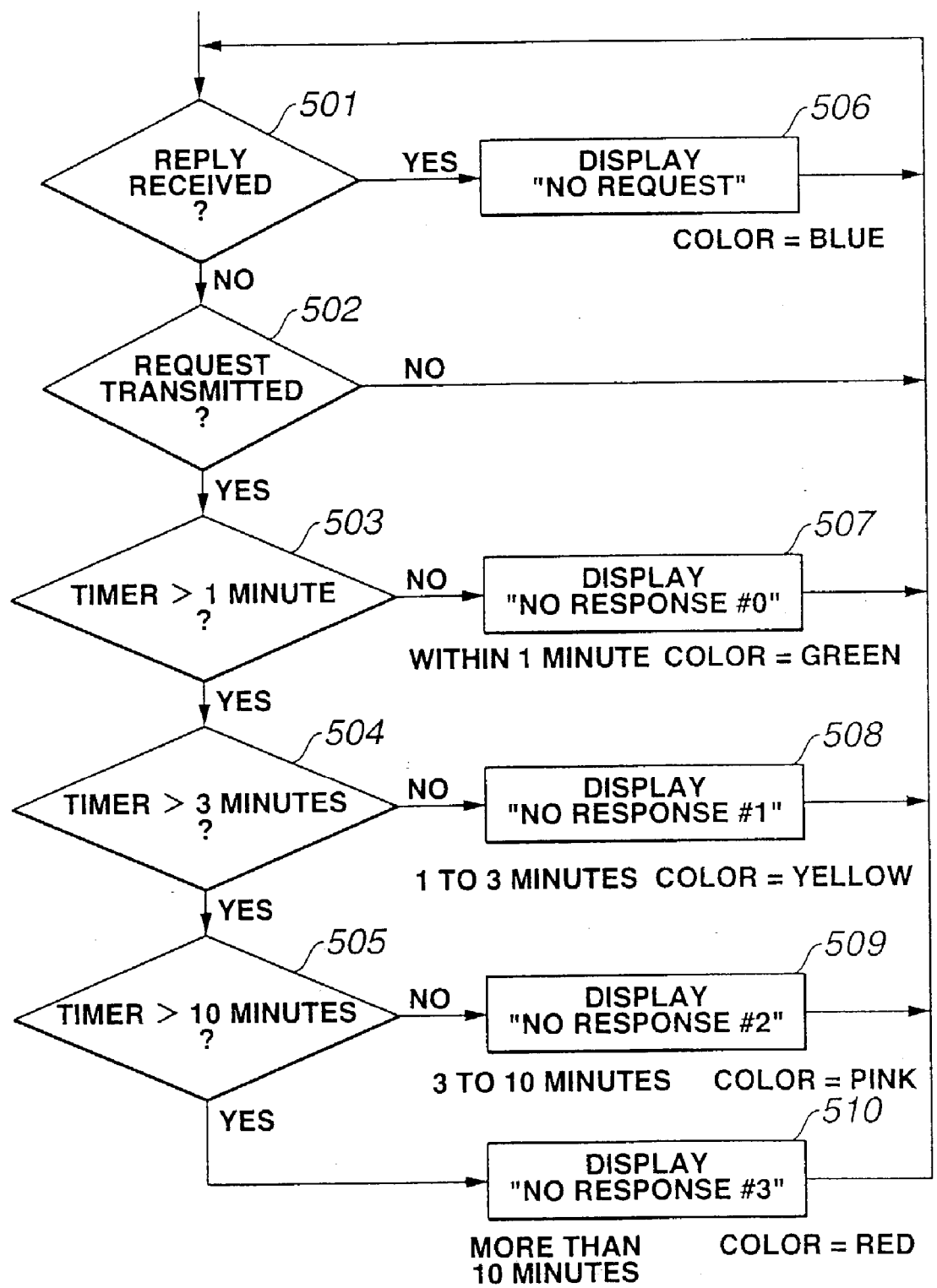
FIG. 20 is a flowchart illustrating a processing sequence for changing a display in accordance with the state of communication.

As is illustrated in FIG. 20, the color of the mobile work machine 31 icon changes from "green" ("no response #0") to "yellow" ("no response #1") to "pink" ("no response #2") to "red" ("no response #3") in accordance with changes in the time of a continuing state in which no response is issued to the last request from the terminal 11 to the mobile work machine 31, or in other words in accordance with changes from "no response for one minute or less" to "no response for one minute to three minutes" to "no response for three minutes to ten minutes" to "no response for ten minutes or more". When no request has been placed with the mobile work machine 31 from the terminals 11, 12 . . . (when a response has been issued), "blue" ("no request") is displayed.

As is illustrated in FIG. 20, when an electronic mail requesting mobile body information is transmitted from the request original terminal 11 to the request recipient mobile work machine 31 and an electronic mail in response thereto from the request recipient mobile work machine 31 is stored in a mailbox (a YES judgment in step 501), the color of the mobile work machine 31 icon changes to "blue", corresponding to "no request" (step 506).

When no electronic mail reply from the request recipient mobile work machine 31 is stored in the mailbox (a NO judgment in step 501), processing moves to the following step 502.

In step 502, a judgment is made as to whether an electronic mail requesting mobile body information has been transmitted from the request original terminal 11 to the request recipient mobile work machine 31 and stored in the mailbox of the mobile work machine 31, or in other words whether a request has been placed (step 502).

If a request has been placed (a YES judgment in step 502), the timer is reset, and if the time elapsed since the timer was reset is one minute or less (a NO judgment in step 503), the display color of the mobile work machine 31 icon changes to "green", corresponding to "no response #0" (step 507).

If the time elapsed since the timer was reset exceeds one minute and is at or within three minutes (a YES judgment in step 503 and a NO judgment in step 504), the display color of the mobile work machine 31 icon changes to "yellow", corresponding to "no response #1" (step 508).

If the time elapsed since the timer was reset exceeds three minutes and is at or within ten minutes (a YES judgment in step 504 and a NO judgment in step 505), the display color of the mobile work machine 31 icon changes to "pink", corresponding to "no response #2" (step 509).

If the time elapsed since the timer was reset exceeds ten minutes (a YES judgment in step 505), the display color of the mobile work machine 31 icon changes to "red", corresponding to "no response #3" (step 510).

If an electronic mail transmitted in reply from the request recipient mobile work machine 31 is stored in the mailbox during timekeeping by the timer (a YES judgment in step 501), the color of the mobile work machine 31 icon changes to "blue", corresponding to "no request" (step 506).

Note that in the above description, a case was envisaged in which the time elapsed from the issuance of a request by the terminal 11 to the mobile work machine 31 to the issuance of a response thereto is displayed, but display is performed similarly for the other mobile bodies 32 to 35. The time elapsed since the issuance of a request to the mobile bodies 31, 32, 33, 34, 35 is also displayed on the other terminals 12. . . .

According to this embodiment as described above, the time elapsed from the issuance of a request to a mobile body to the issuance of a response thereto is displayed, and thus a judgment can easily be made from a display screen of a terminal as to whether or not communication is being conducted normally.

Note that in the above description, as illustrated in FIG. 16(a), the display color of the entire mobile work machine 31 icon changes in accordance with the communication state between the terminal 11 and the mobile work machine 31. However, the color combination, color scheme, pattern, and so on of the icon may also be changed. Moreover, a constitutional element other than color may be changed.

For example, as is illustrated in FIG. 16(b), the shape of the mobile work machine 31 icon may be changed in accordance with the communication state between the terminal 11 and the mobile work machine 31. In the case of a hydraulic shovel icon, for example, the position, radius and so on of the attachment may be changed.

Further, as is illustrated in FIG. 16(c), the size of the mobile work machine 31 icon may be changed in accordance with the communication state between the terminal 11 and the mobile work machine 31. In the case of the "request in progress" section in FIG. 16(c), for example, the size of the hydraulic shovel icon periodically changes from large to medium and from medium to large.

Moreover, as is illustrated in FIG. 16(d), the movement of the mobile work machine 31 icon may be changed in accordance with the communication state between the terminal 11 and the mobile work machine 31. In the case of the "no request" section in FIG. 16(c), for example, the hydraulic shovel icon halts, whereas in the case of the "request in progress" section, the hydraulic shovel icon rotates, in the case of the "replied" section, the hydraulic shovel icon moves in a straight line, and in the case of the "no reply" section, the hydraulic shovel icon jumps.

The flashing pattern of the mobile work machine 31 icon may also be changed in accordance with the communication state between the terminal 11 and the mobile work machine 31. For example, the period of the flash could be changed.

Rather than changing the picture of the mobile work machine 31, passwords such as characters for identifying the mobile work machine 31 may be changed. For example, the license plate number of the mobile work machine 31 or the color of characters spelling a nickname or the like may be changed or caused to flash.

As a result of the processing in FIG. 15, for example, icons for a plurality of mobile work machines 31, 32, 33, 36, 37, 38 are displayed on a display screen of the terminal 11 according to mobile body information ("vehicle number", "position", "service meter"), as is illustrated in FIG. 17(a). In this case, as is shown in FIG. 17(a), the icons of each of the mobile work machines 31, 32, 33, 36, 37, 38 may be displayed on screen in a preset sequence.

As is illustrated in FIG. 17(b), the icons of the mobile work machines 31, 32, 33, 36, 37, 38 may be arranged according to communication state, with the icons of the mobile work machines 31, 32 corresponding to "request in progress" displayed at the top and the icons of the mobile work machines 33, 36, 37 corresponding to "no request" displayed at the bottom.

Further, as is illustrated in FIG. 17(c), only the icons for the mobile work machines 31, 32 which correspond to "request in progress" may be extracted from among the icons of each of the mobile work machines 31, 32, 33, 36, 37, 38 and displayed.

According to this embodiment as described above, the display content of a terminal is changed in accordance with changes in communication state, and hence working efficiency deterioration due to the state of communication being unknown can be prevented, as can communication cost increases. Moreover, management information regarding the newness of the mobile body information for each mobile body (when maintenance or an inspection was last performed and so on) can be obtained from a display screen.

This embodiment, wherein the display content of a terminal is changed in accordance with changes in the communication state, is not limited to the communication system illustrated in FIG. 1, but may be applied to any communication system. This embodiment is applicable to any communication system which comprises at least two communication stations such that communication is performed between the two communication stations.

Next, an embodiment will be described in which the mobile bodies 31 to 35 intermittently switch off their power supply so as to suppress wasteful power consumption during communication.

Time slots during which the engine of a mobile work machine such as a construction machine is not operating (or in other words the time period during which the power supply is off) are long.

Figure 21:
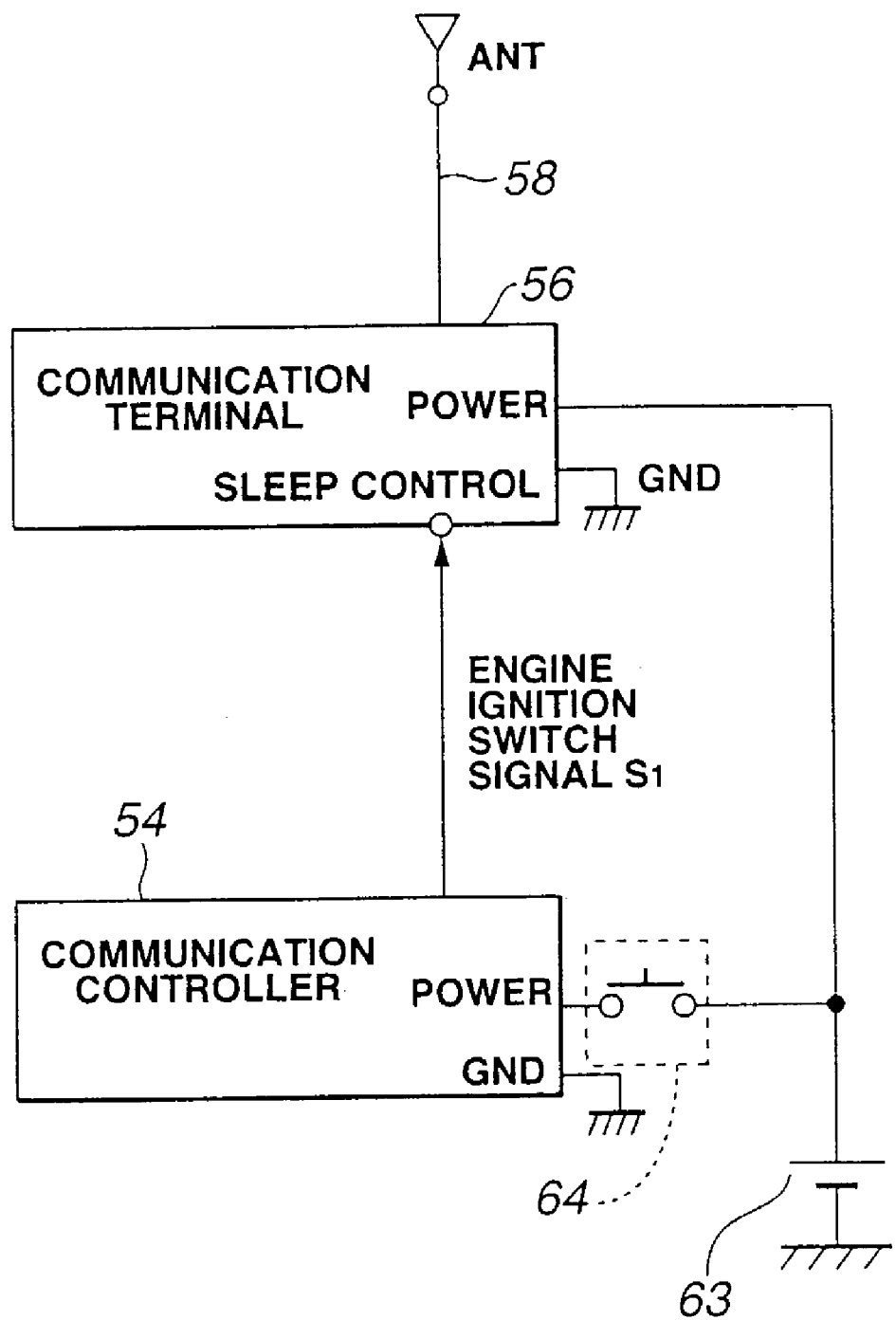
FIG. 21 is a view illustrating a connection mode of an in-vehicle communication terminal with other devices.

If, as is shown in FIG. 21, the battery 63 which serves as the power supply (rated voltage 24V) remains electrically connected to the communication terminal 56 at all times, even when the engine is off, the battery 63 is not charged by a generator (alternator) since the engine is not in operation. As a result, electric discharge from the battery 63 progresses rapidly. If, on the other hand, the electrical connection between the battery 63 and the communication terminal 56 is switched off whenever the engine is off, communication with the plurality of terminals 11, 12 . . . becomes impossible. As a result, if a mobile body information request is placed from the terminal 11, 12 . . . side when the engine is off, no response can be made to this request.

Hence, in the following embodiment, provision is made such that communication with the plurality of terminals 11, 12 . . . is made possible when an engine is switched off even in the case of the mobile bodies 31 to 35 such as construction machines, the engines of which do not operate for long periods of time, as a result of which responses may be made to requests from the terminals 11, 12 . . . and wasteful power consumption may be suppressed. FIG. 21 illustrates the constitution of this embodiment.

As illustrated in FIG. 2, the vehicle body interior of the mobile work machine 31 is provided with the communication terminal 56. The power terminal of this communication terminal 56 is electrically connected to the battery 63. A main power supply circuit is provided in the communication terminal 56, and power is expended by the supply of electrical power from the battery 63 to this main power supply circuit. Either an internal program (software timer) is stored inside the communication terminal 56 or an internal power supply circuit (hard timer) is incorporated therein, and by these means the driving of the main power supply circuit is operated to be intermittently switched on and off such that power saving is periodically performed by the main power supply circuit.

The level of an engine ignition switch signal S1 which is inputted into a sleep control terminal of the communication terminal 56 is monitored by software, and when this level is an on signal and the main power supply circuit of the communication terminal 56 is off, processing is performed to forcibly drive the main power supply circuit. A constitution may also be provided in which the main power supply circuit is driven by hardware.

More specifically, when an off signal (a logic "0" level signal) of the engine ignition switch signal S1 is inputted into the sleep control terminal of the communication terminal 56, the electrical connection between the main power supply circuit inside the communication terminal 56 and the battery 63 is switched on and off at a predetermined duty ratio, the main power supply circuit is driven on and off, and the communication terminal 56 is activated and deactivated, and thus communication processing is performed periodically (the sleep function of the communication terminal 56 is on).

When an on signal (a logic "1" level signal) of the engine ignition switch signal S1 is inputted into the sleep control terminal of the communication terminal 56, the main power supply circuit inside the communication terminal 56 and the battery 63 are electrically connected such that the main power supply circuit is driven, the communication terminal 56 is activated, and communication processing is performed (the sleep function of the communication terminal 56 is off (forcibly cancelled)). Thus the communication terminal 56 is in an activated state whenever the engine is on.

The power terminal of the communication controller 54 is electrically connected to the battery 63 via an engine ignition switch 64. When the engine ignition switch 64 is switched off, the electrical connection between the communication controller 54 and the battery 63 is interrupted and the engine of the mobile work machine 31 ceases operations. When the engine ignition switch 64 is switched on, an on signal (a logic "1" level signal) of the engine ignition switch signal S1 is outputted from the communication controller 54 to the sleep control terminal of the communication terminal 56.

Next, processing performed by the communication terminal 56 will be described using the timing chart in FIG. 7.

FIG. 7(a) illustrates the operating signal S1 of the engine ignition switch 64, and FIG. 7(b) illustrates a state of communication between the communication terminal 56 and the communication satellite 9. Communication is indicated by logic "1" level. FIG. 7(c) illustrates a state of activation of the communication terminal 56. Logic "1" level corresponds to an activated state (power saving operation off), and logic "0" level corresponds to an activation off (sleep) state (power saving operation on). The communication terminal 56 is intermittently activated and deactivated according to duty ratio D $(=(\tau/T) \times 100\%)$. At the timing of communication terminal 56 activation when the power saving operation is off, signals indicating mobile body information such as current position, service meter value, remaining fuel quantity, battery voltage, and vehicle error codes, are transmitted as necessary from the communication terminal 56 to the communication satellite 9.

Figure 7:
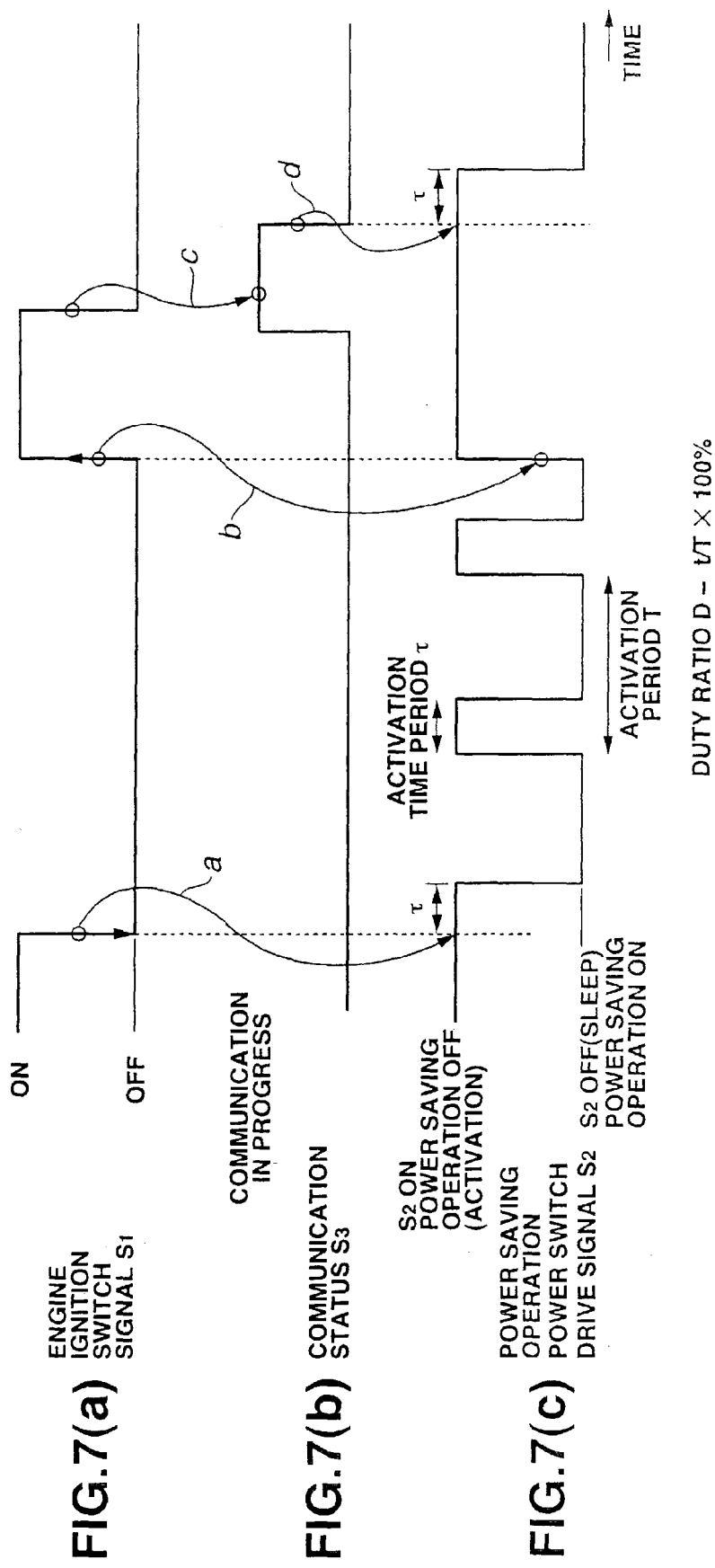
FIGS. 7(a), 7(b), and 7(c) are timing charts illustrating a power saving operation performed by a mobile body.

As shown in FIG. 7, when the engine ignition switch signal S1 is maintained in an on state, the communication terminal 56 remains activated at all times.

When the engine ignition switch signal S1 is switched from on to off, the communication terminal 56 is intermittently activated and deactivated according to duty ratio D (=($\tau$/T)×100%), as illustrated by arrow a (sleep function on).

Figure 8:
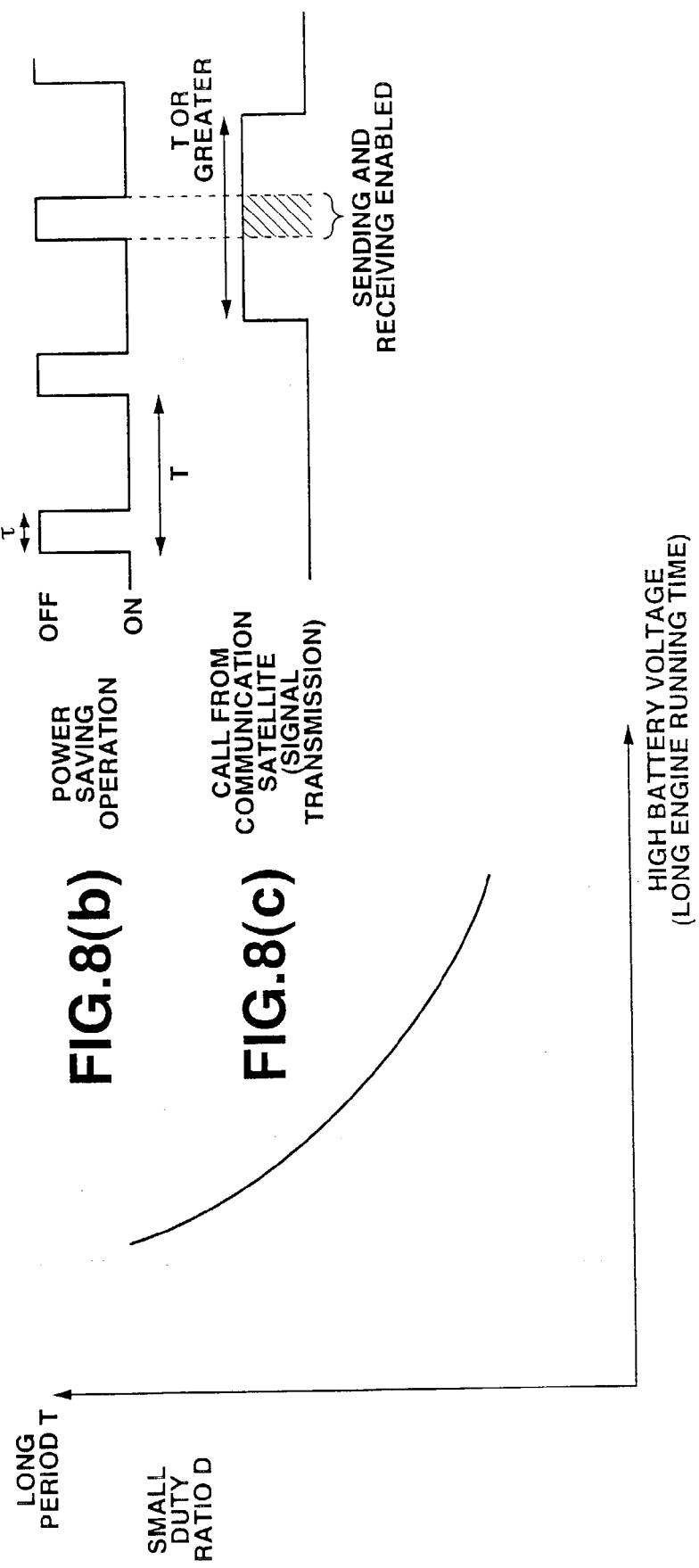
FIGS. 8(a), 8(b), and 8(c) are views illustrating an embodiment in which a power saving operation is performed.

FIG. 8(*b*) is a timing chart illustrating on and off power saving operations corresponding to FIG. 7(*c*), and FIG. 8(*c*) illustrates a state in which a calling signal is transmitted from the communication satellite 9 to the communication terminal 56. Logic "1" level indicates transmission.

As is illustrated in these drawings, a period of activation $\tau$, or in other words a time period in which transmission and reception may be performed with the communication satellite 9 (refer to the shaded section in FIG. 8(*c*)), always exists within a fixed time period (activation period) T. The expected communication response time is T/2 (average T/2). Power consumption can be suppressed to $\tau$/T. In order to allow transmission and reception between the communication satellite 9 and the power saving-operating communication terminal 56 during the activation period T, signals must be transmitted from the communication satellite 9 to the communication terminal 56 continuously for a period of time of T or greater (see FIGS. 8(*b*), (*c*)). The activation period T is determined according to the degree of communication urgency and the safety factor in respect of the continuous time period of signal transmission from the communication satellite 9.

The activated time period $\tau$ must be ensured to or above the time necessary for a transmission and reception procedure. However, power saving becomes more effective as the activated time period $\tau$ decreases.

By activating the communication terminal 56 periodically during a period T in this manner, the expected communication response time value can be ensured and power consumption can be suppressed.

As is illustrated in FIG. 7, however, even when the engine ignition switch signal S1 is switched from on to off, if communication is being performed between the communication terminal 56 and the communication satellite 9, as shown by arrow c, the sleep function is switched on when communication ends, as shown by arrow d.

When the engine ignition switch signal S1 is switched from off to on, the sleep function is forcibly cancelled, as shown by arrow b.

According to this embodiment as described above, the sleep function is forcibly cancelled when the engine is operating and the communication terminal 56 is always activated when the engine is operating, and thus mobile body information regarding sudden vehicle irregularities occurring while the engine is in operation can be transmitted such that safety is ensured. Further, even if engine operations are halted, the communication terminal 56 remains activated during communication until the communication is complete, and thus communication can be performed reliably.

The aforementioned duty ratio D may be altered according to the terminal voltage of the battery 63.

The voltage of the battery 63 is inputted into a battery voltage input circuit and the duty ratio D alters in accordance with the characteristic shown in FIG. 8(*a*).

That is, the duty ratio D decreases and the activation period T lengthens as the voltage of the battery 63 decreases, and thus further reductions in the voltage of the battery 63 are suppressed.

Further reduction in the voltage of the battery 63 may also be suppressed using a similar characteristic to the characteristic shown in FIG. 8(*a*) such that the duty ratio D is decreased and the activation period T lengthened as the engine operating time becomes shorter. The engine operating time is determined from the increase value of the service meter. The continuous engine operating time prior to the sleep function being switched on (prior to the beginning of an intermittent power saving operation) is determined by the increase value of the service meter, and the duty ratio D is altered according to this continuous operating time. In this case, there is no need to install a battery voltage input circuit.

According to the aforementioned constitution shown in FIG. 21, a power saving operation is performed by means of processing within the communication terminal 56, which is advantageous in that no influence is received from other devices, wiring irregularities and so on. The constitution in FIG. 22 may be employed in place of the constitution in FIG. 21. That is, the power saving operation control function when the engine ignition switch 64 is off may be passed to a different device to the communication terminal 56, for example the communication controller 54, such that the electrical connection between the communication terminal 56 and the battery 63 may be intermittently controlled on and off by the communication controller 54.

Figure 22:
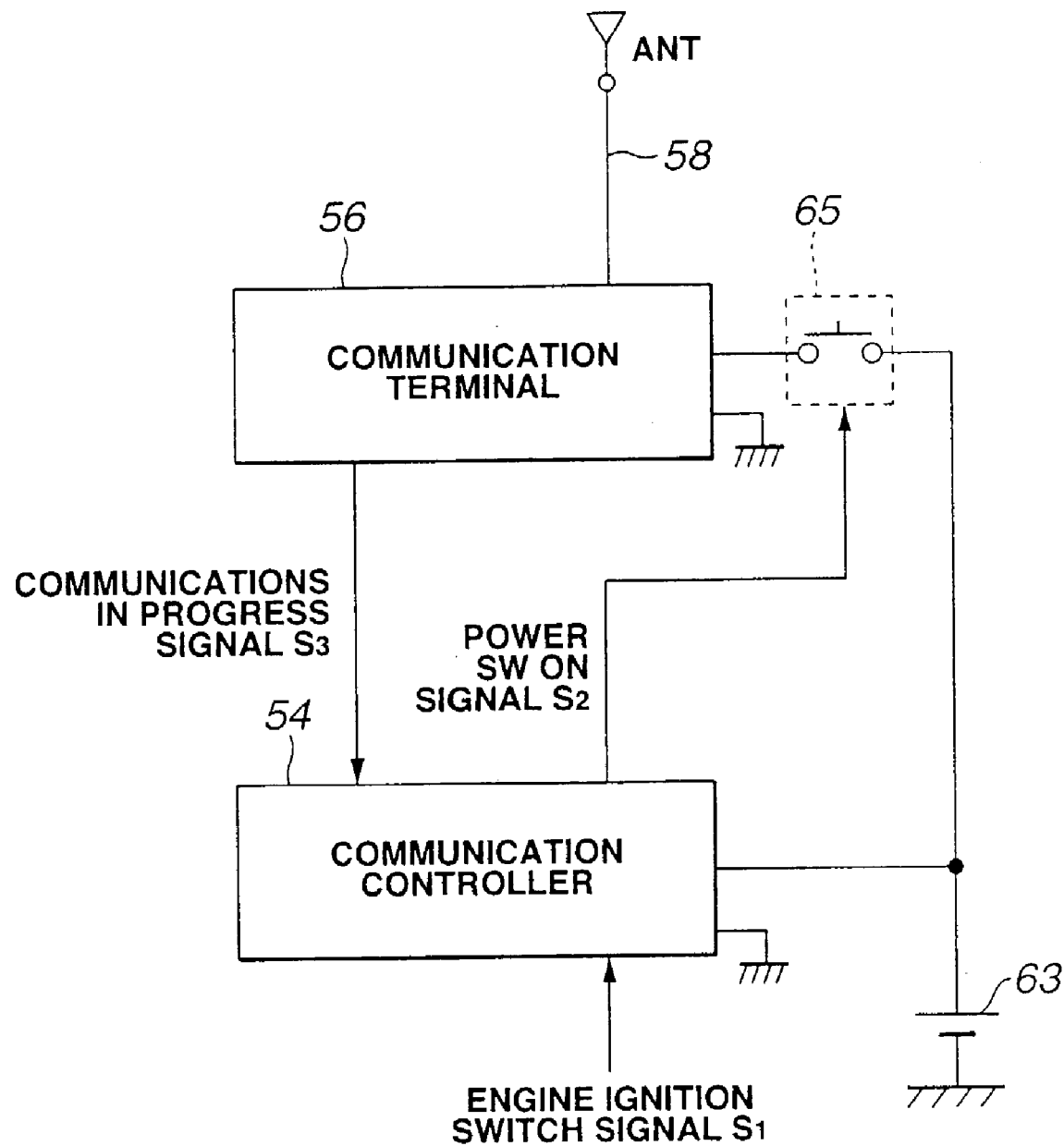
FIG. 22 is a view illustrating a connection mode of an in-vehicle communication terminal with other devices.

As is shown in FIG. 22, the power terminal of the communication terminal 56 is electrically connected to the battery 63 via a power source switch 65. When the power source switch 65 is switched off, the electrical connection between the communication terminal 56 and the battery 63 is interrupted.

The power terminal of the communication controller 54 is electrically connected to the battery 63. The operating signal S1 of the engine ignition switch 64 is inputted into the communication controller 54. Also, a signal S3 indicating the state of communication is inputted into the communication controller 54 from the communication terminal 56. If the communication terminal 56 and the communication satellite 9 are in communication, the communication state signal S3 is switched to logic "1" level.

A software timer is stored in the communication controller 54 or a hardware timer is incorporated therein, and a power source switch driving signal S2 is outputted to the power source switch 65.

Similar processing to that described in FIG. 7 is executed by the communication controller 54.

FIG. 7(*a*) illustrates the operating signal S1 of the engine ignition switch 64 which is inputted into the communication controller 54, FIG. 7(*b*) illustrates the communication state signal S3 which is inputted into the communication controller 54 from the communication terminal 56, and FIG. 7(*c*) illustrates the power source switch driving signal S2 which is outputted to the power source switch 65 from the communication controller 54.

Hence, similarly to the constitution shown in FIG. 21, when engine operations halt (signal S1 off), activation of the communication terminal 56 is controlled on and off according to a predetermined duty ratio D (signal S2 on, off). If the engine is operating (signal S1 on), the aforementioned sleep function is forcibly cancelled such that during engine operations, the communication terminal 56 is always activated (signal S2 on). If communications are being performed when engine operations are halted (S3 on), the communication terminal 56 remains activated until communication is complete (S2 on).

Note that the duty ratio D may be altered similarly in accordance with the terminal voltage of the battery 63 or the engine operating time.

Various modifications may be made to this embodiment. These modifications will now be described with reference to FIGS. 13, 23, 24, and 25.

The duty ratio D may be altered in accordance with positional information of the mobile work machine 31.

FIG. 23 illustrates an embodiment in which the duty ratio D is altered in accordance with the distance moved by the mobile work machine 31 relative to a set range.

FIG. 23($a$) illustrates a situation in which the activation period T is shortened and the duty ratio D is increased when the mobile work machine 31 deviates from a set range 117 on a map.

Most automobiles and the like typically move by self-advancement. Mobile work machines 31 such as construction machines, on the other hand, rarely travel long distances by self-advancement and almost always move when loaded onto a trailer or the like with engine operations halted. In this case, not only are mobile work machines 31 loaded onto the trailer 35, which is managed by the terminal 11 side, and transported, but may also be loaded onto an unmanaged trailer and illegally transported overseas or the like. A mobile work machine 31 may also be improperly transported by the trailer 35 without permission to an administratively forbidden work site.

It is therefore necessary to manage and monitor the trajectory of the mobile work machine 31 when engine operations of the mobile work machine 31 are halted by displaying on the terminal 11 the moving position of the mobile work machine 31 in response to a request from the terminal 11 while suppressing power consumption during communication.

For this purpose, a predetermined range 117 in which, under normal circumstances, the mobile work machine 31 is presumed to be, is set on a map on a display screen of the terminal 11. This set range 117 is, for example, the management region of an administrator on the terminal 11 side, an administratively approved work site, or similar.

The communication terminal 56 of the mobile work machine 31 is intermittently activated and deactivated according to the predetermined duty ratio D (=(τ/T)×100%), as previously shown in FIG. 7. Then, at a timing when the power saving operation is switched off (the power source switch driving signal S2 is switched on) and the communication terminal 56 is activated, as is illustrated in FIG. 7($c$), a signal indicating the current position (which may also include mobile body information such as the service meter value, remaining fuel quantity, battery voltage, and vehicle error codes) is transmitted from the communication terminal 56 to the communication satellite 9 in response to a request from the terminal 11. As a result, successive moving positions of the mobile work machine 31 are displayed on the terminal 11 which serves as the display recipient terminal.

The position of the mobile work machine 31 is detected by the GPS sensor 57 as shown in FIG. 2. In this case, if the power consumption of the GPS measuring devices (GPS antenna 59, GPS sensor 57, and communication controller 54) is small, these GPS measuring devices may be directly electrically connected to the battery 63 and constantly operated. If the power consumption of the GPS measuring devices is large, the sleep function is switched on and a power saving operation performed intermittently, similarly to the communication terminal 56, such that the GPS measuring devices are operated and positions measured only when the power saving operation is on (during activation of the communication terminal 56).

In the mobile work machine 31, the position detected by the GPS sensor 57 and the boundary position of the set range 117 are compared, and processing for changing the activation period T is executed in accordance with the comparison result.

FIG. 23($d$) illustrates a situation in which the activation period T is altered in accordance with the position of the mobile work machine 31 relative to the set range 117 (elapsed time).

When the mobile work machine 31 is in position A or B within the normal set range 117, as is illustrated in FIG. 23($a$), the activation period T is set at a maximum period T1.

When the mobile work machine 31 reaches the boundary position C of the normal set range 117, however, it is judged that the mobile work machine 31 has deviated from the normal range and that an irregular situation has arisen (movement outside of the permitted region). The activation period T is then reduced from the maximum period T1 to a shorter period T2 in order to obtain detailed information concerning the movement trajectory (see FIG. 23($d$)).

When the mobile work machine 31 reaches position D, which is further removed from the boundary position of the normal set range 1117 by a predetermined distance L0, the activation period T is set at an even shorter period T3 than the period T2 in order to obtain even more detailed information concerning the movement trajectory (see FIG. 23($d$)). Thereafter, as the departure distance from the normal set range 117 increases, the activation period T becomes successively shorter to T4 (<T3) . . . and may finally be set at a period 0 (duty ratio D=1).

As is illustrated in the graph in FIG. 23($c$), the activation period T may be progressively shortened as the departure distance L from the boundary position of the normal set range 117 increases.

As the activation period T of the communication terminal 56 shortens, responses to requests from the terminal 11 become quicker. When the mobile work machine 31 performs automatic transmission, as will be explained herein below, the transmission intervals of mobile body information comprising positional information become shorter.

Thus, as the mobile work machine 31 becomes further removed from the normal set range 117, a more detailed movement trajectory (a movement trajectory in which the time interval between each displayed movement position is short) is displayed on a display screen of the terminal 11 which serves as the display recipient terminal. As a result, swift and appropriate measures can be taken against an irregular occurrence such as movement outside of a permitted region. Furthermore, as the mobile work machine 31 becomes further removed from the normal set range 117, the duty ratio D of the on/off activation of the communication terminal 56 is increased, and thus accurate monitoring of the irregular situation may be performed while suppressing power consumption during communication.

FIG. 23($b$) illustrates a situation in which the activation period T is shortened and the duty ratio D increased as the mobile work machine 31 penetrates a set range 118 on a map.

Similarly to FIG. 23($a$), a predetermined range 118 to which, under normal circumstances, the mobile work machine 31 should not be brought in, is set on a map on a display screen of the terminal 11. This set range 118 may be an irregular region, for example an overseas port, a dangerous working area, or an illegal working area such as a nature reserve.

In the mobile work machine 31, the position detected by the GPS sensor 57 and the position of the set range 118 are compared in a similar manner to that described in FIG. 23(a), and processing to alter the activation period T is executed in accordance with the comparison result.

FIG. 23(d) illustrates a situation in which the activation period T is altered in accordance with the position of the mobile work machine 31 relative to the set range 118 (elapsed time).

As is illustrated in FIG. 23(b), when the mobile work machine 31 is in position A or B outside of the irregular set range 118, the activation period T is set at the maximum period T1.

When the mobile work machine 31 reaches the boundary position C of the set range 118, however, it is judged that an irregular situation has arisen (entrance into a dangerous region), and the activation period T is set at a shorter period T2 than the maximum period T1 in order to obtain detailed information regarding the movement trajectory (see FIG. 23(d)).

When the mobile work machine 31 reaches position D, which further penetrates the irregular set range 118 from the boundary position by a predetermined distance L0, the activation period T is set at an even shorter period T3 than the period T2 in order to obtain even more detailed information concerning the movement trajectory (see FIG. 23(d)). Thereafter, as the penetration distance into the irregular set range 118 increases, the activation period T becomes successively shorter to T4 (<T3) . . . and may finally be set at a period 0 (duty ratio D=1).

As is illustrated in the graph in FIG. 23(c), the activation period T may be progressively shortened as the distance L relative to the boundary position of the irregular set range 118 increases.

Thus, as the mobile work machine 31 further penetrates the irregular set range 118, a more detailed movement trajectory (a movement trajectory in which the time interval between each displayed movement position is short) is displayed on a display screen of the terminal 11 which serves as the display recipient terminal. As a result, swift and appropriate measures can be taken against an irregular occurrence such as entrance into a dangerous region. Furthermore, as the mobile work machine 31 further penetrates the irregular set range 118, the duty ratio D of the on/off activation of the communication terminal 56 is increased, and thus accurate monitoring of the irregular situation may be performed while suppressing power consumption during communication.

Note that this embodiment may be applied not only the monitoring of an irregular situation envisaged in FIGS. 23(a), 23(b), but also to a case in which the routes of the mobile work machine 31 are monitored until the mobile work machine 31 is dismantled and disposed of Further, in the embodiment illustrated in FIGS. 23(a), (b), the activation period T is determined primarily by the distance L from the boundary line of the set ranges 117, 118. However, the activation period T may also be determined in consideration of azimuth angle, peripheral geographical information, moving body type, moving body usage period, and so on.

Further, as is illustrated in FIG. 24, the duty ratio D may be changed in accordance with the position change amount of the mobile work machine 31.

The communication terminal 56 in the mobile work machine 31 is intermittently activated and deactivated according to the predetermined duty ratio D $(=(\tau/T)\times 100\%)$ as illustrated in FIG. 7. Then, at a timing when the power saving operation is switched off (the power source switch driving signal S2 is switched on) and the communication terminal 56 is activated, as is illustrated in FIG. 7(c), a signal indicating the current position (which may also include mobile body information such as the service meter value, remaining fuel quantity, battery voltage, and vehicle error codes) is transmitted from the communication terminal 56 to the communication satellite 9 in response to a request from the terminal 11. As a result, successive moving positions of the mobile work machine 31 are displayed on the terminal 11 which serves as the display recipient terminal.

The position of the mobile work machine 31 is detected by the GPS sensor 57 as shown in FIG. 2. In this case, if the power consumption of the GPS measuring devices (GPS antenna 59, GPS sensor 57, and communication controller 54) is small, these GPS measuring devices may be directly electrically connected to the battery 63 and constantly operated. If the power consumption of the GPS measuring devices is large, the sleep function is switched on and a power saving operation performed intermittently, similarly to the communication terminal 56, such that the GPS measuring devices are operated and positions measured only when the power saving operation is on (during activation of the communication terminal 56).

In the mobile work machine 31, the current position detected by the GPS sensor 57 during the present activation time is compared with the boundary positions of circles 119, 120 . . . each having a radius S centering on the position detected during the previous activation time, and processing to alter the activation period T is executed in accordance with the comparison result.

Figure 24A:
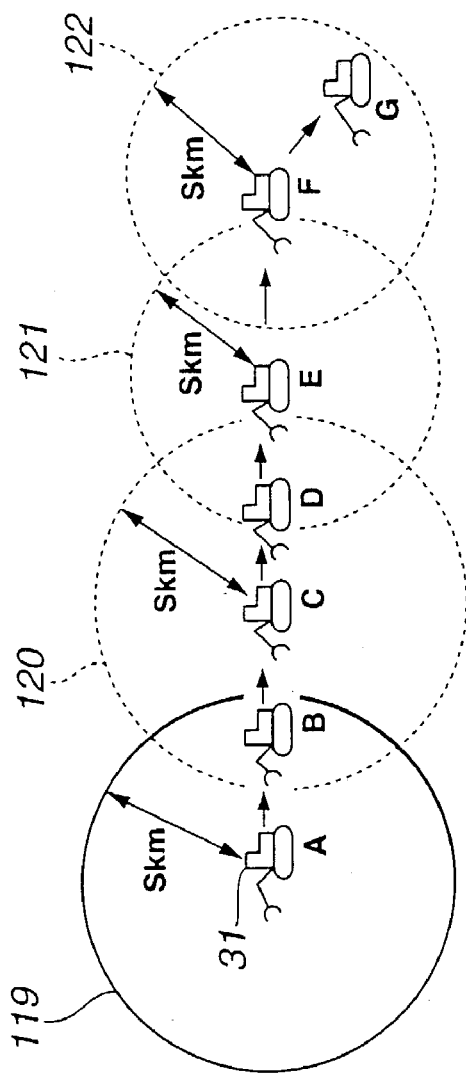
FIG. 24 is a view illustrating changes in a power saving operation duty ratio.
Figure 24B:
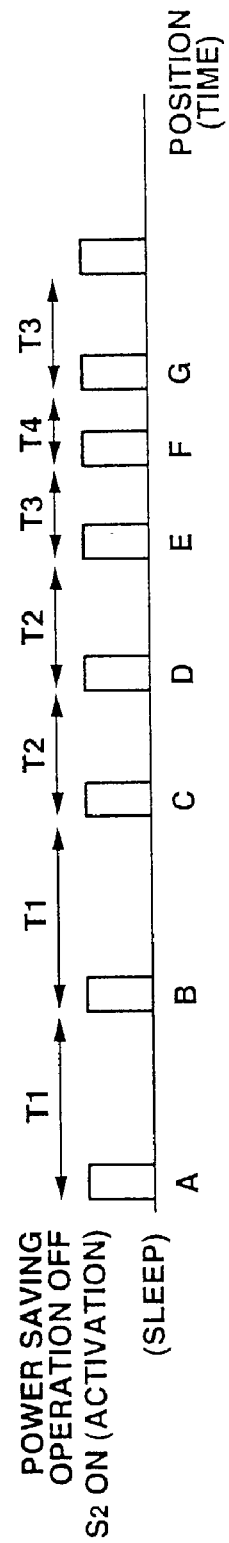

FIG. 24(b) shows a situation in which the activation period T is altered depending on whether or not the mobile work machine 31 has deviated from the circles 119, 120 . . . .

As is illustrated in FIG. 24(a), first a position A of the mobile work machine 31 is detected by the GPS sensor 57, and a circle 119 with a radius S (km) centering on position A is set on the map. The initial activation period T is set as the maximum period T1. The communication terminal 56 is therefore activated after the period T1. The position detected by the GPS sensor 57 at that time is presumed to be a position B which is within the circle 119. In this case, the activation period T remains at the maximum period T1. The communication terminal 56 is again activated following the period T1, and the position detected by the GPS sensor 57 at this time is presumed to be a position C, which is outside of the circle 119. In this case, a circle 120 with a radius S (km) centering on position C is set on the map, and the activation period T is altered to a shorter period T2 than the maximum period T1.

The communication terminal 56 is then activated following the period T2. The position detected by the GPS sensor 57 at this time is presumed to be a position D, which is within the circle 120. In this case, the activation period T remains at the period T2. The communication terminal 56 is activated again following the period T2, and the position detected by the GPS sensor 57 at this time is presumed to be a position E, which is outside of the circle 120. In this case, a circle 121 with a radius S (km) centering on position E is set on the map, and the activation period T is altered to a shorter period T3 than the period T2. The communication terminal 56 is activated again following the period T3, and the position detected by the GPS sensor 57 at this time is presumed to be a position F, which is outside of the circle 121. In this case, a circle 122 with a radius S (km) centering on position F is set on the map, and the activation period T is altered to a shorter period T4 than the period T3. The communication terminal 56 is again activated after the period T4. The position detected by the GPS sensor 57 at this time is presumed to be a position G, which is within the circle 122. In this case, the activation period T returns to the longer period T3 from the period T4 (see FIG. 24(*b*)).

Note that in the embodiment in FIG. 24(*a*), areas are set as circles 119, 120 . . . having a radius S, but areas may instead be set as squares having one side as S.

An advantage in the case of square areas is that when the current position of the mobile work machine 31, detected by the GPS sensor 57 during the present activation time, and the boundary position of an area centering on the position detected during the previous activation time are compared, a judgment as to whether the mobile work machine 31 is outside of the area or not can be easily made without performing any complicated calculation processing by subtracting latitudes and longitudes on the map.

The areas 119, 120 . . . shown in FIG. 23(*a*) may also be a shape other than a circle or a square. For example, the areas may be ellipses or rectangles in which one of either latitude or longitude is longer. Ellipses or rectangles in which the advancing direction of the mobile work machine 31 is long may also be employed. In this case, judgments as to whether the mobile work machine 31 has deviated from the area can be made faster and more accurately.

Further, the magnitude of the areas 119, 120 . . . , or more specifically the radius S (km) value in the case of a circular area, may be changed in accordance with the movement amount.

Thus in the case of FIG. 24, as the travel speed of the mobile work machine 31 increases, the activation period T is shortened equivalently, and a more detailed movement trajectory (a movement trajectory in which the time interval between each displayed movement position is short) is displayed on a display screen of the terminal 11 serving as the display recipient terminal. Thus a situation in which the mobile work machine 31 has finished work at a work site and is traveling to the next work site can be accurately grasped on the terminal 11 side, and as a result the working efficiency of process management and transportation management is greatly improved. Furthermore, as the travel speed of the mobile work machine 31 increases, the duty ratio D of the on/off activation of the communication terminal 56 is increased, and thus simultaneous accurate monitoring of the mobile work machine 31 in motion and suppression of power consumption during communication may be realized.

In the embodiment shown in FIG. 24, the activation period T is altered according to whether or not the successively set areas 119, 120 . . . are exceeded. However, as is illustrated in the graph in FIG. 25, the travel speed V of the mobile work machine 31 may be calculated at each activation period T such that the activation period T is altered according to the magnitude of this calculated velocity V In the embodiment shown in FIG. 25, as in the embodiment of FIG. 24, the position of the mobile work machine 31 is detected by the GPS sensor 57 each time the communication terminal 56 is activated.

Figure 25:
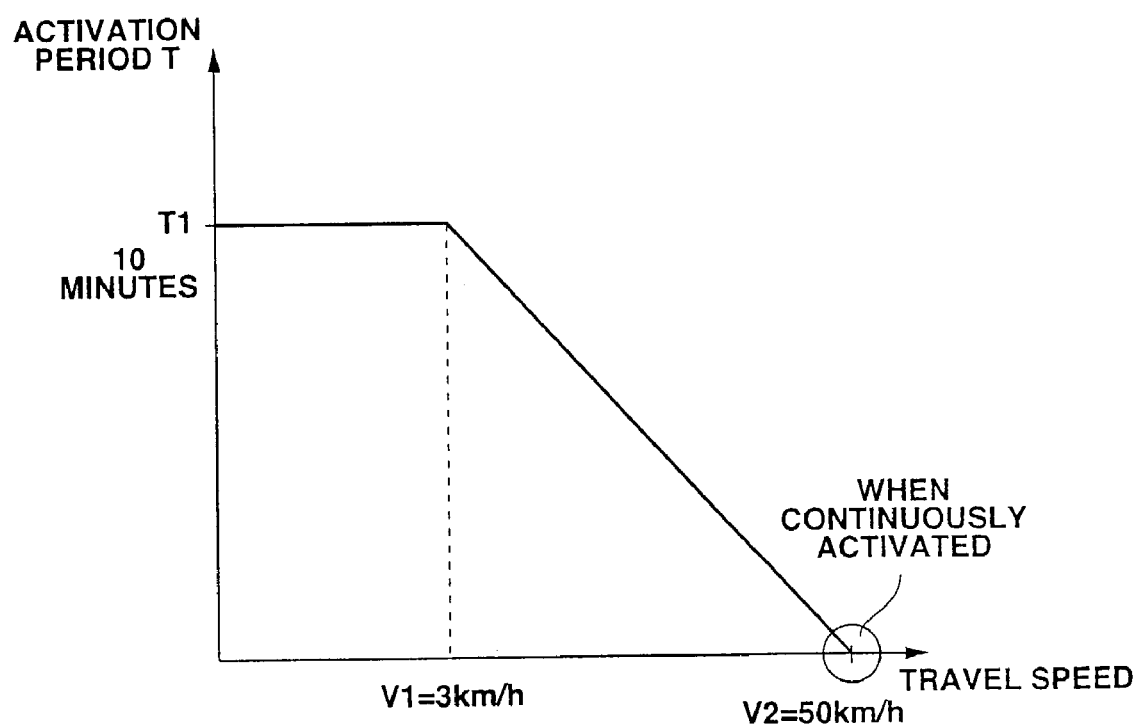
FIG. 25 is a graph illustrating changes in an activation period of a communication terminal.

The travel speed V is then calculated according to the following expression:

$V$=(position detected during present activation time−position detected during previous activation time)/current activation period $T$ The relationship between the travel speed V and the activation period T is illustrated in the graph in FIG. 25. When the travel speed V is sufficiently low, or in other words when V1 (=3 km/h) or less, the activation period T is set at the maximum period T1 (=10 minutes). As the travel speed V increases from V1 toward a cruising speed V2 (=50 km/h) during transportation by the trailer, the activation period T becomes shorter. When the travel speed V reaches the cruising speed V2, the activation period T is zero (duty ratio D is one), that is the communication terminal 56 enters a state of perpetual activation.

The activation period T is determined by determining from the graph shown in FIG. 25 an activation period T in accordance with the travel speed V which is determined according to the aforementioned calculation expression.

Thus, as the travel speed V of the mobile work machine 31 increases, the activation period T becomes shorter and a more detailed movement trajectory (a movement trajectory in which the time interval between each displayed movement position is short) is displayed on a display screen of the terminal 11 serving as the display recipient terminal. As a result, a situation in which the mobile work machine 31 has finished work at a work site and is traveling to the next work site can be accurately grasped on the terminal 11 side. Further, at the cruising speed V2 of the transporter (trailer) 35, the communication terminal 56 enters a state of perpetual activation such that the movement position of the mobile work machine 31 is displayed at all times, and thus it is possible to constantly monitor a situation on a display screen of the terminal 11 in which, for example, the trailer 35 loaded with the mobile work machine 31 is traveling on a highway along which driving is forbidden. As a result, process management and transportation management efficiency are greatly improved. Furthermore, as the travel speed of the mobile work machine 31 increases, the duty ratio D of the on/off activation of the communication terminal 56 is increased, and thus simultaneous accurate monitoring of the mobile work machine 31 in motion and suppression of the power consumption during communication may be realized.

In the embodiment described above, activation of the communication terminal 56 is performed intermittently at fixed periods T. However, activation of the communication terminal 56 may be performed intermittently whenever a specific time is reached.

For example, the communication terminal 56 may be activated when a specific time is reached at which communication between the communication satellite 9 and the mobile work machine 31 is favorable. This specific time corresponds to the position (altitude) of the communication satellite 9.

FIG. 13(*a*) illustrates the positional relationship between the communication satellite 9 and the mobile work machine 31. Obstructions 123 to communication such as mountains and buildings are interposed on the communication path (the wireless communication line 5) between the communication satellite 9 and the mobile work machine 31.

When the communication satellite 9 is at high altitude (when the maximum elevation angle is large), few communication obstructions are caused by the obstacles 123 and the communication state becomes favorable. Thus, when the communication satellite 9 reaches a high altitude, the communication terminal 56 is activated and communication is performed with the communication satellite 9.

Note, however, that in order to activate the communication terminal 56, information regarding the position in the air of the communication satellite 9 must be stored on the mobile work machine 31 side.

Air position information of the communication satellite 9 changes every day. Therefore, if this air position information is stored in the memory of the mobile work machine 31 every day, problems may occur with regard to lack of memory capacity and memory occupancy.

Hence in this embodiment, as is illustrated in FIG. 13(*a*), a predetermined amount of air position information 124 is transmitted from the communication satellite 9 to the mobile work machine 31 via the wireless communication line 5.

A clock is provided in the interior of the communication terminal 56 of the mobile work machine 31. Thus, by comparing the received air position information 124 and the time measured by the clock, a judgment is made as to whether the communication terminal 56 is to be activated or not.

FIG. 13(*b*) shows the air position information of the communication satellite 9 on a certain day.

In FIG. 13(*b*), "AOS" indicates the time and the azimuth angle at which the communication satellite 9 appears on the horizon, "MEL" indicates the time and azimuth angle at which the communication satellite reaches maximum elevation angle, and "LOS" indicates the time and azimuth angle at which the communication satellite 9 disappears below the horizon. The journey of the communication satellite 9 over the surrounding parts is illustrated in FIG. 13(*c*).

Processing to activate the communication terminal 56 is executed in the communication terminal 56 of the mobile work machine 31 when a maximum elevation angle which is equal to or greater than a predetermined threshold (for example 45°) is obtained from the air position information 124 shown in FIG. 13(*b*), or in other words at the times 4:33 and 16:28, at which maximum elevation angles of 66° and 54° are obtained. That is, when specific times 4:33 and 16:28 are reached, the main power supply circuit of the communication terminal 56 is driven and a signal indicating mobile body information is transmitted to the communication satellite 9 via the wireless communication line 5.

New air position information 124 data are then transmitted from the communication satellite 9 to the mobile work machine 31 via the wireless communication line 5 at this specific time every day, for example Thus the air position information 124 content stored in the memory of the mobile work machine 31 is updated.

According to this embodiment, as illustrated in FIG. 13, the communication terminal 56 is activated whenever a specific time is reached at which communication between the communication satellite 9 and the mobile work machine 31 may be performed favorably. As a result, power saving is achieved and communication between the communication satellite 9 and the mobile work machine 31 is performed reliably. Further, since air position information 124 is received from the outside by means of communication, problems concerning lack of memory capacity and memory occupancy on the mobile work machine 31 side do not occur.

Also in this embodiment, activation of the communication terminal 56 is performed intermittently at a predetermined period T, but this activation period T may be modified at will from the administrator side terminal 11, for example. In this case, as will be described below, an electronic mail containing modification data indicating modification of the activation period T is transmitted from the terminal 11 to the mobile work machine 31 with the mobile work machine 31 as the mail address. The modification data written in the electronic mail are then read in the communication terminal 56 of the transmission recipient mobile work machine 31, whereupon the activation period T is modified in accordance with the content of the modification data.

For example, when the service meter of the mobile work machine 31 exceeds a predetermined value (upon aging), the activation period T is shortened so as to monitor the situation carefully at short intervals. When the mobile work machine 31 is loaned to a specific user (when monitoring is not necessary), or when the vehicle is not in use for a long period of time (when it is clear that operations are halted), the activation period T is lengthened in order to lengthen monitoring intervals and thereby reduce wasteful power consumption and communication costs. Identical activation periods T for a plurality of working, running mobile bodies forming a group may be modified all at once.

According to this embodiment, the activation period T may be modified by a remote control operation on the terminal 11 side while monitoring the conditions of a mobile body and the peripheral conditions. Hence there is no need for a worker to go to the respective locations of the mobile bodies 31, 32 . . . to perform activation period T modification work, as a result of which the workload is greatly reduced.

According to the embodiment as described above, communication between the plurality of terminals 11, 12 . . . and mobile bodies 31 to 35, such as construction machines, which are non-operational for a long period of time is possible even when the engines of the mobile bodies 31 to 35 are off, and thus responses may be issued to requests from the terminals 11, 12 . . . . Further, wasteful power consumption is suppressed.

This embodiment, in which the communication power supply is intermittently switched on, is not limited to the communication system in FIG. 1, and may be applied to any communication system. This embodiment is applicable to any communication system which comprises at least two communication stations such that communication is performed between the two communication stations.

In the aforementioned embodiment, however, a case was envisaged in which mobile body information is displayed on a display recipient terminal (for example terminal 12) only when a request for mobile body information is placed with a request recipient mobile body (for example the mobile work machine 31) from a request original terminal (for example terminal 11).

In the following embodiment, if parameters within a mobile body reach a specific value, specific mobile body information is transmitted automatically and this specific mobile body information is displayed on the terminal side even when no request is placed from the terminal side.

According to this embodiment, the occurrence of an irregular situation (for example a malfunction) in a mobile body which cannot be managed and monitored on the terminal side can be identified, and the operating or resting state of the mobile body can be accurately learned.

Here, as is illustrated in FIG. 2, a parameter in the interior of the mobile work machine 31, for example engine start-up, is detected by a predetermined sensor (for example a sensor which detects the voltage value of an alternator) from among the sensor group 62. As noted above, the detection signal of this sensor is written into a frame signal by the electronic control controller 53 and transmitted along the signal line 52 to be inputted into the communication terminal 56 via the communication controller 54. Note that as long as the on/off state of the engine can be monitored in the communication terminal 56, a known technique other than this method may be used.

Figure 26:
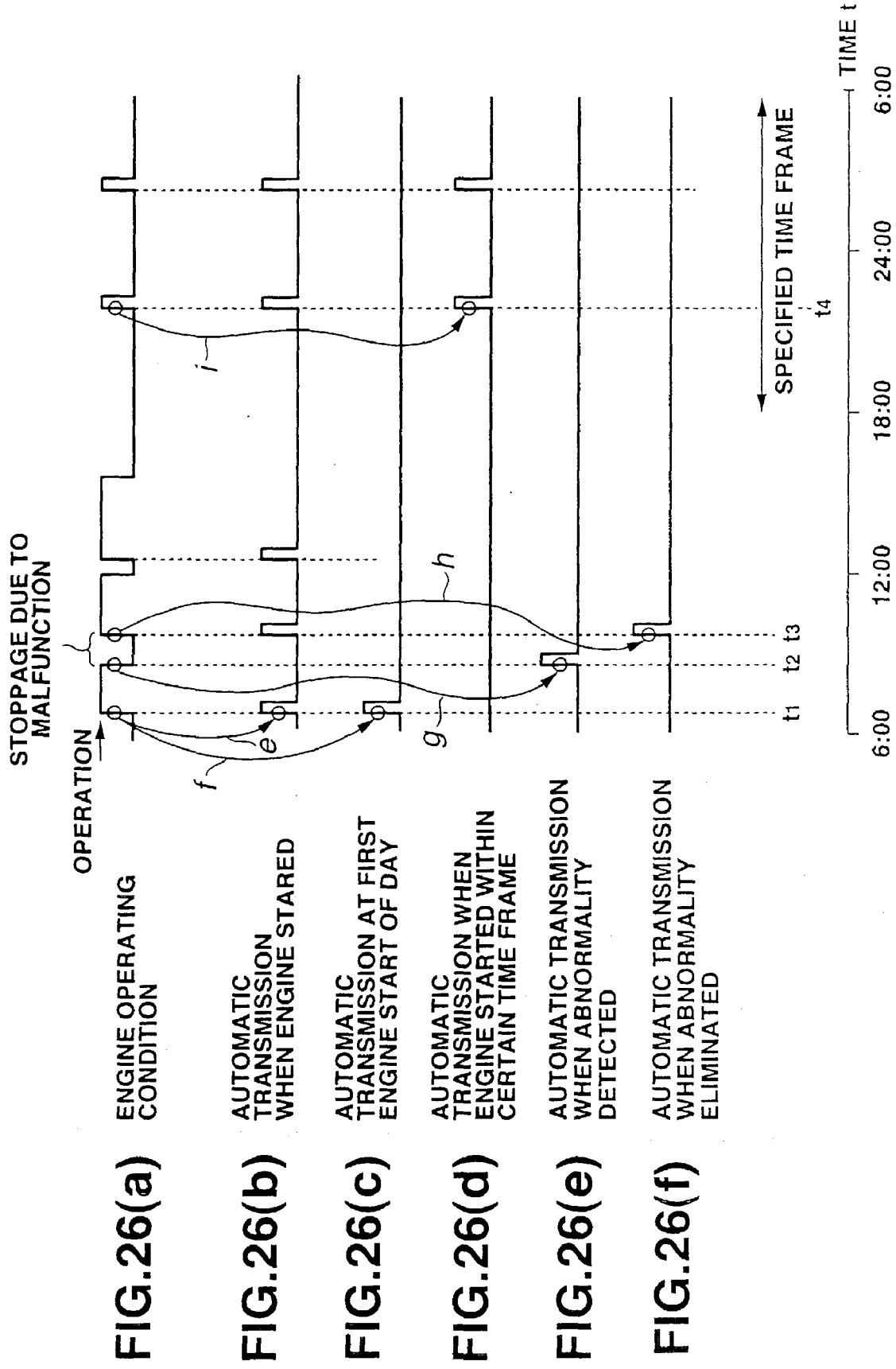
FIGS. 26(a), 26(b), 26(c), 26(d), 26(e), and 26(f) are timing charts illustrating automatic transmission from a mobile body.

FIG. 26(*a*) illustrates a signal indicating the state of engine start-up which is inputted into the communication terminal 56 of the mobile work machine 31. FIG. 26(*a*) shows the state of engine start-up in the mobile work machine 31 at each time t of one day (from 6:00 to the next 6:00). Logic "1" level corresponds to a state in which the engine is operating (start-up), whereas logic "0" level corresponds to a state in which engine operations are halted.

Automatic transmission from the mobile work machine 31 may be performed at every engine start-up time, as is shown in FIG. 26(*b*).

That is, when the engine is started at a time t1, as shown in FIG. 26(*a*), and a signal indicating that the engine has started is inputted into the communication terminal 56, specific mobile body information, for example the current position of the mobile work machine 31, is incorporated into an electronic mail with this signal as a trigger, as is shown by an arrow e, and the electronic mail is transmitted to the communication satellite 9. The recipient mail address of this electronic mail is set as the server terminal 21. When the communication terminal 56 is sleeping due to the aforementioned power saving operation, the electronic mail is transmitted following engine start-up to forcibly activate the communication terminal 56.

Thus when the server terminal 21 is set as the administrator side terminal, successive positions of the mobile work machine 31 each time the engine thereof is started are displayed on a display screen of the administrator side terminal 21. As a result, the administrator can learn the positional history of the mobile work machine 31 each time the engine thereof is started, and thus the occurrence of irregular situations can be identified in the mobile work machine 31, which cannot be managed and monitored at all times, and the operating and resting states of the mobile work machine 31 can be accurately learned.

The electronic mail may be transmitted from the mobile work machine 31 to the recipient mail address of another terminal (terminal 11, terminal 12 . . . and so on).

Automatic transmission from the mobile work machine 31 may also be performed upon the first engine start-up of a day, as is shown in FIG. 26(*c*).

That is, when the engine is started at time t1, as shown in FIG. 26(*a*), a starting signal indicating that the engine has been started is inputted into the communication terminal 56. A clock is provided in the interior of the communication terminal 56, and a judgment is made as to whether this starting signal is the first inputted signal of the day (from 6:00 to the next 6:00). Only when it is determined that the inputted starting signal is the first inputted starting signal of the day is the current position of the mobile work machine 31 incorporated into an electronic mail with the starting signal as a trigger, as shown by an arrow f, and the electronic mail transmitted to the communication satellite 9. Thus the positional history of the mobile work machine 31 is displayed in a similar manner on the administrator side terminal. According to this embodiment, the automatic transmission interval is at least one day, and thus communication costs can be suppressed in comparison with the case described in FIG. 26(*b*).

Note that here, automatic transmission is performed only upon the first engine start-up of the day. However, this time period may be set arbitrarily, and automatic transmission may be performed only upon the first engine start-up of one week, for example.

Automatic transmission from the mobile work machine 31 may also be performed upon engine start-up during a specific time slot (for example 18:00 to 6:00) within one day, as is shown in FIG. 26(*d*).

More specifically, when the engine is started at a time t4 within the time slot 18:00 to 6:00, as is illustrated in FIG. 26(*a*), and a signal indicating that the engine has been started is inputted into the communication terminal 56, the current position of the mobile work machine 31 is incorporated into an electronic mail with this signal as a trigger, as shown by an arrow i, whereupon the electronic mail is transmitted to the communication satellite 9. Thus the positional history of the mobile work machine 31 in the specific time slot is displayed in a similar manner on the administrator side terminal. Here, the specific time slot 18:00 to 6:00 (nighttime) is a time slot during which normal mobile work machines such as construction machines are not in operation. It is also a time slot at which no movement is performed for a long period of time. If the engine is started and the mobile work machine 31 moves during this specific time period, some type of irregularity may have occurred. Since the positional history of the mobile work machine 31 during the specific time slot is displayed on the administrator side terminal, a judgment can be made as to whether an irregularity has occurred in the mobile work machine 31 by monitoring the display screen.

Automatic transmission from the mobile work machine 31 may also be performed when the engine stops due to an irregularity, as is illustrated in FIG. 26(*e*).

Here, the occurrence of an irregularity in the mobile work machine 31, for example "high engine speed", "high engine exhaust temperature", "high cooling water temperature", "low battery voltage", or "low fuel quantity", is detected by a predetermined sensor from the sensor group 62, as is shown in FIG. 2. As noted above, the detection signal of this sensor is written into a frame signal by the electronic control controller 52 as an error code (for example "irregularity item: low fuel quantity"), and is transmitted along the signal line 52 to be inputted into the communication terminal 56 via the communication controller 54. Note that as long as vehicle irregularities can be monitored in the communication terminal 56, a known technique other than this method may be used.

When engine operations are halted at a time t2, as shown in FIG. 26(*a*), a halting signal indicating that the engine has stopped is inputted into the communication terminal 56. In this case, the aforementioned error code is also inputted into the communication terminal 56. A judgment is then made as to whether the halting signal and error code were inputted simultaneously. If the halting signal and error code were inputted simultaneously, it is judged that the engine was halted due to an irregularity (malfunction), and the current position of the mobile work machine 31 is incorporated into an electronic mail with this halting signal as a trigger, as shown by an arrow g, whereupon the electronic mail is transmitted to the communication satellite 9. The position of the mobile work machine 31 is then displayed in a similar manner on the administrator side terminal. According to this embodiment, the position of the mobile work machine 31 is displayed on the terminal side only when the engine has stopped due to the detection of an irregularity, and thus the position at the time of the irregularity occurrence can be accurately learned. As a result, rapid measures can be taken against the irregularity and damage to the mobile work machine 31 can be minimized.

Rather than performing automatic transmission simply when an irregularity occurs, a specific irregularity item (a serious irregularity item) from among the irregularity items (error codes) may be set in advance such that automatic transmission is performed only when this serious irregularity occurs.

Automatic transmission from the mobile work machine 31 may also be performed upon engine start-up following irregularity elimination, as is shown in FIG. 26(*f*).

When the engine is started at a time t3, as is shown in FIG. 26(*a*), a starting signal indicating that the engine has been started is inputted into the communication terminal 56. In this case, the aforementioned error code is also inputted into the communication terminal 56. When a service person or the like takes prescribed measures against the irregularity so as to eliminate the irregularity (malfunction), the error code is no longer inputted into the communication terminal 56. At the point in time at which the error code ceases to be inputted, a judgment is made in the communication terminal 56 as to whether the engine has started. If the engine starts at the point in time at which the error code ceases to be inputted, it is judged that the irregularity (breakdown) has been eliminated and the engine has been started, and hence the current position of the mobile work machine 31 is incorporated into an electronic mail with the starting signal as a trigger, as is shown by an arrow h, whereupon the electronic mail is transmitted to the communication satellite 9. Thus the position of the mobile work machine 31 is displayed in a similar manner on the administrator side terminal. According to this embodiment, the position of the mobile work machine 31 is displayed on the terminal side only when the engine is started following the elimination of an irregularity, and therefore the position at the point when the irregularity is appropriately dealt with can be learned accurately.

Automatic transmission from the mobile work machine 31 of specific mobile body information, for example an operating map up to 23:00 of that day (storage indicating the times at which the engine started and ceased to operate), may be performed at a specific time (for example 23:00). In so doing, a day-to-day operating map is displayed on a display screen on the terminal side, as is shown in FIG. 30.

Specific mobile body information may also be automatically transmitted from the mobile work machine 31 at a specific time every few days (for example at 23:00 every three days).

Specific mobile body information may also be automatically transmitted from the mobile work machine 31 at a specific time every specific day of the week (for example at 23:00 every Saturday).

By transmitting specific mobile body information at a specific time as described above, specific mobile body information regarding the mobile work machine 31 can be periodically obtained from a display screen on the terminal side.

Further, specific mobile body information (for example "service meter", "vehicle warning 1" (error code 1), "vehicle warning 2" (error code 2), "battery voltage", "engine water temperature", "engine speed", "pump pressure", or "oil quantity") may be automatically transmitted when the cumulative value of the operating time of the mobile work machine 31 reaches a specific cumulative operating time value, for example when the absolute value of the service meter reaches 100 hours, 300 hours, and 500 hours.

By transmitting specific mobile body information at a specific cumulative operating time value in this manner, preliminary information for performing a statutory routine inspection can be obtained on a terminal side display screen. Since automatic transmission is performed in accordance with an operating time transition (load), meaningless communication during vehicle resting time can be avoided and thus communication costs can be suppressed.

Further, specific mobile body information (for example "service meter", "vehicle warning 1" (error code 1), "vehicle warning 2" (error code 2), "battery voltage", "engine water temperature", "engine speed", "pump pressure", or "oil quantity") may be automatically transmitted whenever the cumulative value of the operating time of the mobile work machine 31 increases by a specific amount, for example whenever the increase value of the service meter reaches 100 hours following the previous automatic transmission (or whenever the increase value reaches 500 hours). Note that the service meter increase value may be set in alignment with the patrol time of the service car 34.

By transmitting specific mobile body information each time the cumulative operating time value increases by a specific amount in this manner, preliminary information for performing a statutory routine inspection can be obtained on a terminal side display screen. When displayed on the administrator side terminal, patrol instructions can be easily provided to the service car 34. When displayed on the service person side terminal, a mobile work machine in need of service can be easily specified and services can be performed quickly by the service car 34. Further, since automatic transmission is performed in accordance with an operating time transition (load), meaningless communication during vehicle resting time can be avoided, and thus communication costs can be suppressed.

Various modifications may be made to this embodiment. These will now be described with reference to FIGS. 9, 10, 11, 12, and 14.

This automatic transmission may be performed at the point in time when the position of the mobile work machine 31 changes.

The position of the mobile work machine 31 is detected by the GPS sensor 57 as illustrated in FIG. 2. The detection result of the GPS sensor 57 is inputted into the communication controller 54. When it is judged in the communication controller 54 that the position of the mobile work machine 31 has changed, post-change positional information is transmitted to the communication terminal 56 as transmission data. An electronic mail in which the positional information is written is then automatically transmitted from the communication terminal 56 via the satellite communication antenna 58.

By transmitting positional information whenever the position of the mobile work machine 31 changes in this manner, the movement history of the mobile work machine 31 can be obtained on a terminal side display screen.

Figure 10:
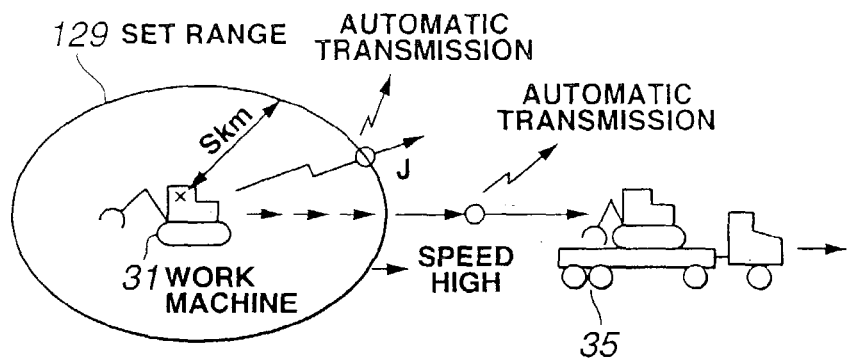
FIG. 10 is a view illustrating a situation in which a mobile body performs automatic transmission.

Automatic transmission can also be performed when the mobile work machine 31 deviates from a specific set range 129, as is shown in FIG. 10.

The position of the mobile work machine 31 is detected by the GPS sensor 57 as illustrated in FIG. 2. The detection result of the GPS sensor 57 is inputted into the communication controller 54. Positional information concerning a work site is stored in the communication controller 54. The set range 129 of this work site is a circle with a radius S (km). The detected position of the mobile work machine 31 and the boundary position of the set range 129 are then compared, and a judgment is made as to whether or not the mobile work machine 31 has deviated from the set range 129. When the mobile work machine 31 reaches the boundary position J of the set range 129, the positional information of the mobile work machine 31 at that time is transmitted to the communication terminal 56 as transmission data. An electronic mail containing the positional information is then automatically transmitted from the communication terminal 56 via the satellite communication antenna 58.

By transmitting positional information when the mobile work machine 31 deviates from the set range 129 (when the mobile work machine 31 passes a set position), monitoring of whether or not the mobile work machine 31 is operating within the work site can be performed easily on a terminal side display screen. The set range 129 is not limited to a fixed range such as a work site, but may be a range centering on a previous position of the mobile work machine 31. In other words, the set range may be updated with the passing of time.

Further, the shape of the set range 129 is not limited to a circle, but may be set in an arbitrary shape such as an ellipse, a square, a rectangle, or an ellipse or rectangle in which the direction of advance of the mobile work machine 31 is set as the long side.

The set range 129 in FIG. 10 may also be set as a range corresponding to the normal set range 117 in FIG. 23(*a*).

Automatic transmission may also be performed when the amount of change in the movement position of the mobile work machine 31 exceeds a set value, as is illustrated in FIG. 10.

The position of the mobile work machine 31 is detected by the GPS sensor 57 as illustrated in FIG. 2. The detection result of the GPS sensor 57 is inputted into the communication controller 54 at a constant sampling period. The travel speed V of the mobile work machine 31 is calculated on the basis of the difference value between the previous detected position and present detected position and the sampling time. The travel speed V of the mobile work machine 31 and a set value V2 (FIG. 25) are then compared, and a judgment is made as to whether or not the velocity V of the mobile work machine 31 exceeds the set value V2. When the velocity V of the mobile work machine 31 exceeds the set value V2, the positional information of the mobile work machine 31 at that time is transmitted to the communication terminal 56 as transmission data. An electronic mail containing the positional information is then automatically transmitted from the communication terminal 56 via the satellite communication antenna 58.

By transmitting positional information when the velocity V of the mobile work machine 31 exceeds the set value V2 in this manner, monitoring of the state of movement of the mobile work machine 31 can be performed easily on a terminal side display screen. Mobile work machines 31 such as construction machines travel at an extremely low speed. Thus, if the set value V2 is set at a high speed which the mobile work machine 31 could not attain by self-advancement, for example the speed of the trailer 35 when driving on a highway, then the mobile work machine 31 can be judged to be in transit on the trailer 35 when the velocity V of the mobile work machine 31 exceeds the set value V2. Further, when the mobile work machine 31 is being transported by the trailer at a time and in circumstances when transportation is not typically performed, the occurrence of an irregularity can be confirmed, and appropriate measures can be taken rapidly.

Figure 9:
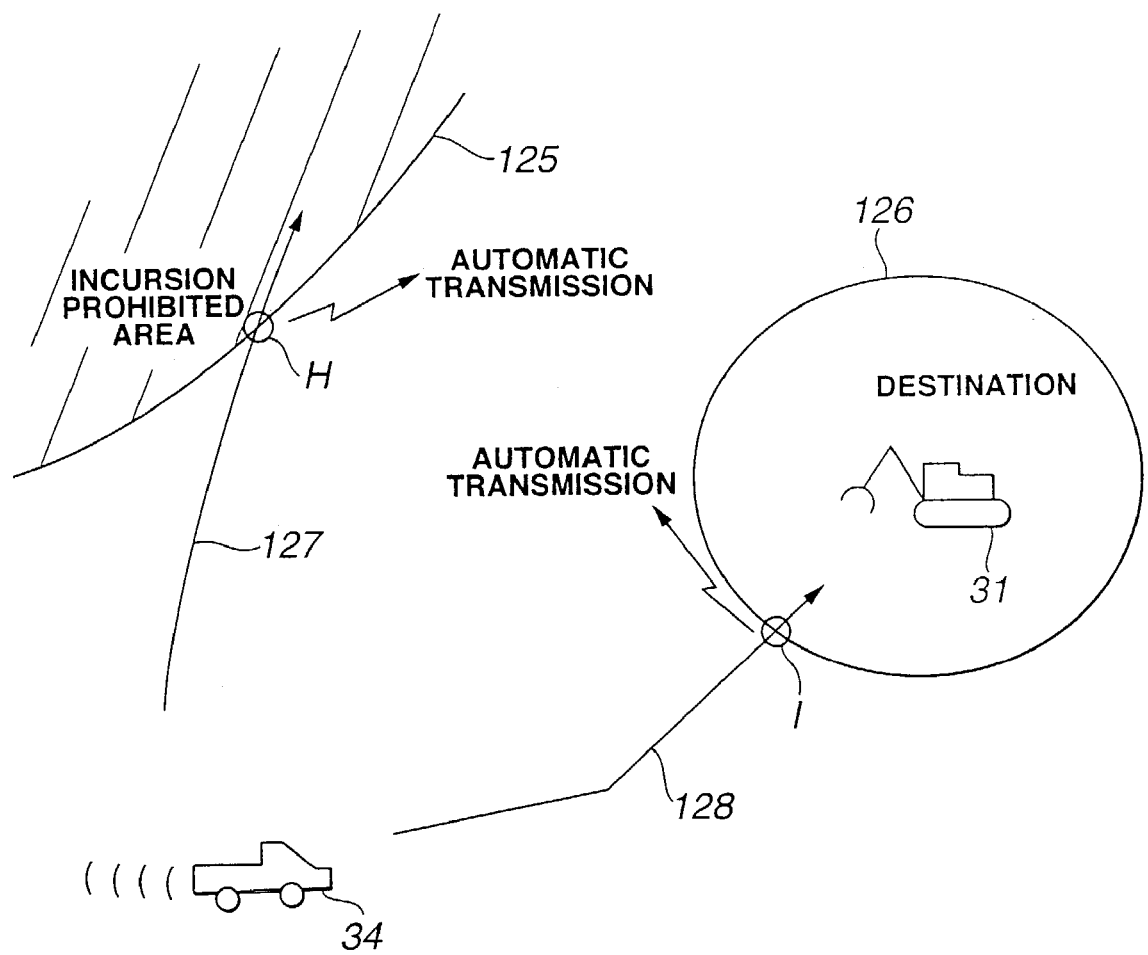
FIG. 9 is a view illustrating a situation in which a mobile body performs automatic transmission.

Automatic transmission may also be performed when the service car 34 penetrates specific set ranges 125, 126, as is shown in FIG. 9.

The position of the service car 34 is detected by the GPS sensor 57 as shown in FIG. 2. The detection result of the GPS sensor 57 is inputted into the communication controller 54. Positional information regarding the recipient location 126 of the service subject mobile work machine 31 and a forbidden entry area 125 is stored in the communication controller 54. The set range 126 of this recipient location is a circle with a predetermined radius, centering on the position of the mobile work machine 31. The forbidden entry area 125 is, for example, a road to which access has been restricted due to heavy rainfall or an area with poor ground.

The detected position of the service car 34 and the boundary positions of the set ranges 125, 126 are then compared, and a judgment is made as to whether the service car 34 has penetrated the set range 125 or 126. When the service car 34 reaches the boundary position H or I of the set range 125 or 126 while driving along route 127 or route 128, the positional information of the service car 34 at that time is transmitted to the communication terminal 56 as transmission data. An electronic mail containing the positional information is then automatically transmitted from the communication terminal 56 via the satellite communication antenna 58.

By transmitting positional information when the service car 34 penetrates the set range 125 or 126 (when the service car 34 exceeds a set position), monitoring of whether the service car 34 has reached its recipient or entered the forbidden entry area can be performed easily on a terminal side display screen. In other words, an administrator can confirm from the display screen of the administrator side terminal that the service car 34 has reached the recipient location 126 and begun services, and can also confirm that the service car 34 has entered the forbidden entry area 125 and is in a dangerous situation. As a result, appropriate work instruction data (the message "return as soon as finished" or "avoid forbidden entry area" can be transmitted to the service car 34 as noted above from the administrator side terminal (see FIG. 4).

Note that the shape of the recipient location set range 126 is not limited to a circle, and may be set in an arbitrary shape such as an ellipse, a square, or a rectangle.

Further, the set ranges 125, 126 shown in FIG. 9 may be set as ranges corresponding to the irregular range 118 shown in FIG. 23(*b*).

Figures 11A, 11B:
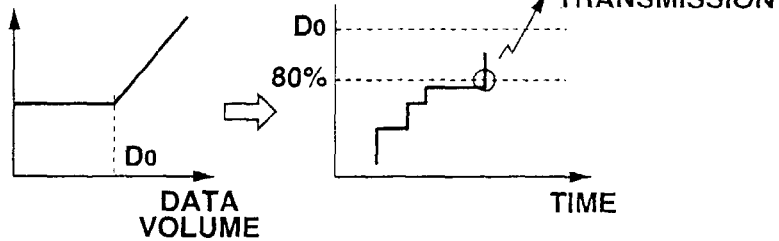
FIG. 11 is a graph for illustrating an embodiment in which automatic transmission is performed by a mobile body.

Automatic transmission may also be performed when the data amount to be transmitted matches a set value or exceeds a set value, as is shown in FIG. 11.

In a communication system employing a pay-per-use system, the communication fee to be paid per use is a fixed monthly charge up to a predetermined data amount D0, as is illustrated in FIG. 11(*a*). When the data amount D exceeds a set value D0, an additional charge equivalent to the amount of excess data must be paid.

For this purpose, specific mobile body information to be automatically transmitted is gathered and accumulated in the communication controller 54 from the mobile work machine 31. The accumulated data amount D and a set value (80% of D0) are compared in the communication controller 54. Then, at the point when the accumulated data amount D matches the set value (80% of D), as is shown in FIG. 11(*b*), the accumulated mobile body information is transmitted to the communication terminal 56 as transmission data. An electronic mail containing this mobile body information is then automatically transmitted from the communication terminal 56 via the satellite communication antenna 58.

By transmitting mobile body information at the point when the data amount D to be automatically transmitted matches (or exceeds) a set value in this manner, the maximum amount of mobile body information within the fixed charge can be displayed on a terminal side display screen.

Figure 12A:
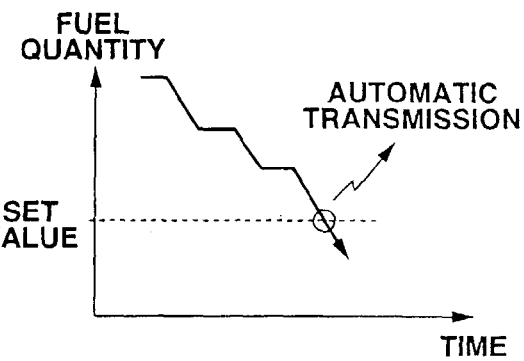
FIG. 12 is a graph for illustrating an embodiment in which automatic transmission is performed by a mobile body.

Automatic transmission may also be performed when the fuel quantity matches a set value or falls below a set value, as is illustrated in FIG. 12(a).

Fuel quantities are detected by the sensor group 62 in the mobile work machine 31 and successively transmitted to the communication controller 54. The detected fuel quantity and a set value are compared in the communication controller 54. Then, at the point when the detected fuel quantity matches the set value, as is shown in FIG. 12(a), mobile body information ("position", "fuel quantity") is transmitted to the communication terminal 56 as transmission data. An electronic mail containing this mobile body information is then automatically transmitted from the communication terminal 56 via the satellite communication antenna 58.

By transmitting mobile body information at the point when the fuel quantity matches a set value (or falls below a set value) in this manner, the time to re-supply fuel can be confirmed from a terminal side display screen. As a result, appropriate work instruction data (a message "re-supply fuel") can be transmitted from the administrator side terminal to the service car 34 which is performing a routine fuel-supply service in a similar manner to FIGS. 3 and 4.

Figure 12B:
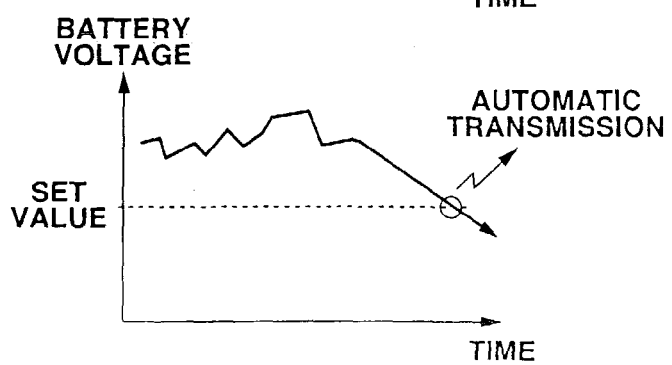
Figure 14:
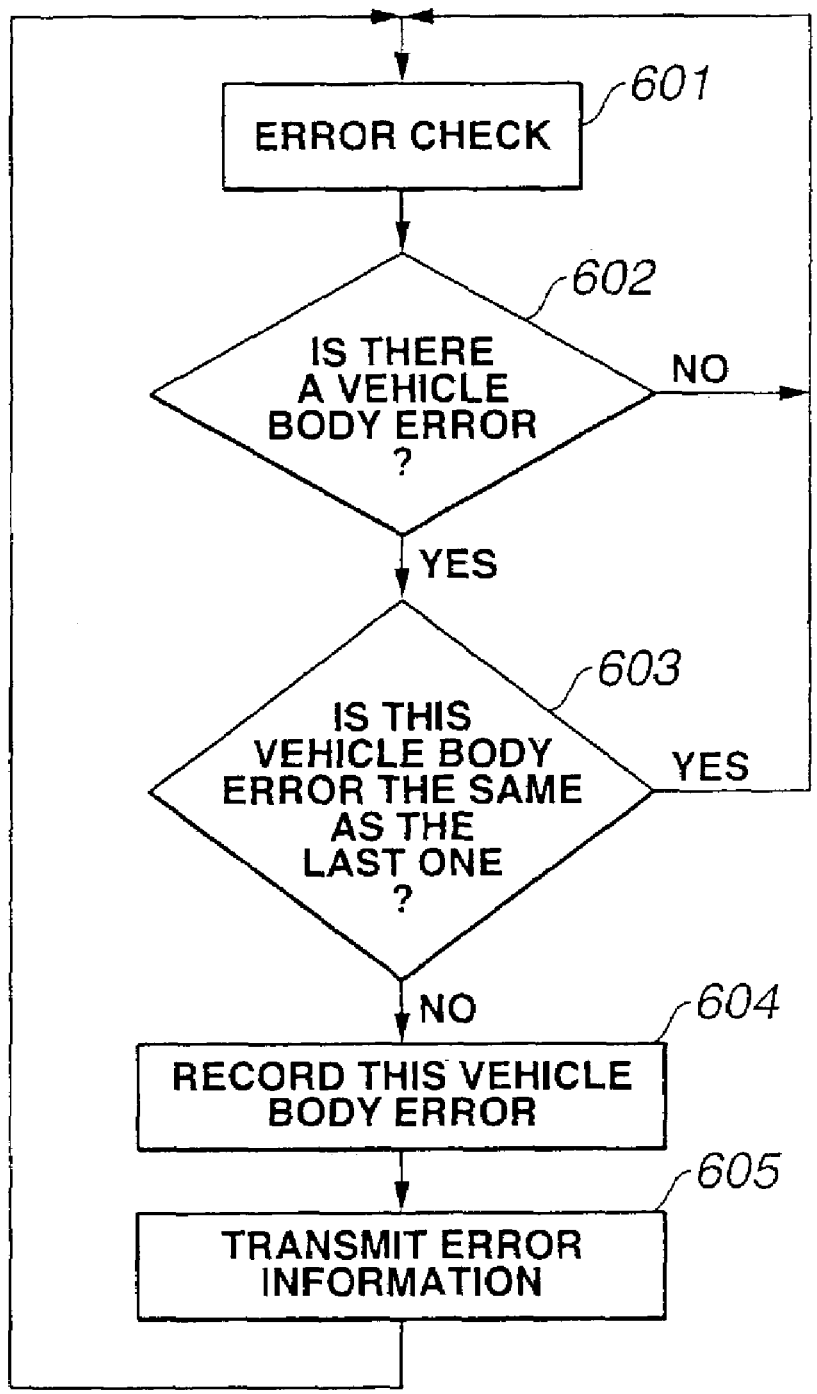
FIG. 14 is a flowchart illustrating the processing sequence when automatic transmission is performed by a mobile body.

Automatic transmission can also be performed at the point when the voltage of the battery 63 matches a set value or falls below a set value, as is shown in FIG. 12(b).

Voltage values of the battery 63 are detected by the sensor group 62 in the mobile work machine 31 and successively transmitted to the communication controller 54. The detected battery voltage and a set value are compared in the communication controller 54. Then, at the point when the detected battery voltage matches the set value, as is shown in FIG. 12(b), mobile body information ("position", "battery voltage") is transmitted to the communication terminal 56 as transmission data. An electronic mail containing this mobile body information is then automatically transmitted from the communication terminal 56 via the satellite communication antenna 58.

By transmitting mobile body information at the point when the voltage of the battery 63 matches a set value (or falls below a set value) in this manner, the time for maintenance and inspections such as charging or replacing the battery 63 can be confirmed from the terminal side display screen. As a result, appropriate work instruction data (a message "check battery") can be transmitted from the administrator side terminal to the service car 34 in a similar manner to FIGS. 3 and 4. Further, when it is learned from the terminal side display screen that the battery 63 is near to a state of discharge, a request to switch the sleep function on can be transmitted such that communication with the mobile work machine 31 is performed only intermittently, as a result of which further battery discharge can be suppressed.

Provision may also be made such that automatic transmission is not performed when the previous automatically transmitted mobile body information and the mobile body information to be automatically transmitted currently have the same content.

As is illustrated in FIG. 2, irregularities occurring in the mobile work machine 31 such as "high engine speed", "high engine exhaust temperature", "high cooling water temperature", "low battery voltage", or "low fuel quantity" are detected by a predetermined sensor from among the sensor group 62. The detection signals of this sensor are written as an error code (for example "irregularity item: low fuel quantity") into a frame signal in the electronic control controller 53, as noted previously, and transmitted along the signal line 52 to be successively inputted into the communication controller 54.

The previous automatically transmitted error code and the current inputted error code are compared in the communication controller 54. Then, only when the content of the previous automatically transmitted error code and the current inputted error code differs is the current inputted error code transmitted to the communication terminal 56 as transmission data. An electronic mail containing this mobile body information is then automatically transmitted from the communication terminal 56 via the satellite communication antenna 58.

Since automatic transmission is performed only when the content of the previous automatically transmitted error code and the current inputted error code differs, and automatic transmission is not performed when the content of the previous automatically transmitted error code and the current inputted error code is the same, the wasteful transmission of the same information a number of times can be avoided. This is similar for a case in which mobile body information other than an error code is automatically transmitted.

In the above embodiment, specific mobile body information is automatically transmitted when a parameter in a mobile body reaches a specific value. However, the content of the "parameter" (storage data such as the data amount D and sensor-detected data such as the battery voltage), the "specific value", and the "specific mobile body information" may be modified at will from the administrator side terminal (server terminal 21, terminal 11). In this case, as noted above, an electronic mail containing modification data indicating modification of the parameter or the like is transmitted from the terminal to the mobile work machine 31 with the mobile work machine 31 as the mail address. The modification data written in the electronic mail are then read in the communication terminal 56 of the transmission recipient mobile work machine 31, whereupon the parameter or the like is modified in accordance with the content of the modification data.

For example, the content of the "parameter", "specific value", and "specific mobile body information" is modified such that when the service meter of the mobile work machine 31 exceeds a predetermined value (upon aging), the monitoring interval is shortened, and when the mobile work machine 31 is loaned to a specific user (when monitoring is not necessary), or when the vehicle is not in use for a long period of time (when it is clear that operations are halted), the monitoring interval is lengthened to thereby reduce wasteful power consumption and communication costs. Note that identical content for a plurality of working, running mobile bodies forming a group may be modified all at once. For example, the "specific mobile body information" may be reduced to only important monitoring items.

According to this embodiment, the timing and content of automatic transmission may be modified by a remote control operation on the terminal side while monitoring the conditions of a mobile body and the peripheral conditions. Hence there is no need for a worker to go to the respective locations of the mobile bodies 31, 32 . . . to perform modification work, as a result of which the workload is greatly reduced.

Note that if the mobile body information to be transmitted by automatic transmission is the position of a mobile body, the latitude and longitude on the map may be transmitted as positional information, or a position which is relative to a specific reference may be transmitted as positional information.

Further, rather than automatically transmitting a voltage value of the battery 63 as mobile body information, an amount of change in the voltage of the battery 63 may be automatically transmitted.

Further, operating load information, work quantity, or fuel consumption amount may be automatically transmitted as mobile body information.

According to the aforementioned embodiments, specific mobile body information from the point in time when a specific parameter reaches a specific value can be learned on a terminal side display screen without the need for a self-performed request input operation on the terminal side. As a result, the occurrence of an irregular situation (for example a malfunction or the like) can be identified in a mobile body which cannot be managed and monitored at all times, and the operating state and resting state of the mobile body can be grasped accurately.

This automatic transmission embodiment is not limited to the communication system illustrated in FIG. 1, and may be applied to any communication system. This embodiment is applicable to any communication system which comprises at least two communication stations such that communication is performed between the two communication stations.

The amount of information to be displayed on the terminals 11, 12 is vast. Hence an embodiment will now be described in which only important information from this vast amount of information is set in advance, and only this important information is displayed on a specific display screen in summary. As a result of this embodiment, the occurrence of irregularities can be identified and dealt with quickly on the administrator side.

The following embodiment will be described with the mobile work machine 31 as a representative. It is also assumed that the administrator side terminal for managing the mobile work machine 31 is the terminal 11, and that the server of the terminal 11 is the server terminal 21.

Although not shown in FIG. 2, a start-up lock circuit is installed in the vehicle body 50 of the mobile work machine 31. This start-up lock circuit is constituted by a relay and the like, and is interposed between the ignition switch 64 (FIG. 21) and a fuel injection device.

When a start-up lock setting command is outputted from the communication controller 54, the start-up lock circuit relay is energized such that start-up lock is set. In other words, fuel is not injected even if the ignition switch 64 is switched on, and the engine cannot be started. Conversely, when a start-up lock release command is outputted from the communication controller 54, the start-up lock circuit relay is de-energized and the start-up lock released. In other words, fuel is injected and the engine is started by switching the ignition switch 64 on.

The vehicle 31 sometimes moves by self-advancement and sometimes moves when loaded onto a transporter such as a trailer. Here, movement when loaded onto a trailer is assumed. Note, however, that the following processing may be applied similarly to a case in which the vehicle 31 moves by self-advancement.

A Web site display screen called an "notification screen", as shown in FIG. 34, is created in the server terminal 21. This "notification screen" is set as the homepage of the Web site. Only the following important information is displayed in summary on the "notification screen".

Information regarding the fact that the vehicle 31 is outside of a set range.
a) Information regarding the fact that the engine of the vehicle 31 has been started outside of regular hours.
b) Information regarding the fact that the battery voltage of the vehicle 31 has decreased.
c) Information regarding the fact that start-up locking has been set or released.
d) Information regarding the fact that communication between the vehicle 31 and the server terminal 21 has been interrupted.
e) Information regarding the fact that a request has not yet reached the vehicle 31 (for example information regarding the fact that a start-up lock has not yet been set in the vehicle 31 even though a start-up lock setting command has been issued).

In other words, automatic transmission is performed from the vehicle 31 side, and when the automatically transmitted mobile body information is received by the server terminal 21, a judgment is made in the server terminal 21 as to whether or not this mobile body information is to be displayed on the "notification screen" of the Web site.

If the engine on the vehicle 31 side is started outside of the regular hours (17:00 to 8:00), information noting that "the engine of vehicle 31 has been started" is automatically transmitted to the server terminal 21 by electronic mail. This mobile body information corresponds to the above-mentioned specific information b), and therefore it is judged that this information should be displayed on the "notification screen". The display content of the "notification screen" is thus updated.

Thus, when the WWW browser is activated by the terminal 11 which manages the vehicle 31, Web site data are read from the server terminal 21 via the WWW browser and displayed on a display screen of the display device of the terminal 11.

FIG. 34 illustrates the homepage of the Web site displayed on the display device of the terminal 11, or in other words the screen which is displayed upon activation.

As is illustrated in FIG. 34, the content "vehicle engine was started outside regular hours" is displayed together with content specifying the "time of occurrence", and the "manufacturer", "model", "model number", "machine number", and "ID" of the vehicle 31. From the display screen, the administrator can learn of the vehicle 31 that "engine was started outside regular hours", and can take accurate and swift measures against irregularities such as pranks.

The administrator can set the vehicle 31 to a start-up locked state with a remote control operation. This is executed by setting the display screen of the terminal 11 to an "engine reactivation prohibition setting screen" and clicking a "prohibit engine reactivation" button. In so doing, an electronic mail indicating that the vehicle 31 is to be set to a start-up locked state is transmitted to the vehicle 31 side from the terminal 11.

When data indicating that the vehicle 31 is to be set to a start-up locked state are received in the communication terminal 56 on the vehicle 31 side via the satellite communication antenna 58, these data are downloaded into the communication controller 54. In so doing, a start-up lock setting command is outputted to the start-up lock circuit from the communication controller 54. As a result, the start-up lock circuit relay is energized and a start-up locked state is set. In other words, fuel is not injected even if the ignition switch 64 is switched on, and the engine of the vehicle 31 cannot be restarted.

A judgment is made on the vehicle 31 side as to whether start-up lock has been set or not. If it is judged on the vehicle 31 side that start-up lock has been set, information stating that "vehicle 31 has been remotely set to start-up lock" is automatically transmitted to the server terminal 21 by electronic mail. This mobile body information corresponds to the aforementioned specific information d), and therefore a judgment is made by the server terminal 21 that this information should be displayed on the "notification screen". The display content of the "notification screen" is thus updated.

As is illustrated in FIG. 34, the content "the lock was set by remote" is displayed on the display screen of the terminal 11 together with content specifying the "time of occurrence", and the "manufacturer", "model", "model number", "machine number", and "ID" of the vehicle 31. From the display screen, the administrator can confirm that "start-up lock setting has been performed remotely" in the vehicle 31.

The transmission of the electronic mail indicating that the vehicle 31 has been set in a start-up locked state is stored in the server terminal 21. If information stating that "start-up lock setting has been performed remotely" is not transrmitted in reply by electronic mail from the vehicle 31 side following the elapse of a predetermined amount of time after the transmission of the electronic mail to the vehicle 31 side, it is judged in the server terminal 21 that "a start-up lock has not been set in the vehicle 31 even though a start-up lock setting command was issued". In other words, it is judged that "a request has not reached the vehicle 31". The cause thereof may be either an operating defect or the like in the start-up lock circuit of the vehicle 31, or a communication defect between the vehicle 31 and the server terminal 21. This mobile body information or communication state information corresponds to specific information f), and therefore a judgment is made by the server terminal 21 that this information should be displayed on the "notification screen". The display content of the "notification screen" is thus updated.

As is illustrated in FIG. 34, the content "no confirmation of locking received from vehicle" is displayed on the display screen of the terminal 11 together with content specifying the "time of occurrence", and the "manufacturer", "model", "model number", "machine number", and "ID" of the vehicle 31. From the display screen, the administrator can learn of the vehicle 31 that "confirmation of locking has not been obtained", and can take accurate and swift measures against this irregularity.

The administrator can release the vehicle 31 from a start-up locked state by a remote control operation. This is executed by setting the display screen of the terminal 11 to an "engine reactivation release screen" and clicking a "release engine reactivation" button. In so doing, an electronic mail indicating that the start-up locked state of the vehicle 31 is to be released is transmitted to the vehicle 31 side from the terminal 11.

When data indicating that the vehicle 31 is to be released from the start-up locked state are received in the communication terminal 56 on the vehicle 31 side via the satellite communication antenna 58, these data are downloaded into the communication controller 54. In so doing, a start-up lock release command is outputted to the start-up lock circuit from the communication controller 54. As a result, the start-up lock circuit relay is de-energized and the start-up locked state is released. In other words, fuel is injected when the ignition switch 64 is switched on, and the engine of the vehicle 31 may be restarted.

A judgment is made on the vehicle 31 side as to whether the start-up lock has been released or not. If it is judged on the vehicle 31 side that the start-up lock has been released, information noting that "vehicle 31 has been remotely released from start-up lock" is automatically transmitted to the server terminal 21 by electronic mail. This mobile body information corresponds to the aforementioned specific information d), and therefore a judgment is made by the server terminal 21 that this information should be displayed on the "notification screen". The display content of the "notification screen" is thus updated.

The content "lock setting has been released remotely" is displayed on the display screen of the terminal 11 together with content specifying the "time of occurrence", and the "manufacturer", "model", "model number", "machine number", and "ID" of the vehicle 31. From the display screen, the administrator can confirm that "start-up lock setting has been released remotely" in the vehicle 31.

The transmission of the electronic mail indicating that the vehicle 31 has been released from a start-up locked state is stored in the server terminal 21. If information noting that "start-up lock setting has been released remotely" is not transmitted in reply by electronic mail from the vehicle 31 side following the elapse of a predetermined amount of time after the transmission of the electronic mail to the vehicle 31 side, it is judged in the server terminal 21 that "a start-up lock has not been released in the vehicle 31 even though a start-up lock release command was issued". In other words, it is judged that "a request has not reached the vehicle 31". The cause thereof may be either an operating defect or the like in the start-up lock circuit of the vehicle 31, or a communication defect between the vehicle 3 1and the server terminal 21. This mobile body information or communication state information corresponds to specific information f), and therefore a judgment is made by the server terminal 21 that this information should be displayed on the "notification screen". The display content of the "notification screen" is thus updated.

The content "no confirmation of lock releasing received from vehicle" is displayed on the display screen of the terminal 11 together with content specifying the "time of occurrence", and the "manufacturer", "model", "model number", "machine number", and "ID" of the vehicle 31. From the display screen, the administrator can learn of the vehicle 31 that "confirmation of lock releasing has not been obtained", and can take accurate and swift measures against this irregularity.

Note that automatic transmission from the vehicle 31 may also be performed when a starting device is operated even though the vehicle 31 has been set in a start-up locked state. That is, information noting that "vehicle has started even though start-up lock was set remotely" may be displayed on the "notification screen" in FIG. 34.

It is assumed that automatic transmission from the vehicle 31 is performed every day at 23:00. When the content of the daily operating map is updated as shown in FIG. 30, the updated operating map is automatically transmitted from the vehicle 31 every day at 23:00. Thus, if no transmission has been performed from the vehicle 31 for a predetermined amount of time, for example 36 hours or more, this signifies the occurrence of an irregularity in the communication state. Here, "36 hours" indicates one day (24 hours) plus-the normal operating time (12 hours: 8:00 am to 8:00 pm) of the following day.

The time at which the previous electronic mail was transmitted from the vehicle 31 to the server terminal 21 is stored in the server terminal 21. Thus, if no transmissions are performed for a predetermined amount of time (36 hours) following the previous transmission of an electronic mail from the vehicle 31, it is judged in the server terminal 21 that "no communication has been performed with the vehicle 31 for 36 hours or more". In other words, it is judged that communication between the vehicle 31 and server terminal 21 has been interrupted. This may be caused by a problem on the vehicle 31 side such as a breakdown of or damage to the communication device in the vehicle 31, or may be caused by a defect in the communication state between the vehicle 31 and server terminal 21. This mobile body information or communication state information corresponds to the specific information e), and therefore it is judged in the server terminal 21 that this information should be displayed on the "notification screen". The display content of the "notification screen" is thus updated.

The content "no communication with vehicle for 36 hours or more" is displayed on the display screen of the terminal 11 together with content specifying the "time of occurrence", and the "manufacturer", "model", "model number", "machine number", and "ID" of the vehicle 31, as is illustrated in FIG. 34. From the display screen, the administrator can learn that "communication has been interrupted" with the vehicle 31, and can take accurate and swift measures against this irregularity.

Note that in this embodiment, an interruption in communication with the vehicle 31 is judged by the fact that although a predetermined amount of time has passed since the previous automatic transmission, the next automatic transmission has not yet been performed. However, a judgment of an interruption in communication with the vehicle 31 may be made on the basis that although a predetermined amount of time has passed since the previous request input operation from a terminal 11, 12 . . . to the vehicle 31 side, no reply has been transmitted from the vehicle 31 side.

As noted above, the voltage of the battery 63 in the vehicle 31 is detected by the sensor group 62 and inputted into the communication controller 54. A judgment is then made in the communication controller 54 as to whether or not the voltage of the battery 63 has been at or below a predetermined level (for example 23V) for a continuous time period (for example one minute or more). A decrease in the voltage of the battery 63 is a serious irregularity, indicating not only that start-up of the vehicle 31 will become difficult, but also that the communication function in the vehicle may break down. When the start-up lock circuit of the vehicle 31 is operated, power is consumed by the start-up lock circuit relay, as a result of which a decrease in the voltage of the battery 63 occurs more easily.

Thus, when it is judged on the vehicle 31 side that the voltage of the battery 63 has been at or below a predetermined level (for example 23V) for a continuous time period (for example one minute or more), information noting that "the voltage of the battery 63 in the vehicle 31 has decreased" is automatically transmitted to the server terminal 21 by electronic mail. This mobile body information corresponds to the specific information c), and therefore a judgment is made in the server terminal 21 that this information should be displayed on the "notification screen". The display content of the "notification screen" is thus updated.

The content "the battery voltage is low" is displayed on the display screen of the terminal 11 together with content specifying the "time of occurrence", and the "manufacturer", "model", "model number", "machine number", and "ID" of the vehicle 31. From the display screen, the administrator can learn of the vehicle 31 that "the voltage of the battery 63 has decreased", and can take accurate and swift measures against this irregularity.

As previously explained in FIGS. 9 and 10, automatic transmission is performed upon changes in the position of the vehicle 31.

That is, as illustrated in FIG. 10, automatic transmission is performed at the point when the vehicle 31 deviates from the specific set range 129. This specific set range 129 may be set to the management district of the vehicle 31 (for example "Tokyo") or the range in which the vehicle 31 may travel (for example "within Japan"). If the vehicle 31 moves outside of the set range, it may be judged that an irregularity has occurred.

When it is judged on the vehicle 31 side that the vehicle 31 has deviated from the specific set range 129, information noting that "vehicle 31 is out of range" is automatically transmitted to the server terminal 21 by electronic mail. This mobile body information is specific information a), and therefore it is judged by the server terminal 21 that this information should be displayed on the "notification screen". The display content of the "notification screen" is thus updated.

The content "the vehicle is out of range" is displayed on the display screen of the terminal 11 together with content specifying the "time of occurrence", and the "manufacturer", "model", "model number", "machine number", and "ID" of the vehicle 31. From the display screen, the administrator can learn that the vehicle 31 is "out of range", and can take accurate and swift measures against this irregularity.

Note that automatic transmission is performed at the point when the vehicle 31 deviates from the specific set range 129, and information noting that "vehicle is out of range" is displayed on the "notification screen". However, automatic transmission may be performed at the point when the vehicle 31 enters the specific set range 129 such that information noting that "vehicle is within range" is displayed on the "notification screen". In this case, the specific set range 129 is set as an area which the vehicle 31 does not normally enter.

Further, the "notification screen" of FIG. 34 may be similarly displayed on a display screen of another terminal such as terminal 12, rather than only on terminal 11. In so doing, the "notification screen" of FIG. 34 is also displayed on terminal 12, and thus important information generated up to the previous day may be easily learned.

Display of the "notification screen" of FIG. 34 may also be permitted only on the display screen of the management terminal 11 for managing the vehicle 31 such that display of the "notification screen" is prohibited on the display screen of other terminals such as terminal 12. This is realized, for example, by setting the input of a specific ID number or a specific code number (a number corresponding to terminal 11) as a condition for display of the "notification screen" of FIG. 34.

In this embodiment, the specific information to be displayed on the "notification screen" of FIG. 34 is not limited to the information described in a) to f).

For example, information noting that the rental period of the vehicle 31 to a customer is nearing an end may be displayed on the "notification screen". The proximity of the end of the rental period may be detected by the service meter value in the vehicle 31, or may be detected by a clock provided in the interior of the communication terminal 56.

Automatic transmission may also be performed from the vehicle 31 when the vehicle 31 traverses a predetermined distance or more, such that information stating "predetermined distance or greater has been traversed" is displayed on the "notification screen". This predetermined distance is set as a distance considered to be greater than the normal distance traversed by the vehicle 31, for example.

Automatic transmission may also be performed from the vehicle 31 side when an error code is inputted into the communication terminal 56 of the vehicle 31 such that information stating that an error has occurred is displayed on the "notification screen". Note that the content of the error codes to be displayed on the "notification screen" may be limited to specific irregularity items alone (serious irregularity items). Further, the display items of the "notification screen" of FIG. 34 may differ for each vehicle 31, 32. For example, only display item a) for vehicle 31 and only display item b) for vehicle 32 may be displayed on the "notification screen".

In this embodiment, the "notification screen" is displayed on the terminal 11 which is fixed in one location. However, the content of the "notification screen" may be displayed on a portable terminal.

For example, the content of the "notification screen" may be displayed on a portable telephone installed with a WWW browser.

In this case, a packet communication network and the Internet 2 of the portable telephone are connected by a gateway. Switching of the packet communication network protocol and the TCP/IP protocols of the Internet 2 is then performed by the gateway such that the content of the Web site on the Internet 2 is displayed on a display screen of the portable telephone. Whenever the "notification screen" is updated by the server terminal 21, an audio message stating "new information has been received" is generated in the portable telephone. As a result, the content of the updated "notification screen" is displayed on the display screen of the portable telephone. Note that only specific display items from among a) to f) may be set as the display items of the "notification screen" to be displayed on the portable telephone. For example, only information b), stating that "the engine of the vehicle 31 has been started outside of the regular hours" may be displayed on the display screen of the portable telephone. As a result, urgent information regarding the vehicle 31 may be obtained in real time from the display screen of the portable telephone even when the administrator is in a location removed from the terminal 11.

Construction machines are expensive and therefore often rented. A system known as group rental is employed for the renting of construction machines. This is a system in which, due to the various types of construction machine in existence (small hydraulic shovels, medium hydraulic shovels, large hydraulic shovels, and so on), a wide variety of construction machine types are shared among a plurality of sales offices. Thus, if a rental request for a specific model is placed at a sales office by a customer, but the requested construction machine model is not in stock, this specific construction machine model can be provided from another sales office with the result that no business opportunities are lost.

In order to respond to a customer request, management of entry and leaving of construction machine must be reliably performed at each sales office. An embodiment for managing entry and leaving will be described below.

Figure 35:
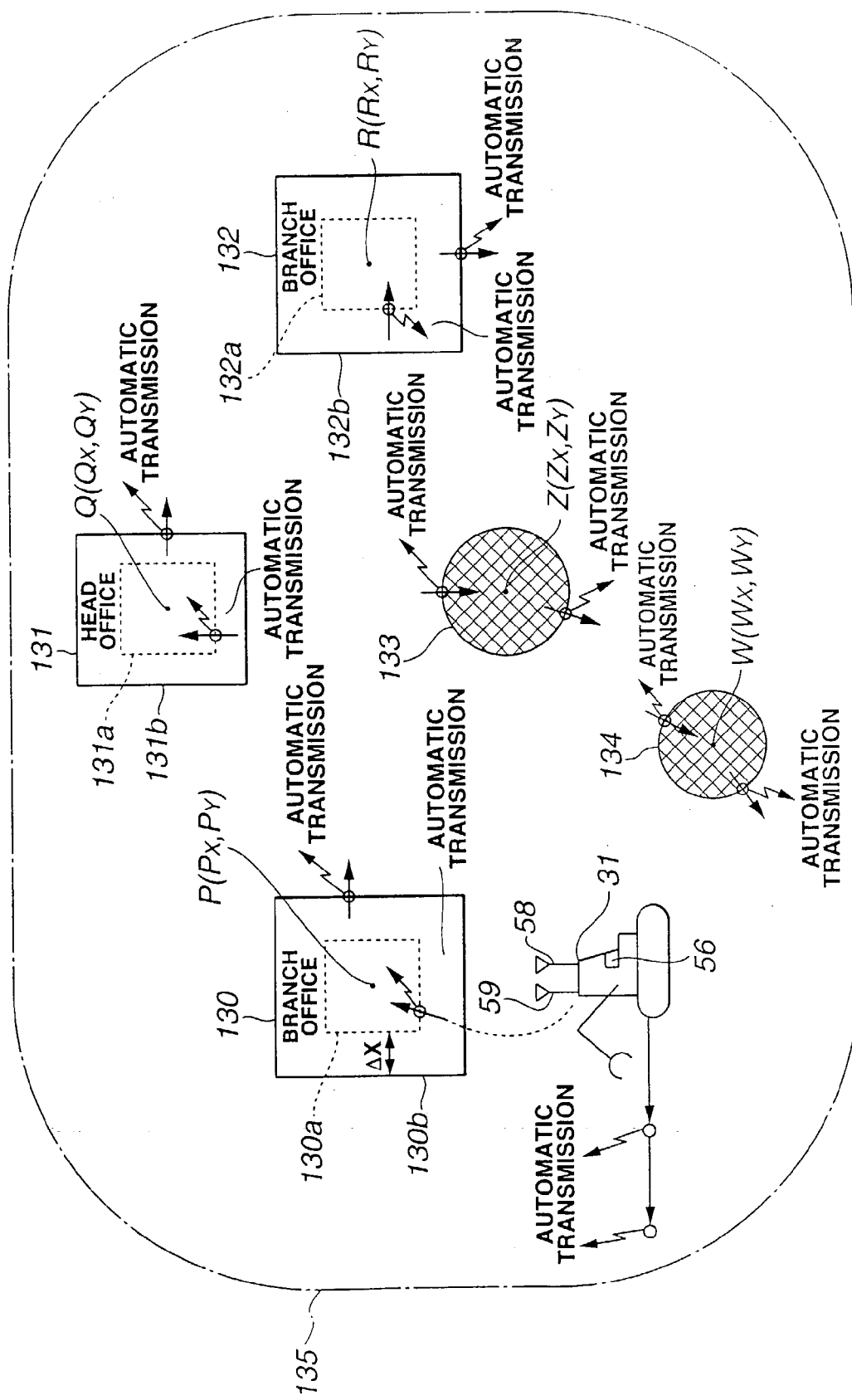
FIG. 35 is a view showing an example of the configuration of an entry and leaving area.

FIG. 35 illustrates a constitutional example of this embodiment. FIG. 35 shows each sales office 130, 131, 132 existing in an area 135 known, for example, as "Tokyo". The sales office 130 is in "West Tokyo", the sales office 131 is in "North Tokyo", and the sales office 132 is in "South Tokyo". 133 and 134 indicate the work sites of customers. Vehicles 31, 32 are managed at sales offices 130 to 132. Note that in reality larger numbers of sales offices, work sites, and vehicles (mobile work machines) exist, but these have been omitted for convenience.

Of the sales offices 130, 131, 132, 131 is set as the head office and 130, 132 are set as branch offices. The head office 131 manages the vehicles 31, 32 in aggregate. The head office 131 is provided with a terminal 11. An identical terminal-to-terminal 11 may be provided in the branch offices 130, 132.

The respective positions of the sales offices 130, 131, 132 are expressed by P (Px, PY), Q (Qx, QY), and R (Rx, RY) in an X-Y coordinate system. The respective positions of the work sites 133, 134 are expressed by Z (Zx, ZY), and W (Wx, WY) in an X-Y coordinate system. Note that the positions may be expressed by terrestrial latitude and longitude in order to conform with a GPS map.

Entry and leaving areas centering on the points P, Q, and R are set for each of the sales offices 130, 131, 132. For example, an entry area 130a centering on point P is set for the branch office 130. A leaving area 130b is also set centering on point P. The leaving area 130b is larger than the entry area 130a, and a hysteresis of ΔX exists between the boundary line of the leaving area 130b and the boundary line of the entry area 130a.

Likewise, an entry area 131a and a leaving area 131b are set for the head office 131, centering on point Q, and an entry area 132a and a leaving area 132b are set for the head office 132$^i$, centering on point R. The magnitude of the entry and leaving areas is determined in consideration of the margin of error of the GPS measuring device, the magnitude of the sales office, and so on. For example, the entry and leaving areas are determined at a magnitude of several hundred meters long and several hundred meters wide.

Work areas 133, 134 respectively centering on points Z and W are set for the work sites 133, 134.

Positional information for the entry and leaving areas of the sales offices 130, 131, 132, and positional information for the work areas of the work sites 133, 134 is stored in the communication controller 54 of the vehicle 31. The same positional information is stored in a similar manner in the communication controller 54 of the vehicle 32.

In order to begin communication with a newly installed communication terminal 56 in the vehicles 31, 32, a communication application procedure must be performed and application reception must be confirmed in the communication managing server terminal 21. In this embodiment, this communication application procedure may be performed on the screen of terminal 11.

An input operation for communication application is performed from the display screen of the terminal 11 following installment of the communication terminal 56 in the vehicles 31, 32. A communication connection between the server terminal 21 and the communication terminals 56 of the vehicles 31, 32 is thus confirmed. Simultaneously, positional information for each of the sales offices 130, 131, 132 and positional information for the work sites 133, 134 is transmitted from the server terminal 21 to the vehicles 31, 32. As a result, positional information for the entry and leaving areas of the sales offices 130, 131, 132 and positional information for the work areas of the work sites 133, 134 is stored in the communication controllers 54 of the vehicles 31, 32. When the communication connection is confirmed, a message stating that a communication application from the vehicles 31, 32 has been received is displayed on a display screen of the terminal 11. Communication with the vehicles 31, 32 becomes possible once application reception is confirmed in the terminal 11.

Using the vehicle 31 as a representative, operations in a case in which vehicle 31 is left will now be described.

As was previously described using FIGS. 9 and 10, the position of the vehicle 31 is detected by the GPS sensor 57 via the GPS antenna 59. The detection result of the GPS sensor 57 is inputted into the communication controller 54. The detected position of the vehicle 31 and the positions of the entry and leaving areas of each sales office 130, 131, 132 are compared in the communication controller 54, and a judgment is made as to whether the vehicle 31 has been entered or left from the entry and leaving areas.

A case is envisaged in which, for example, the vehicle 31 is entered the branch office 130.

The vehicle 31 moves from the exterior of the entry area 130a of the branch office 130 to the interior thereof, and a judgment is made as to whether or not the vehicle 31 has been entered the branch office 130 depending on whether the vehicle 31 remains within the entry area 130a for a predetermined amount of time (for example 2 or 3 minutes). A condition of remaining within the entry area 130a for a predetermined amount of time or greater is attached in consideration of a case in which the vehicle 31 simply passes through the branch office 130. If, as a result, it is judged that the vehicle 31 has entered the entry area 130a, an identification code specifying the vehicle 31 ("vehicle 31"), an identification code specifying the branch office 130 ("West Tokyo branch"), and an identification code indicating "entry" (to be referred to collectively as "entry information") are transmitted at that point as transmission data from the communication controller 54 to the communication terminal 56. An electronic mail containing this entry information is then automatically transmitted from the communication terminal 56 to the server terminal 21 via the satellite communication antenna 58. It is assumed here that the server terminal 21 is provided in the location of the manufacturer of the vehicles 31, 32.

A Web site display screen shown in FIG. 36, to be referred to as a "screen of entry and leaving", is then created in the server terminal 21.

More specifically, automatic transmission is performed from the vehicle 31 side, and when the automatically transmitted entry information is received in the server terminal 21, this entry information is written into the "entry and leaving screen" of the Web site in the server terminal 21, whereupon the display content of the "entry and leaving screen" is updated.

Thus, when the WWW browser in the terminal 11 which manages the vehicle 31 is activated, the Web site data are read from the server terminal 21 via the WWW browser, and the "entry and leaving screen" is displayed on a display screen of the display device of the terminal 11.

FIG. 36 illustrates the Web site screen which is displayed on the display device of the terminal 11. FIG. 36 is the "entry and leaving screen", showing the entry and leaving history of the vehicle 31.

As is illustrated in FIG. 36, content indicating that the vehicle 31 has been "entered the West Tokyo branch" is displayed in real time together with the "time of entry". From this display screen, the administrator can learn that the vehicle 31 has been "entered the West Tokyo branch", and can therefore reliably make arrangements for a customer.

When it is judged in a similar manner that the vehicle 31 has moved from the interior to the exterior of the leaving area 130b of the branch office 130 and remained outside of the leaving area 130b for a predetermined amount of time (for example 2 or 3 minutes), it is judged that the vehicle 31 has been left from the branch office 130. At the time of this judgment, information stating that the vehicle 31 has been left from the "West Tokyo" branch office 130 (to be referred to as "leaving information") is automatically transmitted to the server terminal 21 by electronic mail. Thus, as is illustrated in FIG. 36, content indicating that the vehicle 31 has been "left from the West Tokyo branch" is displayed in real time together with the "time of leaving" on the "entry and leaving screen" on the display device of the terminal 11.

As noted above, a hysteresis of ΔX is inserted between the boundary line of the leaving area 130b and the boundary line of the entry area 130a. In so doing, hunting can be prevented when the vehicle 31 is traveling in the vicinity of the branch office 130.

When it is similarly judged that the vehicle 31 has entered the entry area 132a of the branch office 132, entry information stating that the vehicle 31 has been entered the "South Tokyo" branch office 132 at that time is automatically transmitted to the server terminal 21 by electronic mail. Thus, as is illustrated in FIG. 36, content indicating that the vehicle 31 has been "entered the South Tokyo branch" is displayed in real time together with the "time of storage" on the "entry and leaving screen" on the display device of the terminal 11.

Further, when it is judged that the vehicle 31 has exited the leaving area 132b of the branch office 132, entry information stating that the vehicle 31 has been left from the "South Tokyo" branch office 132 at that time is automatically transmitted to the server terminal 21 by electronic mail. Thus, as is illustrated in FIG. 36, content indicating that the vehicle 31 has been "left from the South Tokyo branch" is displayed in real time together with the "time of leaving" on the "entry and leaving screen" on the display device of the terminal 11.

When the vehicle 31 enters the entry area 131a of the "North Tokyo" head office 131, as when the vehicle 31 exits the leaving area 131b of the "North Tokyo" head office 131, content indicating that the vehicle 31 has been "entered the North Tokyo branch" or "left from the North Tokyo branch" is displayed on the "entry and leaving screen" of the display device of the terminal 11.

Thus the latest entry and leaving history of the vehicle 31 is displayed in real time as illustrated in FIG. 36. The "entry and leaving screen" for the vehicle 32 is obtained in a similar manner to the vehicle 31 such that the latest entry and leaving history of the vehicle 32 is displayed in real time. Hence entry and leaving management for the vehicles 31, 32 can be performed reliably and without error, and as a result, business opportunities are not lost and sales profits improve drastically.

When it is judged that the vehicle 31 has entered the work area 133 of the rental recipient customer, transfer information stating that the vehicle 31 has been transferred to the work site 133 at that time is automatically transmitted to the server terminal 21 by electronic mail. Thus, content indicating that the vehicle 31 has been "transferred to the work site 133" is displayed in real time on the display device of the terminal 11 together with the "time of transfer".

When it is judged that the vehicle 31 has exited the work area 133, removal information stating that the vehicle 31 has been removed from the work site 133 at that time is automatically transmitted to the server terminal 21 by electronic mail. Thus, content indicating that the vehicle 31 has been "removed from the work site 133" is displayed in real time on the display device of the terminal 11 together with the "time of removal".

Similarly, when the vehicle 31 enters or is removed from the work site 134, content indicating that the vehicle 31 has been "transferred to the work site 134" or "removed from the work site 134" is displayed on the display device of the terminal 11. The transfer and removal history of the vehicle 31 is thus updated.

The movement history of the vehicle 31 following leaving from the sales offices 130 to 132 may also be displayed on the terminal 11. This is realized by having the vehicle 31 automatically transmit positional information every 10 km traveled, for example. In so doing, the movement history and current position of the vehicle 31 can be confirmed on the terminal 11.

By comparing the current position of the vehicle 31 and the known positions Z, W of the work sites 133, 134, a judgment can be made on the screen of the terminal 11 as to whether or not the vehicle 31 is within the work sites 133, 134.

When the vehicle 31 which is under management deviates from the management district ("Tokyo") 135, information stating that the vehicle 31 has "left the management district" may be automatically transmitted and displayed on the "notification screen" of FIG. 34. In so doing, the administrator can learn that the vehicle 31 is "outside of the management district", and can take swift and accurate measures against this irregularity.

Display of the "screen on entry and leaving" in FIG. 36 may be permitted only on the display screen of the administrator's terminal 11 which manages the vehicles 31, 32, whereby this "screen on entry and leaving" is not displayed on the display screen of any terminal other than the terminal 11. This is realized, for example, by making the input of a specific ID number or a specific code number (a number corresponding to the terminal 11) a condition for the display of the "screen on entry and leaving" of FIG. 36.

Transfer of the construction machines 31, 32 to the rental recipient or recovery of the construction machines 31, 32 from the rental recipient is performed by loading the construction machines 31, 32 onto the trailer 35. The cost of transportation by the trailer 35 is high, and it is therefore necessary to increase the efficiency of transportation by the trailer 35 and suppress transportation costs. It is also necessary to increase rental opportunities and hence raise sales profits by increasing the speed of transfer to the rental recipient or removal from the rental recipient to thereby increase the efficiency of transportation by the trailer 35.

An embodiment according to which transportation efficiency of the construction machines 31, 32 can be increased will now be described with reference to FIG. 37.

As described in FIG. 36, information as to whether or not the vehicles 31, 32 have been entered or left from the sales offices 130 to 132, and information as to whether the vehicles 31, 32 have been transferred to or removed from the work sites 133, 134 is managed on the terminal 11 side.

Figure 37A:
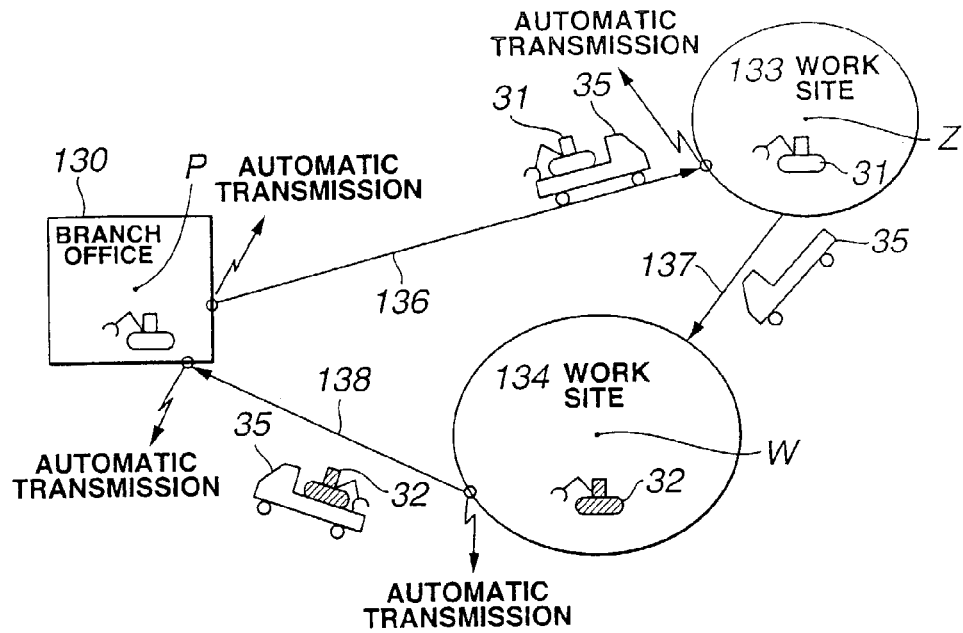
FIGS. 37(a) and 37(b) are views showing examples of the transportation routes of a trailer.

It is assumed here that entry and leaving information and entrance and removal information stating that "vehicle 31 has been entered branch office 130, and vehicle 32 has been transferred to work site 134" has been obtained on the terminal 11 side, as is illustrated in FIG. 37(a). A request is issued at that time stating "transfer vehicle 31 to work site 133 and remove vehicle 32 from work site 134". Then, on the basis of this entry and leaving information and transfer and removal information, work instruction data stating "transfer vehicle 31 in branch office 130 to work site 133, and on the way back remove vehicle 32 from work site 134 and return to branch office 130" may be transmitted by electronic mail from the terminal 11 to the trailer 35. In this case, as was previously described with reference to FIG. 4, "the current position of the trailer 35, the current position of the vehicle 31 (position of the branch office 130), the position of the work site 133, the current position of the vehicle 32 (position of the work site 134), and a work instruction message" are displayed on a display screen of the terminal 14 installed in the trailer 35. The operator of the trailer 35 may then perform operations according to the display screen of the terminal 14 efficiently.

Thus the trailer 35 moves to the branch office 130, loads the vehicle 31 and leaves the vehicle 31 from the branch office 130. At this time, leaving information stating that the vehicle 31 has been left from the branch office 130 is automatically transmitted from the vehicle 31, and the content of the "entry and leaving screen" in FIG. 36 is updated. The trailer 35 loaded with the vehicle 31 then travels along a road 136 and enters the work site 133. At this time, transfer information stating that the vehicle 31 has entered the work site 133 is automatically transmitted from the vehicle 31, and the transfer and removal history thereof is updated.

The empty trailer 35 then travels along a road 137 and enters the work site 134. The trailer 35 loads the vehicle 32 and removes the vehicle 32 from the work site 134. At this time, removal information stating that the vehicle 32 has been removed from the work site 134 is automatically transmitted from the vehicle 32, and the transfer and removal history thereof is updated.

The trailer 35 loaded with the vehicle 32 then travels along a road 138 and enters the branch office 130. At this time entry information stating that the vehicle 32 has been entered the branch office 130 is automatically transmitted from the vehicle 32, and the entry and leaving history of the vehicle 32 is updated.

Thus the trailer 35 is able to perform transfer of the vehicle 31 and removal and recovery of the vehicle 32 in one action. As a result, the amount of time during which the trailer 35 is empty can be reduced, thereby improving transportation efficiency.

Figure 37B:
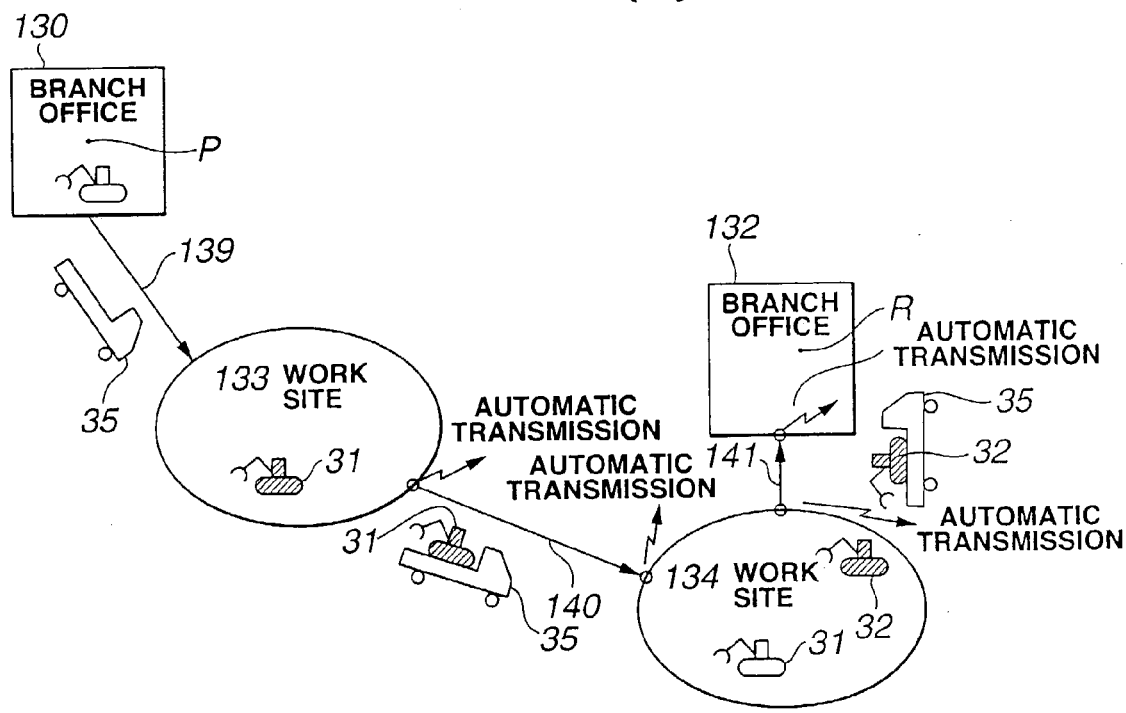

FIG. 37(b) shows another example of a transportation operation.

It is assumed here that entry and leaving information and entrance and removal information stating that "vehicle 31 has been transferred to work site 133, and vehicle 32 has been transferred to work site 134 (vehicles 31, 32 having been left from branch offices 130, 132)" has been obtained on the terminal 11 side, as is illustrated in FIG. 37(b). A request is issued at that time stating "transfer vehicle 31 to work site 134 and remove vehicle 32 from work site 134". Then, on the basis of this entry and leaving information and transfer and removal information, work instruction data stating "transfer vehicle 31 at work site 133 to work site 134, and remove vehicle 32 from work site 134 and return to branch office 132" may be transmitted by electronic mail from the terminal 11 to the trailer 35. In this case, as was previously described with reference to FIG. 4, "the current position of the trailer 35, the current position of the vehicle 31 (position of the work site 133), the current position of the vehicle 32 (position of the work site 134), the position of the branch office 132, and a work instruction message" are displayed on a display screen of the terminal 14 installed in the trailer 35. The operator of the trailer 35 may then perform operations according to the display screen of the terminal 14 efficiently.

Thus the trailer 35 moves to the work site 133 along a road 139, loads the vehicle 31 and removes the vehicle 31 from the work site 133. At this time, removal information stating that the vehicle 31 has been removed from the work site 133 is automatically transmitted from the vehicle 31, and the transfer and removal history thereof is updated. The trailer 35 loaded with the vehicle 31 then travels along a road 140 and enters the work site 134. At this time, transfer information stating that the vehicle 31 has entered the work site 134 is automatically transmitted from the vehicle 31, and the transfer and removal history thereof is updated.

The trailer 35 then loads the vehicle 32 and removes the vehicle 32 from the work site 134. At this time removal information stating that the vehicle 32 has been removed from the work site 134 is automatically transmitted from the vehicle 32, and the transfer and removal history thereof is updated.

The trailer 35 loaded with the vehicle 32 then travels along a road 141 and enters the branch office 132. At this time entry information stating that the vehicle 32 has been entered the branch office 132 is automatically transmitted from the vehicle 32, and the entry and leaving history of the vehicle 32 is updated.

Thus the trailer 35 is able to perform transfer of the vehicle 31 and removal and recovery of the vehicle 32 in one action. As a result, the amount of time during which the trailer 35 is empty can be reduced, thereby improving transportation efficiency.

Note that in FIG. 37, a judgment is made as to whether or not the vehicles 31, 32 are within the work sites 133, 134 by comparing the position of the vehicles 31, 32 and the work areas 133, 134 which have a fixed magnitude. However, a judgment may be made as to whether or not the vehicles 31, 32 are within the work sites 133, 134 by comparing the current position of the vehicle 31 and the central positions Z, W of the work sites 133, 134.

In the aforementioned embodiment, the vehicle 31 is set in a start-up locked state (to be referred to below as "start-up lock") by a remote control operation, and the vehicle 31 is set in a start-up lock released state (to be referred to below as "start-up unlock") by a remote control operation. The construction machine 31 does not usually operate during a specific time slot (17:00 to 8:00, outside of the regular hours). Thus, if the engine of the construction machine 31 starts to operate during this time slot, it may be considered that an irregularity such as a prank has occurred. However, it is tiresome to perform start-up lock and start-up unlock operations on the vehicle 31 from the terminal 11 side by remote control at the same times every day.

Hence an embodiment will now be described in which data for a specific time slot are transmitted in advance from the terminal 11 side to the vehicle 31 such that when this specific time slot begins, the vehicle 31 is set in a start-up locked state, and when the specific time slot ends, the vehicle 31 is set in a start-up unlocked state.

Figure 38:
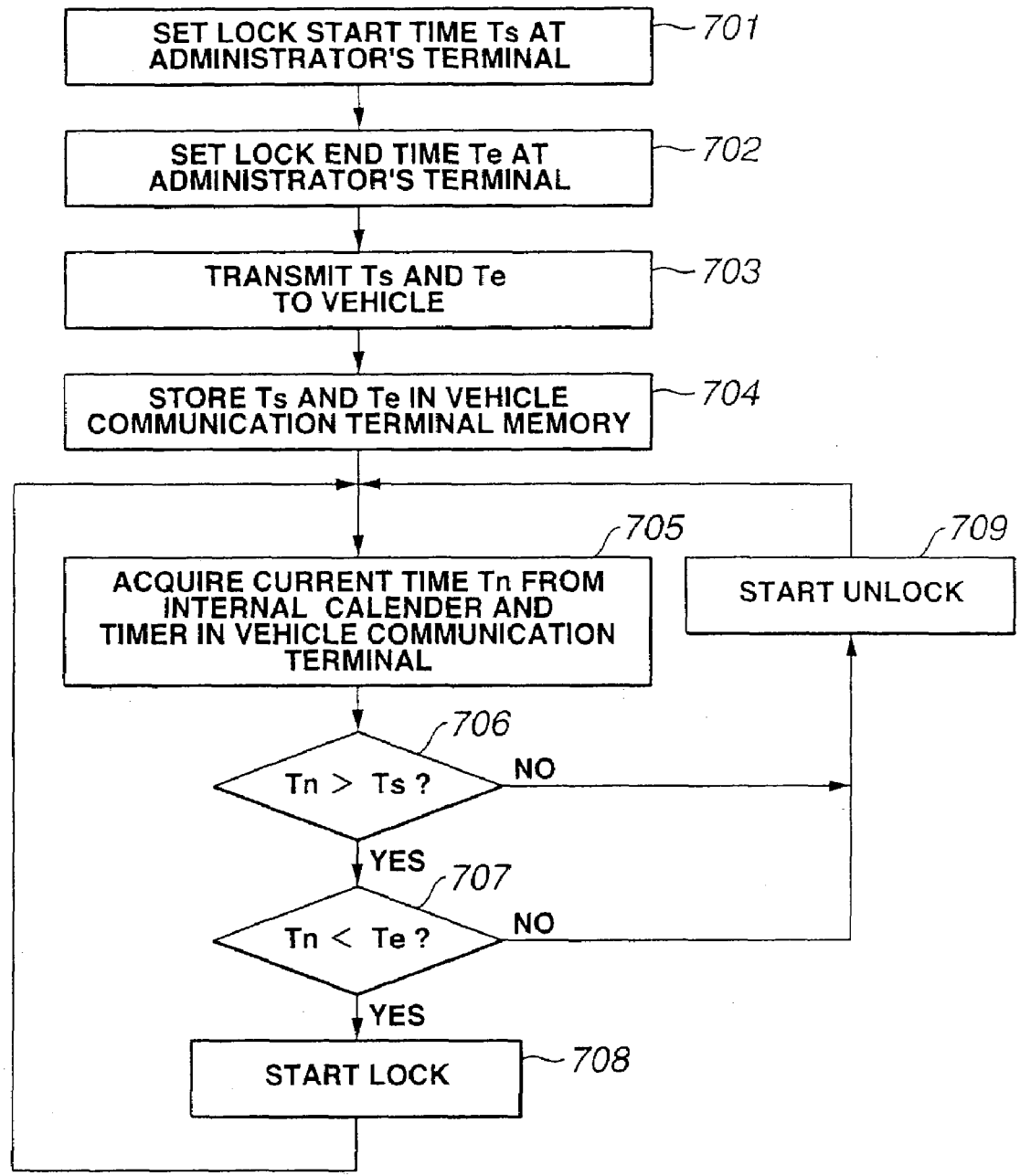
FIG. 38 is a flowchart illustrating a processing sequence for start-up locking.

FIG. 38 is a flowchart illustrating the processing sequence of this embodiment.

First, when a "time slot specification" button is clicked with the display screen of the terminal 11 set to the "engine reactivation prohibition setting screen", a display urging designation of a "lock start time Ts" appears. In response thereto, "17:00", for example, is inputted as the content of the "lock start time Ts". Thus the lock start time Ts of the vehicle 31 is set at "17:00" (step 701).

Next, a display urging designation of a "lock end time Te" appears. In response thereto, "8:00", for example, is inputted as the content of the "lock end time Te". Thus the lock end time Te of the vehicle 31 is set at "8:00" (step 702).

The set data for the lock start time Ts and lock end time Te are then transmitted from the terminal 11 to the vehicle 31 side by electronic mail (step 703).

When the data Ts, Te are received by the communication terminal 56 on the vehicle 31 side via the satellite communication antenna 58, these data are entered memory inside the communication terminal 56 (step 704). A calendar and a timer are provided in the interior of the communication terminal 56 of the vehicle 31. The current time Tn is obtained from the interior calendar and timer (step 705). The current time Tn is then compared with the lock start time Ts and lock end time Te (steps 706, 707).

If the current time Tn is later than the lock start time Ts (17:00) and earlier than the lock end time Te (8:00) (a YES judgment in steps 706, 707), a start-up lock setting command is outputted from the communication terminal 56 to the start-up lock circuit via the communication controller 54. As a result, the start-up lock circuit relay is energized, whereby a start-up locked state is entered. In other words, fuel is not injected even when the ignition switch 64 is switched on, and the engine of the vehicle 31 cannot be restarted (step 708).

If the current time Tn is the lock start time Ts (17:00) or earlier, or the lock end time Te (8:00) or later (a NO judgment in steps 706 and 707), a start-up lock release command is outputted from the communication terminal 56 to the start-up lock circuit via the communication controller 54. As a result, the start-up lock circuit relay is de-energized, whereby a start-up unlocked state is entered. In other words, fuel is injected when the ignition switch 64 is turned on, and the engine of the vehicle 31 can be restarted (step 709).

In this manner, the vehicle 31 automatically enters a start-up locked state during a specific time slot (17:00 to 8:00) every day, and automatically enters a start-up unlocked state when this specific time slot ends.

In FIG. 38, the vehicle 31 is start-up locked every day, but the vehicle 31 may be start-up locked only on specific days. In this case, specific days of the week (for example Saturday and Sunday) on which the vehicle 31 is to be start-up locked are set in steps 701, 702.

The construction machine 31 does not operate during specific times of the year (for example the New Year period), and it is therefore necessary to set the vehicle 31 in a start-up locked state during those times in order to prevent pranks and the like. When on loan, the construction machine 31 must also be set in a start-up locked state at the end of a rental period so that usage which is in breach of contract after the end of the rental period can be prohibited.

Figure 39:
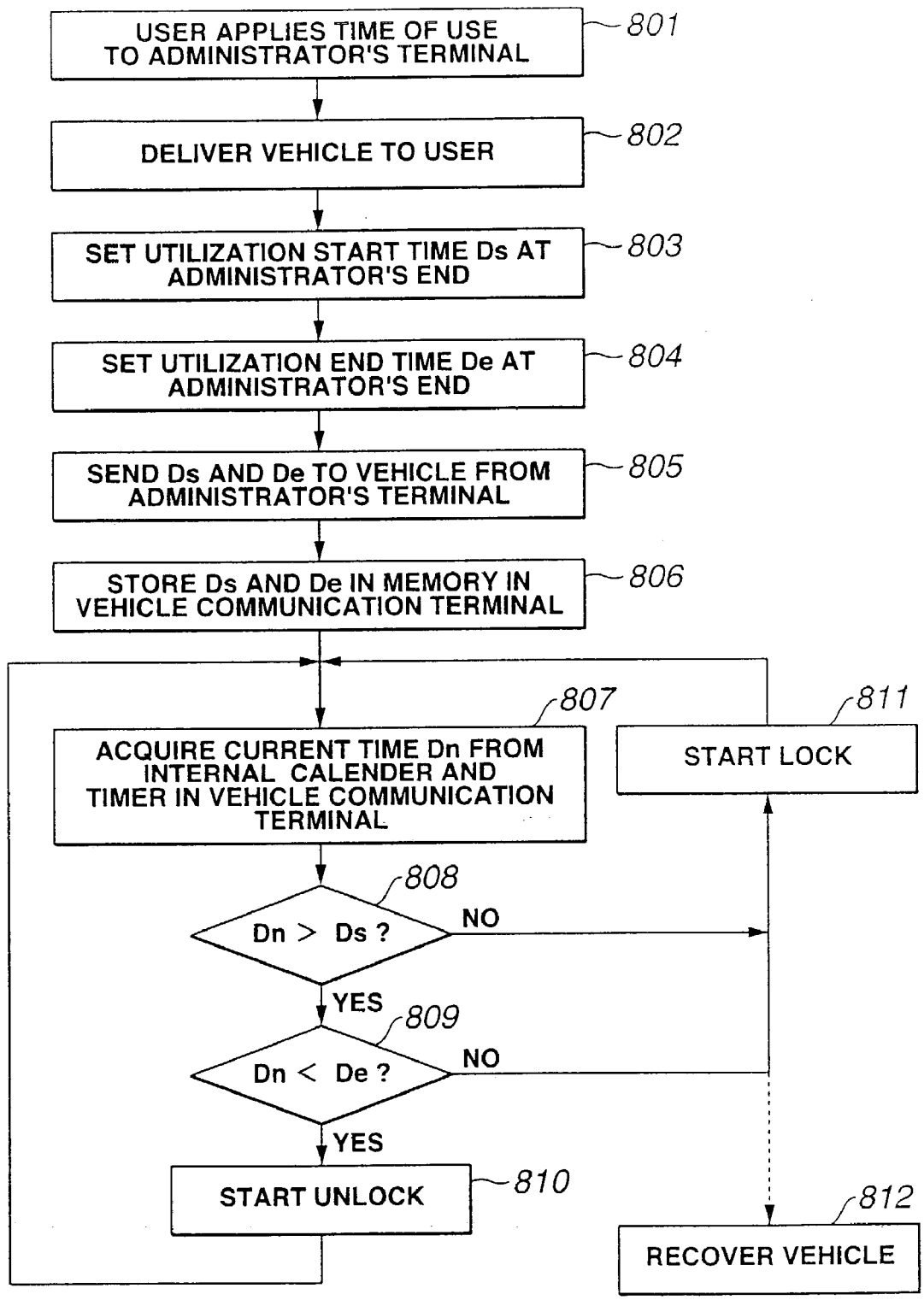
FIG. 39 is a flowchart illustrating a processing sequence for start-up locking.

FIG. 39 is a flowchart illustrating a processing sequence of an embodiment in which start-up is locked following the end of a rental period.

First, a customer (user) transmits a request for a usage period (for example March 3, 8:00 am to March 15, 8:00 pm) to the terminal 11 which manages the vehicle 31 (step 801). The vehicle 31 is then dispatched to the customer (step 802). Note that the request and dispatch procedures of steps 801, 802 may be performed by means of communication over the Internet 2.

Then, when a "usage period specification" button is clicked with the display screen of the terminal 11 of the administrator set to the "engine reactivation prohibition setting screen", a display urging designation of a "usage start date and time Ds" appears. In response thereto, "March 3, 8:00 am", for example, is inputted as the content of the "usage start date and time Ds". Thus the usage start date and time Ds of the vehicle 31 are set at "March 3, 8:00 am" (step 803).

Next, a display urging designation of a "usage end date and time De" appears. In response thereto, "March 15, 8:00 pm", for example, is inputted as the content of the "usage end date and time De". Thus the usage end date and time De of the vehicle 31 are set at "March 15, 8:00 pm" (step 804).

The set data for the usage start date and time Ds and the usage end date and time De are then transmitted from the terminal 11 to the vehicle 31 side by electronic mail (step 805).

When the data Ds, De are received by the communication terminal 56 on the vehicle 31 side via the satellite communication antenna 58, these data are stored in memory inside the communication terminal 56 (step 806). A calendar and a timer are provided in the interior of the communication terminal 56 of the vehicle 31. The current time Dn is obtained from the interior calendar and timer (step 807). The current time Dn is then compared with the usage start date and time Ds and the usage end date and time De (steps 808, 809).

If the current time Dn is later than the usage start date and time (March 3, 8:00 am) and earlier than the usage end date and time De (March 15, 8:00 pm) (a YES judgment in steps 808, 809), a start-up lock release command is outputted from the communication terminal 56 to the start-up lock circuit via the communication controller 54. As a result, the start-up lock circuit relay is de-energized, whereby a start-up unlocked state is entered. In other words, fuel is injected when the ignition switch 64 is switched on, and the engine of the vehicle 31 can be restarted (step 810).

If the current time Dn is the usage start date and time Ds (March 3, 8:00 am) or earlier, or the usage end date and time De (March 15, 8:00 pm) or later (a NO judgment in steps 808 and 809), a start-up lock setting command is outputted from the communication terminal 56 to the start-up lock circuit via the communication controller 54. As a result, the start-up lock circuit relay is energized, whereby a start-up locked state is entered. In other words, fuel is not injected even when the ignition switch 64 is turned on such that the engine of the vehicle 31 is not restarted (step 811). As a result, usage which is in breach of contract following the end of the rental period (Ds to De) is prohibited. Moreover, since the engine of the vehicle 31 cannot be started, the vehicle 31 may be recovered at any time following the end of the rental period (Ds to De) (step 812).

In order to set a start-up locked state during the New Year period and set a start-up unlocked state at the end of the New Year period in FIG. 39, the New Year period (Ds to De) is set in steps 803, 804, the content of step 810 is set at "start-up lock", and the content of step 811 is set at "start-up unlock". Thus a start-up locked state is set during the New Year period (Ds to De) (step 810), and a start-up unlocked state is set for the remainder of the year (step 811).

Note that in FIGS. 38 and 39, data are transmitted from the terminal 11 to a single vehicle 31 so that the vehicle 31 is automatically set in a start-up locked state. However, data may be transmitted from the terminal 11 to a plurality of vehicles (for example vehicles 31, 32) simultaneously such that the plurality of vehicles are automatically set in a start-up locked state.

By combining the embodiment of FIG. 39 and the embodiment of FIG. 37, usage which is in breach of contract following the end of the rental period may be prevented and recovery following the end of the rental period may be performed efficiently. Taking the case in 37(*a*) as an example, following the end of the rental period of the vehicle 32, the customer leaves the vehicle 32 unattended on the work site 134. Although the vehicle 32 has been left unattended on the work site 134, start-up is locked following the end of the rental period (Ds to De), and therefore the vehicle 32 cannot be used by the customer in breach of contract. When the time comes to transfer the vehicle 31 to the other work site 133, the trailer 35 can transfer the vehicle 31 to the work site 133, and remove and recover the vehicle 32 which has been left on the work site 134 at the same time. Thus recovery operations of the vehicle 32 following the end of the rental period thereof are performed efficiently.

In this embodiment, a construction vehicle is mainly envisaged as the vehicle 31. When the engine in a construction vehicle cannot be restarted, it becomes impossible to operate the revolving superstructure and attachments. Thus, by locking start-up, the danger posed by improper operation of the attachments and revolving superstructure can be avoided. In other words, this embodiment may be applied not only for the prevention of improper usage following the end of a rental period, but also for safety measures to prevent errors. For example, if the operating lever of an attachment on the construction machine 31 is mistakenly operated by someone unskilled in such operations (for example an elementary school student), the danger of an improper operation of the attachment arises. According to this embodiment, incorrect operations such as operating an attachment in an improper manner can be prevented by start-up locking the construction machine.

In this embodiment, data communication between each vehicle 31, 32, 33 . . . and the server terminal 21 is assumed to be conducted by the communication satellite 9 via the wireless communication lines 5. However, this communication system is an example, and any communication system may be employed. That is, existing ground waves may be used rather than satellite communication. Communication may also be conducted using an existing telephone line. Communication may also be conducted via an existing portable base station or PHS base station.

Particularly when a vehicle is a construction machine, underground work may be performed. In this case, communication failure occurs when data communication is performed using existing satellite communication facilities.

Data communication may therefore be performed by installing a new relay station for ensuring communication between the underground construction machine (for example vehicle 31) and the above-ground communication satellite 9 and performing data communication via this relay station.

Two or more communication lines may be provided redundantly between the vehicles 31, 32, 33 . . . and the server terminal 21. By providing communication lines redundantly in this manner, the probability of a "communication impossible" judgment may be greatly reduced.

However, as noted above, even if the start-up lock circuit relay of the vehicle 31 is energized such that the starting signal is cut and a start-up locked state is entered, it is possible for a person who is familiar with vehicle mechanisms to forcibly connect the electrical connection such that the starting signal is outputted and the engine started.

Hence an embodiment will now be described in which measures can be taken against the irregular situation of an engine being started in the manner described above despite being in a start-up locked state.

The input of a preset password (code number) is sometimes set as a condition for the release of a start-up locked state in the vehicle 31 so that the engine of the vehicle 31 cannot be operated by a person other than a rightful driver. However, the following problems arise when password input is set as a condition for engine start-up.

Namely, if a password is simple (for example a date of birth or the like), the password can be easily analogized by an unrightful third party. As a result, the unrightful third party may easily start the engine of the vehicle 31.

If the password is made complex in order to avoid this problem, the person who set the password may forget the password. Moreover, when a construction machine is operated alternately by a plurality of drivers, the other drivers must be informed of the set password.

Due to these circumstances, a driver may post a memo containing the password in the vicinity of the driving seat. In this case also, however, a person other than a rightful driver can easily discover the password and thus the concealment factor is lost.

Further, when driving of the vehicle 31 is handed over to the next driver, the password may be passed along verbally. In this case also, however, the secret may be leaked unintentionally to a third party other than a rightful driver.

Thus by setting the input of a password as a condition for releasing a start-up locked state, there is a high possibility that the secret password will be leaked to a person other than a rightful driver of the vehicle 31.

According to the embodiments to be described herein below, the release of a start-up locked state by a third party other than a rightful driver may be prevented.

(First Embodiment)

Figure 42:
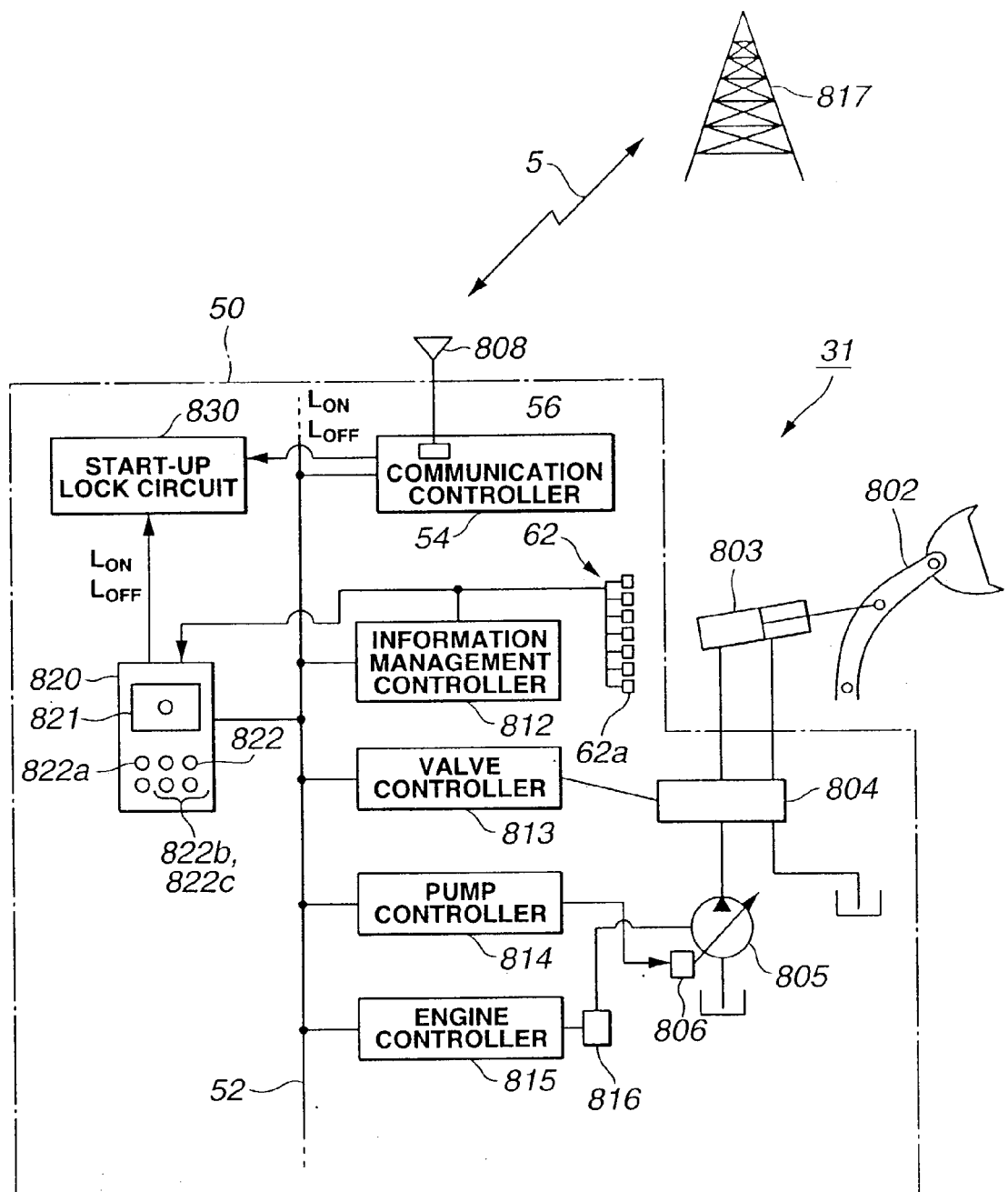
FIG. 42 is a view illustrating a constitutional example of the body of a mobile body corresponding to FIG. 2.

FIG. 42 corresponds to FIG. 2 and illustrates a constitutional example of the vehicle 31.

In this first embodiment, a construction machine such as a hydraulic shovel or wheel loader comprising an attachment 802 is envisaged as the vehicle 31. Note that as long as a plurality of controllers are comprised inside the vehicle body, the construction machine may also be a dump truck or the like.

In this embodiment, a case is envisaged in which a plurality of controllers, that is a monitoring controller 811, an information management controller 812, a valve controller 813, a pump controller 814, an engine controller 815, and the communication controller 54 (see FIG. 2), is provided inside the body 50 of the construction machine 31. These controllers 811, 812, 813, 814, 815 are each connected to the others by a serial communication line 52 on which communication is performed in accordance with a predetermined communication protocol.

The construction machine 31 comprises an attachment 802 constituted by an arm, a bucket, or similar.

The attachment 802 is connected to a hydraulic cylinder 803. Each cylinder chamber of the hydraulic cylinder 803 is connected to a direction/flow rate control valve 804 via hydraulic piping. The direction in which pressure oil is supplied to each of the cylinder chambers in the hydraulic cylinder 803 and the flow rate of the pressure oil which is supplied to the cylinder chambers are altered by operations of the direction/flow rate control valve 804.

Operations of the direction/flow rate control valve 804 are controlled by the valve controller 813.

The direction/flow rate control valve 804 is connected to a hydraulic pump 805 via a pump discharge passage. The capacity of the hydraulic pump 805 alters in accordance with the tilting position of the cam plate. The cam plate of the hydraulic pump 805 is altered by an operation of a cam plate control unit 806.

Operations of the cam plate control unit 806 are controlled by the pump controller 814.

The hydraulic pump 805 is driven by the engine 816.

The fuel injection quantity (torque), engine rotation speed, and so on of the engine 816 are controlled by the engine controller 815.

When the cam plate control unit 806 is controlled by the pump controller 814, the tilting position of the cam plate of the hydraulic pump 805 changes such that the capacity of the hydraulic pump changes and the pump discharge flow rate supplied to the direction/flow rate control valve 804 changes.

When the direction/flow rate] control valve 804 is controlled by the valve controller 813, the direction and flow rate in which pressure oil is supplied to the cylinder chambers of the hydraulic cylinder 803 change such that the driving direction and driving velocity of the hydraulic cylinder 803 change. As a result, the operating direction and operating speed of the attachment 802 are altered.

Various sensors for detecting the engine rotation speed, battery voltage, fuel quantity, engine oil pressure, engine oil temperature, working fluid temperature, cooling water temperature, and the alternator (generator) charge voltage to the battery 63, are installed in various parts of the vehicle body 50 of the construction machine 31, and these sensors constitute a sensor group 62. A sensor 62a detects that the engine 816 has actually started by detecting that the alternator charge voltage to the battery 63 has reached or exceeded a fixed level.

The monitoring controller 811 is installed in a monitoring panel 820. The monitoring panel 820 is provided in the operating cab of the construction machine 31.

An operating switch group 822 comprising a display screen 821 and various operating switches is disposed on the outer face of the monitoring panel 820.

The monitoring controller 811 accumulates sensor detection values detected by the sensor group 62, and when the sensor detection values reach abnormal values, illuminates a caution lamp on the display screen 821 and generates an error code. The monitoring controller 811 also displays the current conditions of the construction machine, such as cooling water temperature, and an error code indicating a specific irregularity in the construction machine 31, such as a decrease in engine oil pressure, on the display screen 821 of the monitoring panel 820.

By operating the operating switch group 822 on the monitoring panel 820, control data for controlling the running gear or attachment 802 of the construction machine 31 are generated by the monitoring controller 811. The control data are outputted from the monitoring controller 811 to the serial communication line 52. By operating a setting switch from the operating switch group 822, for example, the relationship between the manipulated variable of the attachment operating lever and the manipulated variable of the attachment 802, or in other words the operating mode, may be set to any one of "heavy excavation", "excavation", "correction of track", or "micro operations".

The operating switch group 822 on the monitoring panel 820 comprises a "start-up locking" switch 822a.

When this start-up locking switch 822a is manipulated, a start-up lock setting command signal LON is outputted to the start-up locking circuit 830, as a result of which a relay of the start-up locking circuit 830 is energized and the construction machine 31 enters a start-up locked state. That is, even if the engine key switch 64 is switched on, no starter signal is outputted and the engine 816 cannot be started.

Release of the start-up locked state is performed on condition that a password (code number) is inputted.

The operating switch group 822 on the monitoring panel 820 comprises a password setting switch 822b for setting a password. The password setting switch 822b is constituted, for example, by a numeric keypad switch.

When this password setting switch 822b is operated once the engine key switch 64 has been switched off, a password corresponding to the operation content thereof is stored in memory inside the monitoring controller 811 as a "set password".

The operating switch group 822 on the monitoring panel 820 comprises a password input switch 822c for inputting a password.

When this password input switch 822c is operated once the engine key switch 64 has been switched on, a password corresponding to the operation content thereof is inputted into the monitoring controller 811 and a judgment is made in a CPU inside the monitoring controller 811 as to whether or not the inputted password matches the set password stored in memory inside the monitoring controller 811. If, as a result, the inputted password matches the set password, a start-up lock release command signal LOFF is outputted to the start-up lock circuit and the construction machine 31 enters a start-up lock released state. That is, by switching the engine key switch 64 on, a starter signal is outputted and the engine 816 is started.

If the inputted password does not match the set password, however, the start-up lock release command signal LOFF is not outputted. Thus the construction machine 31 is maintained in a start-up locked state such that even if the engine key switch 64 is switched on, no starter signal is outputted and the engine 816 cannot be started.

The above-mentioned start-up lock setting and start-up lock release may be performed by a remote control operation from the terminal 11 provided on the manager side.

In the first embodiment shown in FIG. 42, communication is performed through a ground wave base station 817 instead of the communication satellite 9 shown in FIG. 1. The ground wave base station 817 is a portable base station, for example.

A communication terminal 56 for packet data communication is incorporated into the communication controller 54 of the construction machine 31. Wireless communication 5 by means of packet communication is performed between an antenna 808 of the communication terminal 56 and the ground wave base station 817. The ground wave base station 817 constitutes a part of a packet communication network. The packet communication network is connected to the Internet 2, as is shown in FIG. 1, via a gateway and a private line. The gateway performs protocol conversion between the packet communication protocol and the TCP/IP protocol of the Internet 2, and an existing "Internet connection service" may be used thereas.

Thus, when an operation is performed on the terminal 11 which is connected to the Internet 2 to input "start-up lock setting" data, a start-up lock setting command is transmitted toward the ground wave base station 817 and, by means of wireless communication 5, is received by the communication terminal 56 via the antenna 808. When the start-up lock setting command is received by the communication terminal 56, the communication controller 54 outputs a start-up lock setting command signal LON to the start-up locking circuit 830. As a result, the relay of the start-up locking circuit 830 is energized and the construction machine 31 enters a start-up locked state. That is, even if the engine key switch 64 is switched on, no starter signal is outputted and the engine 816 cannot be started.

Further, when an operation is performed on the terminal 11 to input "start-up lock release" data, a start-up lock release command is transmitted toward the ground wave base station 817 and, by means of wireless communication 5, is received by the communication terminal 56 via the antenna 808. When the start-up lock release command is received by the communication terminal 56, the communication controller 54 outputs a start-up lock release command signal LOFF to the start-up locking circuit 830. As a result, the construction machine 31 enters a start-up lock released state. That is, when the engine key switch 64 is switched on, a starter signal is outputted and the engine 816 is started.

The information management controller 812 accumulates sensor detection values detected by the sensor group 62 and generates error codes when the sensor detection values reach abnormal values. The information management controller 812 then stores these sensor detection values and error codes in internal memory. In this case, the time of error code generation is measured by a real time clock IC and an oscillator such that the error codes are stored in memory corresponding to this time. Hence, a time series history of error codes generated by the construction machine 3 can be managed.

A frame signal of a predetermined communication protocol is transmitted over the serial communication line 52. When the frame signal is transmitted to each of the controllers 811, 812, 813, 814, 815, 54, a driving signal is outputted to the control subjects connected to the controllers 811, 812, 813, 814, 815, 54 in accordance with the data written in the frame signal, and thus each of the control subjects is drive controlled.

For example, when "heavy excavation" mode, indicating work with a large load, is set as the operating mode using the operating switch group 822 on the monitoring panel 820, control data indicating this "heavy excavation" mode are written into the aforementioned frame signal and transmitted from the monitoring controller 811 to the engine controller 815 via the serial communication line 52.

The frame signal is then received in the engine controller 815 and the control data written in the frame signal indicating "heavy excavation mode" are read. The engine 816 is then controlled to a fuel injection amount and target rotation speed corresponding to "heavy excavation mode".

A case was described above in which data transmission and reception are performed between the monitoring controller 811 and the engine controller 815 by means of a frame signal. Data transmission and reception are performed in a similar manner, by means of a frame signal, among the other controllers.

The operations of the first embodiment will be described below.

When the engine key switch 64 of the construction machine 31 is switched off, a driver operates the password setting switch 822b on the monitoring panel 820 to set a password. The set password is stored in memory inside the monitoring controller 811. Then, the start-up locking switch 822a on the monitoring panel 820 is operated. As a result, a start-up lock setting command signal LON is outputted to the start-up locking circuit 830, whereby the relay of the start-up locking circuit 830 is energized and the construction machine 31 enters a start-up locked state. Subsequent release of the start-up locked state is performed with the input of a password (code number) as a condition, and thus if the set password is not inputted, no starter signal is outputted even if the engine key switch 64 is switched on, and the engine 816 cannot be started.

The driver who operates the construction machine 31 must abide by the following items.

a) The password must not be noted in the vicinity of the driving seat.

b) The password must not be passed on verbally when the next driver takes over the driving of a construction machine.

c) The manager must be contacted when the person who set the password forgets the password, and by the next driver who takes over the driving of the construction machine.

Thus, when the engine is next started, the manager is contacted by the next driver who takes over driving or when the person who set the password forgets the password.

When the driver who makes contact is confirmed to be a rightful driver who may drive the construction machine 31, the manager on the terminal 11 side performs an operation to input "start-up lock release" data on the terminal 11. When the "start-up lock release data" are inputted on the terminal 11, a start-up lock release command is transmitted to the ground wave base station 817, and by means of wireless communication 5, is received in the communication terminal 56 via the antenna 808. When the start-up lock release command is received in the communication terminal 56, the communication controller 54 outputs a start-up lock release command signal LOFF to the start-up locking circuit 830. As a result, the construction machine 31 enters a start-up lock released state. Thus the engine 816 is started when the engine key switch 64 is switched on without the driver inputting a password.

According to the first embodiment as described above, the manager releases a start-up locked state in the construction machine 31 on condition of receiving contact from a rightful driver, as a result of which the release of a start-up locked state by a third party other than a rightful driver can be prevented.

Note that when the person who set the password remembers the password, there is no need to contact the manager, and the start-up locked state can be released by inputting the correct password on the monitoring panel 820.

In the first embodiment, a driver contacts the manager on the terminal 11 side, whereupon the manager inputs "start-up lock release" data on the terminal 11 and transmits these data to the construction machine 31. However, the driver may contact the manager on the server terminal side such that the manager inputs the "start-up lock release" data on the server terminal 21 and transmits these data to the construction machine 31.

(Second Embodiment)

When the manager judges that operations of the construction machine 31 are to be halted, "start-up lock setting" data and "set password" data are inputted on the terminal 11.

When "start-up lock setting" data and "set password" data are inputted on the terminal 11, these data are transmitted to the ground wave base station 817, and by means of wireless communication 5, are received by the communication terminal 56 via the antenna 808. When these data are received by the communication terminal 56, the communication controller 54 extracts the "start-up lock setting" data from these data and outputs a start-up lock setting command signal LON to the start-up locking circuit 830 in accordance with the content of the data. As a result, the relay of the start-up locking circuit 830 is energized and the construction machine 31 enters a start-up locked state.

The communication controller 54 also extracts the "set password" data from the received data, whereupon these data are written into a frame signal and transmitted from the communication controller 54 to the monitoring controller 811 via the serial communication line 52. As a result, the "set password" is stored in memory inside the monitoring controller 811.

The manager on the terminal 11 side then contacts only a rightful driver and informs the driver of the "set password" set on the terminal 11 side.

When the engine key switch 64 is switched on, the driver manipulates the password input switch 822c on the monitoring panel 820 to input the password learned from the manager. A judgment is then made in the CPU inside the monitoring controller 811 as to whether or not the inputted password matches the set password stored in memory inside the monitoring controller 811, and if the inputted password matches the set password, a start-up lock release command signal LOFF is outputted to the start-up locking circuit 830 such that the construction machine 31 enters a start-up lock released state.

However, when a driver forgets the password learned from the manager, or when the next driver takes over from a driver, that driver contacts the manager.

When the driver who makes contact is confirmed to be a rightful driver who may drive the construction machine 31, the manager on the terminal 11 side performs an operation to input "start-up lock release" data on the terminal 11. When the "start-up lock release data" are inputted on the terminal 11, a start-up lock release command is transmitted to the ground wave base station 817, and by means of wireless communication 5, is received in the communication terminal 56 via the antenna 808. When the start-up lock release command is received in the communication terminal 56, the communication controller 54 outputs a start-up lock release command signal LOFF to the start-up locking circuit 830. As a result, the construction machine 31 enters a start-up lock released state. Thus the engine 816 is started when the engine key switch 64 is switched on without the driver inputting a password.

According to the second embodiment as described above, the manager releases the start-up locked state in the construction machine 31 on condition of receiving contact from a rightful driver, as a result of which the release of a start-up locked state by a third party other than a rightful driver can be prevented.

In the second embodiment, a driver contacts the manager on the terminal 11 side, whereupon the manager inputs "start-up lock release" data on the terminal 11 and transmits these data to the construction machine 31. However, the driver may contact the manager on the server terminal side such that the manager inputs the "start-up lock release" data on the server terminal 21 and transmits these data to the construction machine 31.

(Third Embodiment)

In the third embodiment, a driver on the construction machine 31 side may not set a password. In other words, provision is made such that even if the password setting switch 822b on the monitoring panel 820 is manipulated, the setting content thereof is deemed invalid, or such that the password setting switch 822b does not exist on the monitoring panel 820 shown in FIG. 42.

When a driver manipulates the start-up locking switch 822a on the monitoring panel 820, a start-up lock setting command signal LON is outputted to the start-up locking circuit 830, whereby the relay of the start-up locking circuit 830 is energized and the construction machine 31 enters a start-up locked state.

In accordance with an operation of the start-up locking switch 822a, processing is performed to set a password automatically and randomly in the CPU of the monitoring controller 811. For example, a random number generation program is installed, and by executing this program, random numbers are generated and a password comprising a combination of random numbers or the like is set on the basis of the generated random numbers. Hence, whenever the start-up locking switch 822a is manipulated (whenever the engine key switch 64 is switched off), the set password is set in a combination of different numerals, characters, symbols, codes, and the like. The password set in this manner is stored in memory inside the monitoring controller 811.

Subsequent release of the start-up locked state is performed with the input of a password (code number) as a condition, and thus if the correct password as set is not inputted, no starter signal is outputted even if the engine key switch 64 is switched on, and hence the engine 816 cannot be started.

The monitoring controller 811 writes "set password" data into a frame signal to be transmitted from the monitoring controller 811 to the communication controller 54 via the serial communication line 52. The communication controller 54 transmits these "set password" data to the communication terminal 56. The communication terminal 56 transmits the data from the antenna 808 to the ground wave base station 817 by means of wireless communication 5. In other words, the construction machine 31 uses "password setting" as a trigger to automatically transmit data corresponding thereto. Note that data specifying the vehicle 31 itself (the transmission source address) are included within the automatically transmitted data.

Information stating that "password "XXXXXX" has been set" is then displayed on a display screen of the terminal 11, which is connected to the Internet 2, together with data ("maker", "model", "serial number", "ID") specifying the vehicle 31. The information stating that "password "XXXXXX" has been set" may be included in the information on the "general information screen" shown in FIG. 34.

The manager on the terminal 11 side contacts only a rightful driver and provides the "set password".

When the engine key switch 64 is switched on, the driver manipulates the password input switch 822c on the monitoring panel 820 to input the password learned from the manager. A judgment is made in the CPU inside the monitoring controller 811 as to whether or not the inputted password matches the set password stored in memory inside the monitoring controller 811, and if the inputted password matches the set password, a start-up lock release command signal LOFF is outputted to the start-up locking circuit 830 and the construction machine 31 enters a start-up locked state.

According to the third embodiment as described above, provision is made such that a password cannot be set arbitrarily even by a rightful driver, and such that the set password is changed whenever start-up is locked and the start-up locked state in the construction machine 31 is released only when the manager informs a rightful driver of the set password. As a result, release of a start-up locked state by a third party other than a rightful driver can be prevented.

Note that in the third embodiment, the manager on the terminal 11 side informs a driver of the "set password", but since the "set password" data are stored in the database in the server terminal 21, a manager on the server terminal 21 side may inform a driver of the "set password".

(Fourth Embodiment)

In the fourth embodiment, as in the third embodiment, a driver on the construction machine 31 side may not set a password.

When a driver manipulates the start-up locking switch 822a on the monitoring panel 820, a start-up lock setting command signal LON is outputted to the start-up locking circuit 830, as a result of which the relay of the start-up locking circuit 830 is energized and the construction machine 31 enters a start-up locked state.

The monitoring controller 811 writes "start-up lock setting" data into a frame signal to be transmitted from the monitoring controller 811 to the communication controller 54 via the serial communication line 52. The communication controller 54 transmits these "start-up lock setting" data to the communication terminal 56. The communication terminal 56 transmits the data from the antenna 808 to the ground wave base station 817 by means of wireless communication 5. In other words, the construction machine 31 uses "start-up lock setting" as a trigger to automatically transmit data corresponding thereto. Note that data specifying the vehicle 31 itself (the transmission source address) are included within the automatically transmitted data.

Information stating "start-up lock setting" is then displayed on a display screen of the terminal 11, which is connected to the Internet 2, together with data ("maker", "model", "serial number", "ID") specifying the construction vehicle 31. The information stating "start-up lock setting" may be included in the information on the "general information screen" shown in FIG. 34.

When the "start-up lock setting" data are received in the terminal 11, processing is performed to set a password automatically and randomly. For example, a random number generation program is installed, and by executing this program, random numbers are generated and a password comprising a combination of random numbers or the like is set on the basis of the generated random numbers. Hence, whenever the start-up locking switch 822a on the monitoring panel 820 on the construction machine 31 side is manipulated (whenever the engine key switch 64 is switched off), the set password is set in a combination of different numerals, characters, symbols, codes, and the like.

When processing to set a password is performed on the terminal 11, data indicating the set password are transmitted toward the ground wave base station 817, and by means of wireless communication 5, are received in the communication terminal 56 via the antenna 808. When the "set password" data are received by the communication terminal 56, the communication controller 54 writes the "set password" data into a frame signal to be transmitted from the communication controller 54 to the monitoring controller 811 via the serial communication line 52. As a result, the "set password" is stored in memory inside the monitoring controller 811.

Subsequent release of the start-up locked state is performed with the input of a password (code number) as a condition, and thus if the correct password as set is not inputted, no starter signal is outputted even if the engine key switch 64 is switched on, and the engine 816 cannot be started.

The manager on the terminal 11 side contacts only a rightful driver and provides the "set password" thereto.

When the engine key switch 64 is switched on, a driver manipulates the password input switch 822c on the monitoring panel 820 to input the password learned from the manager. A judgment is then made in the CPU inside the monitoring controller 811 as to whether or not the inputted password matches the set password stored in memory inside the monitoring controller 811, and if the inputted password matches the set password, a start-up lock release command signal LOFF is outputted to the start-up locking circuit 830 and the construction machine 31 enters a start-up lock released state.

According to this fourth embodiment as described above, provision is made such that a password cannot be set arbitrarily even by a rightful driver, and such that the set password is changed whenever start-up is locked and the start-up locked state in the construction machine 31 is released only when the manager informs a rightful driver of the set password. As a result, release of a start-up locked state by a third party other than a rightful driver can be prevented.

Note that in the fourth embodiment, processing is performed in the terminal 11 to set a password and a manager on the terminal 11 side informs a driver of a "set password". However, since the "start-up lock setting" data are received in the server terminal 21, processing to set a password may be performed in the server terminal 21 upon reception of the "start-up lock setting" data such that the manager on the server terminal 21 side informs a driver of the "set password".

(Fifth Embodiment)

In this fifth embodiment, a driver on the construction machine 31 side may set a password, but password setting may be added and removed freely. The operating switch group 822 on the monitoring panel 820, as shown in FIG. 42, includes a password setting off selection switch 822*d* for selecting to switch off password setting.

When this password setting off selection switch 822*d* is manipulated, password setting becomes unnecessary, and simply by switching the engine key switch 64 on at the time of the next engine start-up, a start-up locked state is released without inputting a password.

With Password Setting

When the engine key switch 64 of the construction machine 31 is switched off, a driver operates the password setting switch 822*b* on the monitoring panel 820 to set a password (the password setting off selection switch 822*d* is not operated). In so doing, data indicating the presence of a set password are generated. The set password is stored in memory inside the monitoring controller 811. The start-up locking switch 822*a* is then operated on the monitoring panel 820. As a result, a start-up lock setting command signal LON is outputted to the start-up locking circuit 830, whereby the relay of the start-up locking circuit 830 is energized and the construction machine 31 enters a start-up locked state. Subsequent release of the start-up locked state is performed with the input of a password (code number) as a condition, and if the set password is not inputted, no starter signal is outputted even when the engine key switch 64 is switched on, and the engine 816 cannot be started.

The monitoring controller 811 writes the "set password present" data into a frame signal to be transmitted from the monitoring controller 811 to the communication controller 54 via the serial communication line 52. The communication controller 54 transmits these "set password present" data to the communication terminal 56. The communication terminal 56 transmits the data from the antenna 808 to the ground wave base station 817 by means of wireless communication 5. In other words, the construction machine 31 uses "set password present" as a trigger to automatically transmit data corresponding thereto. Note that data specifying the vehicle 31 itself (the transmission source address) is included in the automatically transmitted data.

Information stating "password setting on" is then displayed on a display screen of the terminal 11, which is connected to the Internet 2, together with data ("maker", "model", "serial number", "ID") specifying the construction machine 31. The information stating "password setting on" may be included in the information on the "general information screen" shown in FIG. 34.

No Password Setting

When the engine key switch 64 of the construction machine 31 is switched off, a driver operates the password setting off selection switch 822*d* on the monitoring panel 820. In so doing, data indicating no set password are generated. The start-up locking switch 822*a* on the monitoring panel 820 is then operated. As a result, a start-up lock setting command signal LON is outputted to the start-up locking circuit 830, whereby the relay of the start-up locking circuit 830 is energized and the construction machine 31 enters a start-up locked state. Since no password is set, however, the start-up locked state can be released and the engine 816 started whenever the engine key switch 64 is subsequently switched on, without inputting a password.

The monitoring controller 811 writes the "no set password" data into a frame signal to be transmitted from the monitoring controller 811 to the communication controller 54 via the serial communication line 52. The communication controller 54 transmits the "no set password" data to the communication terminal 56. The communication terminal 56 transmits the data from the antenna 808 to the ground wave base station 817 by means of wireless communication 5. In other words, the construction machine 31 uses "password setting off" as a trigger to automatically transmit data corresponding thereto. Note that data specifying the vehicle 31 itself (the transmission source address) is included in the automatically transmitted data.

Information stating "password setting off" is then displayed on a display screen of the terminal 11, which is connected to the Internet 2, together with data ("maker", "model", "serial number", "ID") specifying the construction machine 31. The information stating "password setting off" may be included in the information on the "general information screen" shown in FIG. 34.

Thus the manager is able to grasp the security level of the construction machine 31 from the information stating "password setting on" and "password setting off" displayed on the terminal 11 display screen.

The probability of the construction machine 31 engine being started improperly depends upon whether password setting is on or off. By learning on the terminal 11 the data history of "password setting on" and "password setting off", automatically transmitted from the construction machine 31, the security level of the construction machine 31 is judged, whereby reparation costs for improper engine start-up are calculated and judgments are made as to indemnity.

Note that the information stating "password setting on" and "password setting off" may be displayed on a display screen of the server terminal 21 and judgments may be made from the history of these data as to the security level of the construction machine 31.

(Sixth Embodiment)

In the sixth embodiment, similarly to the fifth embodiment, when the password setting off selection switch 822*d* is operated, password setting is invalidated such that a start-up locked state may be released at the time of the next engine start-up simply by switching the engine key switch 64 on, without inputting a password.

In a rental company, the construction machine 31 is loaned to a user after setting a password. In other words, the construction machine 31 is loaned at a high level of security.

However, since it is troublesome to perform password input operations whenever the engine is started, some users may operate the password setting off selection switch 822*d* to invalidate password setting. Thereafter, the engine can be started simply by switching the engine key switch 64 on, without inputting a password, leading to a large reduction in the security level of the construction machine 31.

Provision is therefore made in this sixth embodiment such that when a user invalidates password setting, a rental company may forcibly set a new password.

When the engine key switch 64 of the construction machine 31 is switched off, a driver operates the password setting off selection switch 822*d* on the monitoring panel 820. As a result, data indicating no set password are generated. The start-up locking switch 822*a* on the monitoring panel 820 is then operated. Thus a start-up lock setting command signal LON is outputted to the start-up locking circuit 830, whereby the relay of the start-up locking circuit 830 is energized and the construction machine 31 enters a start-up locked state.

The monitoring controller 811 writes the "no set password" data into a frame signal to be transmitted from the monitoring controller 811 to the communication controller 54 via the serial communication line 52. The communication controller 54 transmits the "no set password" data to the communication terminal 56. The communication terminal 56 transmits the data from the antenna 808 to the ground wave base station 817 by means of wireless communication 5. In other words, the construction machine 31 uses "password setting off" as a trigger to automatically transmit data corresponding thereto. Note that data specifying the construction machine 31 itself (the transmission source address) is included in these automatically transmitted data.

Thus, information stating "password setting off" is displayed on a display screen of the terminal 11, which is connected to the Internet 2, together with data ("maker", "model", "serial number", and "ID") specifying the construction machine 3. It is assumed that the terminal 11 is provided on the rental company side. The information stating "password setting off" may be included in the information on the "general information screen" shown in FIG. 34.

Hence, from the information stating "password setting on" or "password setting off", displayed on the terminal 11 display screen, the rental company manager can learn the security level of the construction machine 31 which is on loan.

When the "password setting off" data are received in the terminal 11, the manager sets a password which is different from the password set initially upon loan of the construction machine 31, and performs an operation to input the set password data.

When an operation is performed on the terminal 11 to input the "set password" data, these data are transmitted toward the ground wave base station 817 and received by the communication terminal 56 via the antenna 808 by means of wireless communication 5. When these data are received by the communication terminal 56, the communication controller 54 writes the data into a frame signal to be transmitted from the communication controller 54 to the monitoring controller 811 via the serial communication line 52. As a result, "set password" is stored in memory inside the monitoring controller 811. Thereafter a start-up locked state cannot be released unless a password is inputted.

The manager on the terminal 11 side contacts the driver on loan and provides the driver with the "set password" set on the terminal 11 side.

When the engine key switch 64 is switched on, the driver operates the password input switch 822*c* on the monitoring panel 820 to input the password learned from the manager. A judgment is then made in the CPU of the monitoring controller 811 as to whether or not the inputted password matches the set password stored in memory inside the monitoring controller 811. If the inputted password matches the set password, a start-up lock release command signal LOFF is outputted to the start-up locking circuit 830 and the construction machine 31 enters a start-up lock released state.

According to the sixth embodiment as described above, even when a driver of the construction machine 31 invalidates password setting, the manager forcibly sets a different password, and therefore a high level of security can be maintained in the construction machine 31.

(Seventh Embodiment)

In the aforementioned sixth embodiment, the password setting off selection switch 822*d* is provided on the construction machine 31 side, but in this seventh embodiment, a switch corresponding to the "password setting off selection switch 822*d*" is provided on the terminal 11 side or the server terminal 21 side. That is, a driver on the construction machine 31 side is unable to invalidate password setting. A manager on the terminal 11 side or the server terminal 21 side operates the switch corresponding to the "password setting off selection switch 822*d*" under special conditions, whereby the resultant operating signal is transmitted to the construction machine 31 side and password setting is invalidated.

(Eighth Embodiment)

In the eighth embodiment, similarly to the sixth embodiment, the password setting off selection switch 822*d* is provided on the construction machine 31 side.

When the password setting off selection switch 822*d* is operated, password setting is invalidated and a start-up locked state can be released at the time of the next engine start-up simply by switching the engine key switch 64 on, without inputting a password.

A rental company loans the construction machine 31 to a user after setting a password. In other words, the construction machine 31 is loaned at a high level of security.

However, since it is troublesome to perform password input operations whenever the engine is started, some users may operate the password setting off selection switch 822*d* to invalidate password setting. As a result, the engine can be started thereafter simply by switching the engine key switch 64 on, without inputting a password, leading to a large reduction in the security level of the construction machine 31.

Hence in the eighth embodiment, when a driver actually starts the engine with password setting invalidated, improper engine start-up is judged to have been performed and the rental company forcibly sets a new password in order to prevent subsequent improper engine start-ups.

When the engine key switch 64 of the construction machine 31 is switched off, the driver operates the password setting off selection switch 822*d* on the monitoring panel 820. As a result, data indicating password setting off are generated. The start-up locking switch 822*a* is then operated on the monitoring panel 820. Thus a start-up lock setting command signal LON is outputted to the start-up locking circuit 830, whereby the relay of the start-up locking circuit 830 is energized and the construction machine 31 enters a start-up locked state.

The data indicating "no set password" are transmitted from the monitoring controller 811 to the communication controller 54 via the serial communication line 52.

The information management controller 812 extracts a detection value from the sensor 62a and transmits this detection value from the sensor 62a to the communication controller 54 via the serial communication line 52.

A judgment is made in the CPU of the communication controller 54 that the engine 816 has actually been started (that the engine 816 is in operation) with no password set on the basis of the data transmitted via the serial communication line 52.

When the communication controller 54 judges that the engine 816 has actually been started with no password set, data indicating "no password set and engine started" are generated and these data are transmitted to the communication terminal 56. The communication terminal 56 transmits these data from the antenna 808 to the ground wave base station 817 by means of wireless communication 5. In other words, the construction machine 31 uses the judgment "no password set and engine started" as a trigger to automatically transmit data corresponding thereto. As a result, information stating "no password set and engine started" is displayed on a display screen of the terminal 11, which is connected to the Internet 2, together with data ("maker", "model", "serial number", and "ID") specifying the construction machine 31. The information stating "no password set and engine started" may be included in the information on the "general information screen" shown in FIG. 34.

Automatic transmission may be performed only when the engine 816 is started outside of a fixed time period (17:00 to 8:00) during which the construction machine 31 is not usually in operation.

The manager on the terminal 11 side is able to confirm the position of the construction machine 31 by, for example, switching to the "map display screen" illustrated in FIG. 27. Further, an appropriate person may be dispatched to the location of the construction machine 31. In so doing, swift and accurate measures may be taken against irregularities in the construction machine 31.

Measures against irregularities may also be taken immediately at the stage of reception in the server terminal 21 of the data indicating "no password set and engine started".

When the "no password set and engine started" data are received in the terminal 11, the manager sets a password which is different to the password set initially upon loan of the construction machine 31, and performs an operation to input the set password data.

When an operation is performed on the terminal 11 to input the "set password" data, these data are transmitted toward the ground wave base station 817 and received by the communication terminal 56 via the antenna 808 by means of wireless communication 5. When these data are received by the communication terminal 56, the communication controller 54 writes the data into a frame signal to be transmitted from the communication controller 54 to the monitoring controller 811 via the serial communication line 52. As a result, "set password" is stored in memory inside the monitoring controller 811. Hence thereafter, a start-up locked state cannot be released unless a password is inputted.

The manager on the terminal 11 side contacts the driver on loan and provides the driver with the "set password" set on the terminal 11 side.

When the engine key switch 64 is switched on, the driver operates the password input switch 822c on the monitoring panel 820 to input the password learned from the manager. A judgment is then made in the CPU of the monitoring controller 811 as to whether or not the inputted password matches the set password stored in memory inside the monitoring controller 811. If the inputted password matches the set password, a start-up lock release command signal LOFF is outputted to the start-up locking circuit 830 and the construction machine 31 enters a start-up lock released state.

According to the eighth embodiment as described above, when a driver actually starts the engine when password setting has been invalidated, it is judged that the engine has been started improperly and the manager forcibly sets a new password. As a result, subsequent improper starting of the engine can be prevented and a high level of security can be maintained in the construction machine 31.

(Ninth Embodiment)

In the ninth embodiment, the engine is started under the condition of a driver on the construction machine 31 side inputting a user ID to differentiate him/herself from others. In this ninth embodiment, engine start-up is not conditional upon the input of a password.

Here, a user ID is a combination of numerals, characters, symbols, and codes allocated to each individual legitimate driver who drives a construction machine 31, 32 . . . .

Further, a vehicle ID for distinguishing a construction machine from other construction machines is allocated to each of the construction machines 31, 32.

When a driver operates the start-up locking switch 822a on the monitoring panel 820, a start-up lock setting command signal LON is outputted to the start-up locking circuit 830, whereby the relay of the start-up locking circuit 830 is energized and the construction machine 31 enters a start-up locked state. Note, however, that since engine start-up is not conditional upon password input, the start-up locked state cannot be released by a switch manipulation on the monitoring panel 820.

When the engine key switch 64 of the construction machine 31 is next switched on, the driver inputs a user ID on the monitoring panel 820.

The monitoring controller 811 writes the inputted "user ID" data into a frame signal to be transmitted from the monitoring controller 811 to the communication controller 54 via the serial communication line 52. The communication controller 54 transmits these "user ID" data to the communication terminal 56. The communication terminal 56 transmits these "user ID" data, together with the "vehicle ID" data, from the antenna 808 to the ground wave base station 817 by means of wireless communication 5. In other words, the construction machine 31 uses "user ID input" as a trigger to automatically transmit "user ID" and "vehicle ID" data.

As a result, the "user ID" and "vehicle ID" are displayed on a display screen of the terminal 11, which is connected to the Internet 2.

When the "user ID" and "vehicle ID" data are received by the terminal 11, a judgment is made as to whether or not the following conditions (a), (b), and (c) are satisfied.

(a) The person specified by the received "user ID" is a legitimate user permitted to drive a construction machine.

(b) The construction machine specified by the received "vehicle ID" is a vehicle permitted by the manager to be driven by the driver specified by the received "user ID".

(c) The construction machine specified by the received "vehicle ID" may be driven according to the manager (for example, the rental period has not passed, the vehicle has not entered a region where driving is not permitted, and so on).

When all of conditions (a), (b), and (c) are satisfied, it is judged that the engine may be started and processing is performed to generate data for releasing start-up lock in the construction machine 31. As a result, a start-up lock release command is transmitted toward the ground wave base station 817 and received by the communication terminal 56 via the antenna 808 by means of wireless communication 5. When the start-up lock release command is received by the communication terminal 56, the communication controller 54 outputs a start-up lock release command signal LOFF to the start-up locking circuit 830. Thus the construction machine 31 enters a start-up lock released state. By switching the engine key switch 64 on, a driver may start the engine 816.

However, when any one of conditions (a), (b), and (c) is not satisfied, the terminal 11 forbids start-up of the construction machine 31. In other words, a start-up lock release command is not transmitted to the construction machine 31. As a result, the construction machine 31 is maintained in a start-up locked state and the engine 816 cannot be started even when the engine key switch 64 is switched on.

According to the ninth embodiment as described above, a judgment is made on the manager side as to whether a driver and a vehicle are rightful, and engine start-up is possible only when the manager permits engine start-up. Thus improper engine start-up can be prevented and the construction machine 31 can be maintained at a high level of security.

Also according to the ninth embodiment, a "user ID" is automatically transmitted from the construction machine 31 side to the terminal 11 on the manager side upon start-up of the construction machine 31, and thus by learning the history of these data, labor management can be performed accurately.

Note that the aforementioned conditions (a), (b), (c) for engine start-up permission are examples, and one or an arbitrary combination of two of these conditions may be used as engine start-up conditions. Alternatively, conditions other than (a), (b), (c) may be added thereto and used as the conditions for engine start-up permission.

Further, the judgment as to whether or not permission for engine start-up is to be given may be made in the server terminal 21 such that the start-up lock release command is transmitted from the server terminal 21 to the construction machine 31.

In this ninth embodiment, drivers are differentiated by the input of a "user ID". However, any method may be employed for distinguishing an individual from others. For example, an individual verification method using physical features such as fingerprint verification or voice recognition may be applied.

(Tenth Embodiment)

An embodiment will be described below for dealing with an irregular situation in which an engine has been started regardless of whether or not a manager has given permission for engine start-up.

When a driver operates the start-up locking switch 822a on the monitoring panel 820, a start-up lock setting command signal LON is outputted to the start-up locking circuit 830, whereby the relay of the start-up locking circuit 830 is energized and the construction machine 31 enters a start-up locked state. However, password input is not set as a condition for engine start-up, and therefore the start-up locked state cannot be released by a switch manipulation on the monitoring panel 820.

It is assumed that the engine 816 has actually been started by, for example, forcibly creating an electrical connection in a start-up locked state.

The communication controller 54 makes a judgment as to whether or not "start-up lock release command" (engine start-up permission) data have been received from the manager side.

Further, the information management controller 812 extracts a detection value from the sensor 62a and transmits the detection value from the sensor 62a to the communication controller 54 via the serial communication line 52.

It is then judged in the CPU of the communication controller 54 that the engine 816 has actually been started on the basis of the data transmitted from the information management controller 812 via the serial communication line 52.

When, as a result of these judgments, it is judged that no "start-up lock release command" (engine start-up permission) data have been received, and that the engine 816 has actually been started (the engine 816 is in operation), the communication controller 54 transmits data indicating that "the engine has been started without permission" to the communication terminal 56. The communication terminal 56 transmits these data from the antenna 808 to the ground wave base station 817 by means of wireless communication 5. In other words, the construction machine 31 uses the judgment "the engine has been started without permission" as a trigger to automatically transmit data corresponding thereto. As a result, information stating that "the engine has been started without permission" is displayed on a display screen of the terminal 11, which is connected to the Internet 2, together with data ("maker", "model", "serial number", and "ID") specifying the construction machine 31. The information stating that "the engine has been started without permission" may be included in the information on the "general information screen" shown in FIG. 34.

Automatic transmission may be performed only when the engine 816 is started outside of a fixed time period (17:00 to 8:00) during which the construction machine 31 is not usually in operation.

The manager on the terminal 11 side is able to confirm the position of the construction machine 31 by, for example, switching to the "map display screen" illustrated in FIG. 27. Further, an appropriate person may be dispatched to the location of the construction machine 31. In so doing, swift and accurate measures may be taken against irregularities in the construction machine 31.

Measures against irregularities may also be taken immediately at the stage of reception in the server terminal 21 of the data indicating that "the engine has been started without permission".

For the proprietor of a company in which civil engineering is performed by undertaking civil engineering projects and having operators operate construction machines, operator labor management and work schedule management are important. Operators are therefore required to create daily work reports. Conventionally, however, the work involved in the creation of daily work reports in order to impose work to read and input service meter values is troublesome and places a heavy load on the operators. Furthermore, since input work is performed manually, inaccurate daily work reports are sometimes created due to input errors and the like.

Further, daily work reports contain information which is useful not only to engineering companies, which are the users of construction machines, but also to rental companies which loan construction machines, second hand dealers who sell second hand construction machines, and manufacturers who manufacture construction machines. More specifically, a rental company may distinguish between customers who subject the construction machines to demanding usage and those who do not by learning daily work report history, and thus the daily work reports are useful in customer management. A second hand dealer who sells second hand construction machines may calculate the past usage time, working efficiency and the like of a construction machine by learning daily work report history, and thus the daily work reports are useful in setting the price of a second hand vehicle. A manufacturer who manufactures construction machines may calculate the durability of a construction machine by learning daily work report history, and thus the daily work reports are useful in the design and so on of future models.

It is therefore necessary to be able to easily obtain daily work report information in real time from each of the terminals.

Thus, an embodiment will now be described in which daily work reports can be created accurately and without placing a load on an operator, and in which daily work report information can be easily obtained from a terminal in real time.

The server terminal 21 is provided in the office of a manufacturer, and a Web site display screen "daily work report screen", as shown in FIG. 40, is created.

Every day at 23:00, the operating map, date, and operating time (FIG. 40) up to 23:00 on that day are automatically transmitted from the vehicle 31. Here, the operating map is a table in which the output of the service meter (whether or not the engine is operating) provided in the vehicle 31 and the output of the calendar and timer provided in the vehicle 31 are compared at each time point to indicate the time periods during which the engine is operating. The time periods shaded in black in FIG. 40 correspond to the time periods during which the engine of the vehicle 31 is operating. The operating time is the cumulative value of the service meter for one day (the daily operating time of the engine).

When automatic transmission is performed from the vehicle 31 side, and the automatically transmitted mobile body information indicating "operating map", "date", and "operating time" is received in the server terminal 21, this mobile body information is used in the server terminal 21 to perform processing to update the Web site page "daily work report screen".

Then, when the WWW browser is activated in the terminal 11, the Web site page data are read from the server terminal 21 via the WWW browser, and the "daily work report screen" is displayed on a display screen of the terminal 11 display device.

The "date", "operating map", and "operating time" relating to operations of the vehicle 31 are then updated to the latest data and displayed as is shown in FIG. 40. Note that the following are also displayed on the "daily work report screen": "name of customer" who is using the vehicle 31 (ABC Doboku (KK)); "name of work site" on which the vehicle 31 is operating (Iroha Rock Quarry); "names of operators" each day; and "remarks" concerning maintenance and the like. The input procedure for the "name of customer", "name of work site", "names of operators", and "remarks" may be performed by means of communication over the Internet 2. When the "name of customer", "name of work site", "names of operators", and "remarks" are inputted on the customer side terminal, the input data are transmitted to the server terminal 21 over the Internet 2, and the content of the "daily work report screen" is updated in accordance with the input data.

In so doing, the latest daily work report is displayed on the terminal 11 display screen in real time, and therefore can be easily obtained from the terminal 11 display screen. In other words, daily work reports can be accurately created without placing a burden on the operator. As a result, an engineering company can perform accurate labor management and daily work report management.

When the terminal 11 is provided in a rental company, daily work report history can be learned from a display screen of the terminal 11, whereby demanding customers can be distinguished from undemanding customers. This information can be used in customer management. For example, demanding customers can be provided with a warning, or a decision to refuse rentals to such customers can be made. Further, by learning the daily work report history, customers who barely operate the vehicle 31 can be found and these customers can be advised to return the vehicle 31. Also by learning the daily work report history, a time for performing maintenance on the vehicle 31 can be forecast.

When the terminal 11 is provided in a second hand dealer who sells second hand construction machines, daily work report history can be learned from a display screen of the terminal 11, and the past usage time, operating efficiency and so on of the construction machines can be calculated. As a result, an appropriate second hand price can be set for the second hand vehicles.

When the terminal 11 is provided in a manufacturer who manufactures construction machines, daily work report history can be learned from a display screen of the terminal 11, whereby construction machine durability can be calculated. This can be used in the design and so on of future models.

Figure 41:
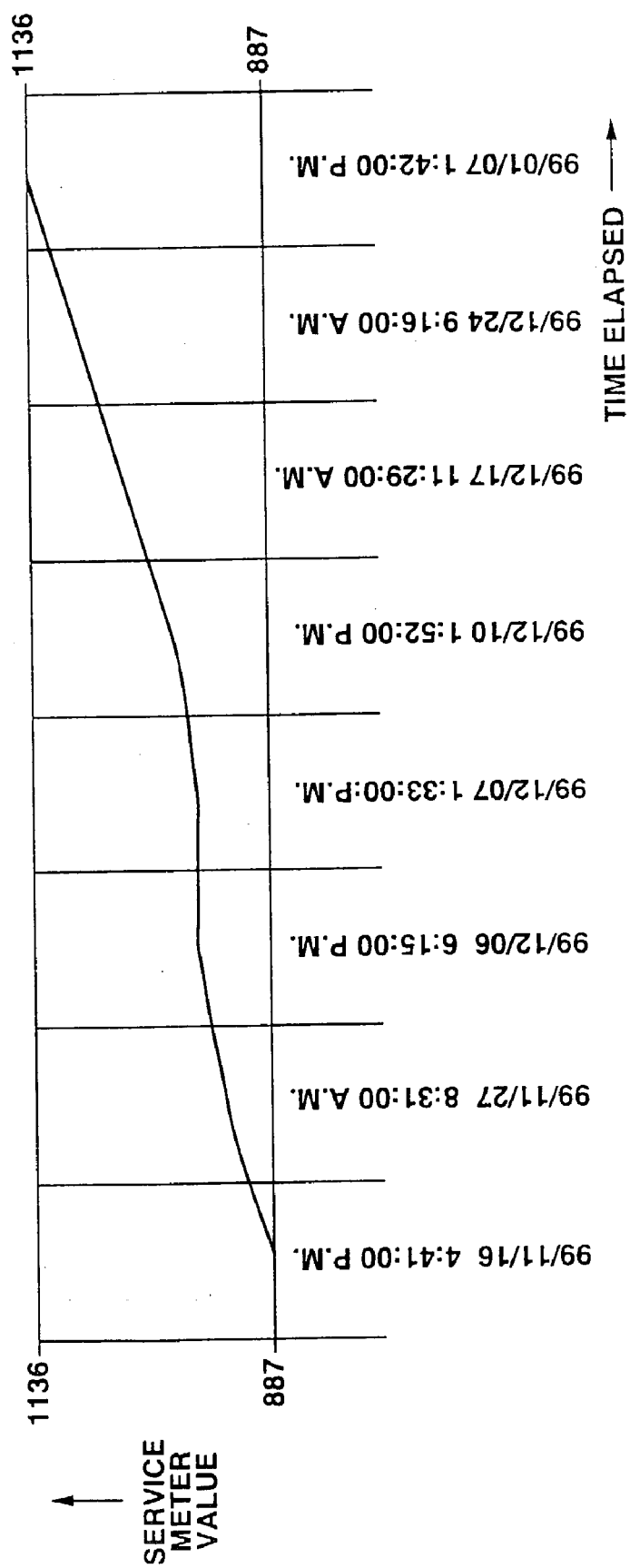
FIG. 41 is a view illustrating an example of the display on the display screen of a terminal.

As is illustrated in FIG. 41, a service meter history graph can also be displayed on a display screen of the terminal 11. The abscissa of the graph in FIG. 41 indicates time, and the ordinate is the cumulative value of engine operating time, measured by the service meter. Times for performing maintenance such as routine inspections can be forecast from the graph in FIG. 41.

Display of FIGS. 40 and 41 may be permitted only on the display screen of the terminal 11 which manages the vehicle 31, whereby FIGS. 40 and 41 are not displayed on the display screen of any terminal other than the terminal 11. This is realized, for example, by making the input of a specific ID number or a specific code number (a number corresponding to the terminal 11) a condition for the display of FIGS. 40 and 41.

In this embodiment, an operating map is produced following the elapse of each day such that a daily work report is created and the daily work report screen is updated each day. However, the operating map unit is not limited to one day, and may be any time period. For example, an operating map may be produced monthly such that "monthly work reports" are created and a "monthly work report screen" is updated monthly. Work reports may also be created according to the customer rental period. In other words, an operating map may be produced for one rental period, whereby a "work report" is created and a "work report screen" is updated.

When a construction machine 31 is rented, fees are usually set in accordance with the length of the rental period. In actuality, however, there exist both customers who operate the construction machine 31 for long periods of time and customers who barely operate the construction machine 31 at all within a rental period of identical length. To charge both these customers the same fee is unfair and irrational.

Therefore, rental fees may be calculated automatically in accordance with the length of the engine operating time.

In order to do so, calculation processing is performed in which "operating time" data, which are automatically transmitted from the vehicle 31, are received in the server terminal 21, and the operating time up to the present time is accumulated. The relationship between the cumulative value of the operating time and the rental fee is set in advance. Thus the fee corresponding to the cumulative operating time value up to the present is calculated from this relationship. Processing to update the Web site page "daily work report screen" with the latest rental fee is then performed in the server terminal 21.

Thus when the WWW browser in the terminal 11 is activated, the Web site data are read from the server terminal 21 via the WWW browser, and the "daily work report screen" is displayed on a display screen of the terminal 11 display device. It is assumed that the rental period is from January 21 to January 30. A fee XXXXXXX yen which corresponds to the cumulative operating time value of the rental period (from January 21 to January 30), or in other words to the total value (49 hours, 6 minutes) of the daily "operating times" during the rental period, is displayed on the "daily work report screen" in FIG. 40. From this display, the customer is able to obtain information regarding the rental fee corresponding to the amount of engine operation time during the rental period easily, on screen, and in real time.

In this embodiment, the fee is calculated simply in accordance with the cumulative operating time value.

In actuality, however, demand for construction machines varies greatly depending upon the time period. More specifically, the demand for construction machines increases during times when construction work is concentrated. Even within a single day, demand is higher during the afternoon than at night. Thus rental fees may also be set in accordance with the scale of demand for a construction machine. Specifically, fees may be set at a higher level during times of concentrated construction work when demand for construction machines increases, and conversely, fees may be set at a lower level during off-season periods. Fees may also be set higher during the afternoon and lower at night. Hence fees are determined not only in consideration of the cumulative operating time value, but also in consideration of the operating time period, operating time zone, and operating time of day.

Note that in the aforementioned embodiments, the communication means 1 are assumed to include the Internet 2. However, the communication means 1 of the present invention are not limited thereto, and may be structured as communication means which do not include the Internet 2. As long as similar communication to that described in the embodiments is performed, the communication means may be replaced by other communication means. Also in these embodiments, the communication means 1 are assumed to be a combination of wireless communication and wired communication, but may of course be either wireless communication or wired communication alone.

Moreover, in these embodiments a presentation format is envisaged in which mobile body information is displayed on a terminal as image data. However, according to the present invention mobile body information may be presented by being outputted to a terminal as audio, or may be outputted to a terminal for printing as print data. In short, the presentation format of mobile body information on a terminal is arbitrary.

Also in the embodiments, a case was envisaged in which plurality of mobile bodies mainly comprising construction machines is managed and monitored. However, the present invention is not limited thereto and may be applied to a case in which normal automobiles, motorcycles and so on are managed and monitored.

What is claimed is:

1. A movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative; and first start-up lock releasing means for releasing the state of halted operations on the condition that a password is inputted and the inputted password matches a set specific password, and wherein the start-up locking device is provided with:

second start-up lock releasing means for releasing the state of halted operations by transmitting a start-up lock release command from the terminal device side to the movable body via the communication means.

2. A movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative;

start-up lock releasing means for releasing the state of halted operations on the condition that a password is inputted and the inputted password matches a set specific password; and setting means for inputting and setting the specific password, and wherein:

data for the specific password set by the setting means are transmitted from the movable body side to the terminal device;

the terminal device manages this transmitted specific password; and the movable body uses the specific password managed by the terminal device as a password for releasing the start-up lock releasing means.

3. A movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative; and start-up lock releasing means for releasing the state of halted operations on the condition that a password is inputted and the inputted password matches a password for release, and wherein:

data indicating a state of halted operations are transmitted from the movable body side to the terminal device when the movable body is placed in a state of halted operations by the start-up lock setting means;

when the terminal device receives the data indicating the state of halted operations, the terminal device sets a specific password and transmits data for this set specific password to the movable body; and the movable body uses this transmitted specific password as a password for releasing the start-up lock releasing means.

4. A movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative; and start-up lock releasing means for releasing the state of halted operations on the condition that a password is inputted and the inputted password matches a password for release, and wherein:

the terminal device sets a specific password and transmits data for this set specific password to the movable body; and the movable body uses this transmitted specific password as a password for releasing the start-up lock releasing means.

5. A movable body start-up locking device in which a movable body which is driven by a driver and which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative;

data input means for inputting driver identification data to identify a driver; and start-up lock releasing means for releasing the state of halted operations on the condition that a release permission command is inputted, and wherein:

when driver identification data are inputted into the data input means, these driver identification data and movable body identification data for identifying the movable body are transmitted from the movable body side to the terminal device; and when the terminal device receives the driver identification data and movable body identification data, the terminal device makes a judgment on the basis of the received driver identification data and movable body identification data as to whether or not the release permission command is to be transmitted, and transmits the release permission command to the movable body.

6. The movable body start-up locking device according to claim 5, wherein, if the movable body is actually in operation when the release permission command has not been received, information corresponding thereto is transmitted from the movable body side to the terminal device.

7. A movable body start-up locking device in which a movable body which operates by means of a start-up device operation and a terminal device provided on a side for managing this movable body are connected by communication means such that data can be transmitted and received between this movable body and terminal device, wherein the movable body is provided with:

start-up lock setting means for setting a state of halted operations in the movable body by making the start-up device inoperative;

start-up lock releasing means for releasing the state of halted operations on the condition that a password is inputted and the inputted password matches a set specific password; and setting means for setting the set password whenever the movable body is set to a state of halted operations by the start-up lock setting means, and wherein:

data for the specific password set by the setting means are transmitted from the movable body side to the terminal device;

the terminal device manages the transmitted specific password; and the movable body uses the specific password managed by the terminal device as a password for releasing the start-up lock releasing means.

* * * * *